United States Patent [19]
Barrett et al.

[11] Patent Number: 5,935,262
[45] Date of Patent: *Aug. 10, 1999

[54] OUTPUTTING A NETWORK DEVICE LOG FILE

[75] Inventors: Lorraine F. Barrett, Yorba Linda; William C. Russell, Laguna Hills, both of Calif.

[73] Assignee: Canon Information Systems, Inc., Irvine, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/489,116

[22] Filed: Jun. 9, 1995

[51] Int. Cl.⁶ .................................................. G06F 11/30
[52] U.S. Cl. .............................. 714/46; 714/47; 714/48
[58] Field of Search ........................ 395/182.18, 183.22, 395/184.01, 185.01, 183.15, 200.11, 835, 837, 838, 839, 618; 364/264, 264.4, 264.6; 399/10

[56] References Cited

U.S. PATENT DOCUMENTS

| | | | |
|---|---|---|---|
| 4,322,813 | 3/1982 | Howard et al. | 399/10 |
| 4,339,657 | 7/1982 | Larson et al. | 371/5.1 |
| 4,507,751 | 3/1985 | Gawlick et al. | 395/618 |
| 4,926,347 | 5/1990 | Uchida et al. | 364/519 |
| 5,027,154 | 6/1991 | Ujiie et al. | 399/10 |
| 5,049,873 | 9/1991 | Robins et al. | 340/825.06 |
| 5,193,152 | 3/1993 | Smith | 395/200 |
| 5,200,958 | 4/1993 | Hamilton et al. | 395/182.18 |
| 5,220,674 | 6/1993 | Morgan et al. | 395/800 |
| 5,270,725 | 12/1993 | Suzuki | 399/10 |
| 5,295,244 | 3/1994 | Dev et al. | 395/161 |
| 5,361,265 | 11/1994 | Weinberger et al. | 395/182.18 |
| 5,402,361 | 3/1995 | Peterson et al. | 399/10 |
| 5,414,494 | 5/1995 | Aikens et al. | 355/202 |
| 5,533,193 | 7/1996 | Roscoe | 395/184.01 |
| 5,537,550 | 7/1996 | Russell et al. | 395/200.11 |
| 5,537,626 | 7/1996 | Kraslavsky et al. | 395/828 |
| 5,638,508 | 6/1997 | Kanai et al. | 395/182.18 |

FOREIGN PATENT DOCUMENTS 3087953  4/1991  Japan .............................. G06F 13/00

*Primary Examiner*—Ly V. Hua
*Attorney, Agent, or Firm*—Fitzpatrick, Cella, Harper & Scinto

[57] ABSTRACT

A network device which interfaces between a local area network (LAN) and an image forming apparatus and which can output a log file. The network device includes a LAN interface for receiving image forming jobs and command signals from the LAN, and a peripheral interface for outputting image forming jobs to the image forming apparatus. The network device further includes a storage device that stores a log file of image forming jobs received from the LAN and output to the image forming apparatus. In addition, the network device includes a processor that updates the stored log file based on the image forming jobs received from the LAN and output to the image forming apparatus and detects a triggering condition of outputting the log file. In response to the triggering condition, the processor formats the log file into an image forming job and outputs the formatted log file to the image forming apparatus.

44 Claims, 33 Drawing Sheets

13010

LOG FILE CONTENTS: CMQA_LAB-A

| 13001 | 13002 | 13003 | 13004 | 13005 | 13006 |
|---|---|---|---|---|---|
| 1995/05/23 | 00:00:46 | STA | 8 | 7 | 13 |
| 1995/05/23 | 00:00:46 | STC | 8 | 61 | 106 |
| 1995/05/23 | 00:00:46 | STD | 1 | 2 | 10 |
| 1995/05/22 | 00:00:46 | STA | 7 | 8 | 13 |
| 1995/05/22 | 00:00:46 | STC | 7 | 59 | 96 |
| 1995/05/22 | 00:00:46 | STD | 1 | 0 | 0 |
| 1995/05/21 | 00:00:45 | STA | 6 | 9 | 16 |
| 1995/05/21 | 00:00:45 | STC | 6 | 59 | 96 |
| 1995/05/21 | 00:00:45 | STD | 1 | 0 | 0 |
| 1995/05/20 | 00:00:42 | STA | 5 | 11 | 19 |
| 1995/05/20 | 00:00:42 | STC | 5 | 59 | 96 |
| 1995/05/20 | 00:00:42 | STD | 1 | 16 | 75 |
| 1995/05/19 | 00:00:42 | STA | 4 | 10 | 5 |
| 1995/05/19 | 00:00:42 | STC | 4 | 43 | 21 |
| 1995/05/19 | 00:00:42 | STD | 1 | 11 | 16 |
| 1995/05/18 | 00:00:43 | STA | 3 | 10 | 1 |
| 1995/05/18 | 00:00:43 | STC | 3 | 32 | 5 |
| 1995/05/18 | 00:00:43 | STD | 1 | 27 | 5 |
| 1995/05/17 | 00:00:41 | STA | 2 | 2 | 0 |
| 1995/05/17 | 00:00:41 | STC | 2 | 5 | 0 |
| 1995/05/17 | 00:00:41 | STD | 1 | 5 | 0 |
| 1995/05/16 | 10:23:35 | POW | E | 1.39 (00680B) | CMQA_LAB-A |

HEX DUMP: CMQA_LAB-A

LOG FILE CONTENTS: CMQA_LAB-A

| 2901 | 2902 | 2903 | 2904 | 2905 | 2906 | 2907 | 2908 |
|---|---|---|---|---|---|---|---|
| 1995/05/23 | 00:00:46 | STA | 8 | 63 | 7 | 13 | 20 |
| 1995/05/23 | 00:00:46 | STC | 8 | 504 | 61 | 106 | 162 |
| 1995/05/23 | 00:00:46 | STD | 1 | 7 | 2 | 10 | 0 |
| 1995/05/22 | 00:00:46 | STA | 7 | 71 | 8 | 13 | 23 |
| 1995/05/22 | 00:00:46 | STC | 7 | 497 | 59 | 96 | 162 |
| 1995/05/22 | 00:00:46 | STD | 1 | 0 | 0 | 0 | 0 |
| 1995/05/21 | 00:00:45 | STA | 6 | 82 | 9 | 16 | 27 |
| 1995/05/21 | 00:00:45 | STC | 6 | 497 | 59 | 96 | 162 |
| 1995/05/21 | 00:00:45 | STD | 1 | 0 | 0 | 0 | 0 |
| 1995/05/20 | 00:00:42 | STA | 5 | 99 | 11 | 19 | 32 |
| 1995/05/20 | 00:00:42 | STC | 5 | 497 | 59 | 96 | 162 |
| 1995/05/20 | 00:00:42 | STD | 1 | 115 | 16 | 75 | 53 |
| 1995/05/19 | 00:00:42 | STA | 4 | 95 | 10 | -5 | 27 |
| 1995/05/19 | 00:00:42 | STC | 4 | 382 | 43 | 21 | 109 |
| 1995/05/19 | 00:00:42 | STD | 1 | 90 | 11 | 16 | 52 |
| 1995/05/18 | 00:00:43 | STA | 3 | 97 | 10 | 1 | 19 |
| 1995/05/18 | 00:00:43 | STC | 3 | 292 | 32 | 5 | 57 |
| 1995/05/18 | 00:00:43 | STD | 1 | 245 | 27 | 5 | 45 |
| 1995/05/17 | 00:00:41 | STA | 2 | 23 | 2 | 0 | 6 |
| 1995/05/17 | 00:00:41 | STC | 2 | 47 | 5 | 0 | 12 |
| 1995/05/17 | 00:00:41 | STD | 1 | 47 | 5 | 0 | 12 |
| 1995/05/16 | 10:23:35 | POW E | 1.39 (00680B) | | CMQA_LAB-A | | |

FIG. 29

OUTPUTTING A NETWORK DEVICE LOG FILE

BACKGROUND OF THE INVENTION

1. Field of the Invention

The present invention relates to a network device which interfaces between a local area network (LAN) and an image forming apparatus and which outputs a log file containing information accumulated by the network device regarding image forming jobs sent to the image forming apparatus.

2. Incorporation by Reference

U.S. Pat. No. 5,323,393, entitled "Method And Apparatus For Obtaining And For Controlling The Status Of A Networked Peripheral"; U.S. patent application Ser. No. 08/336,062, entitled "Network Protocol Sensor"; and U.S. patent application Ser. No. 08/336,043, entitled "Smart Flash", are hereby incorporated by reference into the present application.

3. Description of the Related Art

Computerized local and wide area networks are now commonly used for providing communication between different computers and computer peripherals which are connected to the network. Each peripheral is typically connected to the network through a dedicated interface referred to generally as a network device. If the network device is embedded in the peripheral, it is often referred to as a network board. The network device provides hardware, software and firmware solutions for making the network peripheral, such as an image forming apparatus, an intelligent, interactive network member, capable not only of receiving and processing data from the network, but also of transmitting to the network significant amounts of data about the peripheral such as detailed status information, operational parameters and the like. Integration of such hardware, software and firmware with the peripheral eliminates the need to dedicate a personal computer to act as a peripheral server.

The network device may provide a logging function which maintains a log containing information related to image forming jobs received by the network device from the LAN and output to the image forming apparatus, e.g., a printer. The log may also contain statistical information relating to operation of the printer and/or status information such as errors that have occurred in the printer. Such information may be useful in generating bills for use of the printer, for predicting when maintenance or resupply of the printer paper and toner will be needed, or for diagnosing problems with the printer or the network device.

The log file maintained by the network device is conventionally accessed using a computer. The computer can retrieve the log file via the LAN and can format and display or print the log file or save the log file to a disk on a remote PC and then print the log file. However, since the network device eliminates the need for a computer dedicated to the printer, many printers are located at places remote from a computer. For example, several printers may be grouped together in a central location and shared by a number of computer users at different locations. Under such circumstances, a user or service person at a printer is unable to obtain the log file information concerning the printer and the network device, unless the log file is retrieved using a computer at a remote location, printed out, and delivered to the person at the printer. Further, since the log file has limited capacity, it begins to wrap around when the capacity is full. Therefore, earlier logged data will be overwritten and lost. In addition, if there is a problem with the network connection of the network device, a computer will be unable to access the log file via the LAN.

SUMMARY OF THE INVENTION

The aforementioned problems are addressed by the present invention in which a log file is formatted into an image forming job by a network device and output to the image forming apparatus to which the network device is connected.

In one aspect, the invention is a method of outputting a log file from a network device which interfaces between a local area network (LAN) and an image forming apparatus. A log file is maintained which logs at least one of image forming jobs received from the LAN and output to the image forming apparatus, device statistics and error information. In response to detection of a triggering condition for initiating output of the log file, the log file is formatted into an image forming job and the formatted log file is output to the image forming apparatus. The triggering condition may be, for example, that an allocated area in a storage device in which the log file is maintained is full, that a command signal from a computer is received via the LAN, that a predetermined time has been reached, or that an exception condition regarding the connection between the network device and the LAN has been recognized.

By virtue of this arrangement, the log file can be output by the network device directly to the connected image forming apparatus, without retrieving the log file using a computer.

In another aspect, the present invention is a network device which interfaces between a LAN and an image forming apparatus and which outputs a log file. The network device has a LAN interface for receiving image forming jobs and command signals from the LAN, as well as a peripheral interface for outputting image forming jobs to the image forming apparatus. A storage device is provided having an allocated area for storing a log file of image forming jobs received from the LAN and output to the image forming apparatus. A processor updates the stored log file based on the image forming jobs received from the LAN and output to the image forming apparatus, and detects a triggering condition for outputting the log file. In response to the triggering condition, the processor formats the log file and outputs the formatted log file to the image forming apparatus. In addition, the processor may detect the triggering condition when the allocated area of the storage device is full, when a predetermined command signal is received via the LAN interface, at a predetermined time, or when an exception condition is recognized.

This brief summary has been provided so that the nature of the invention may be understood quickly. A more complete understanding of the invention can be obtained by reference to the following detailed description of the preferred embodiment thereof in connection with the attached drawings.

BRIEF DESCRIPTION OF THE DRAWINGS

FIG. 13 shows an example of a log file.

FIG. 20 is a sample of output debug information.

FIG. 29 shows an example of a log file.

DETAILED DESCRIPTION OF THE PREFERRED EMBODIMENTS

In one form, the present invention is embodied in a Network Expansion Device (or "NED") which provides hardware, software and firmware solutions for making a network peripheral, such as a printer, an intelligent, interactive network member, capable of receiving and processing data from the network and of transmitting NED status and functional information, as well as limited amounts of peripheral status information to the network. It is also possible to use the NED in other network peripherals such as facsimile machines, copiers, and other networkable peripherals, particularly image processing peripherals which are capable of printing out information. Integration of NED hardware, software and firmware with a peripheral eliminates the need to dedicate a network personal computer to act as a peripheral server.

NETWORK ARCHITECTURE

Figure 1:
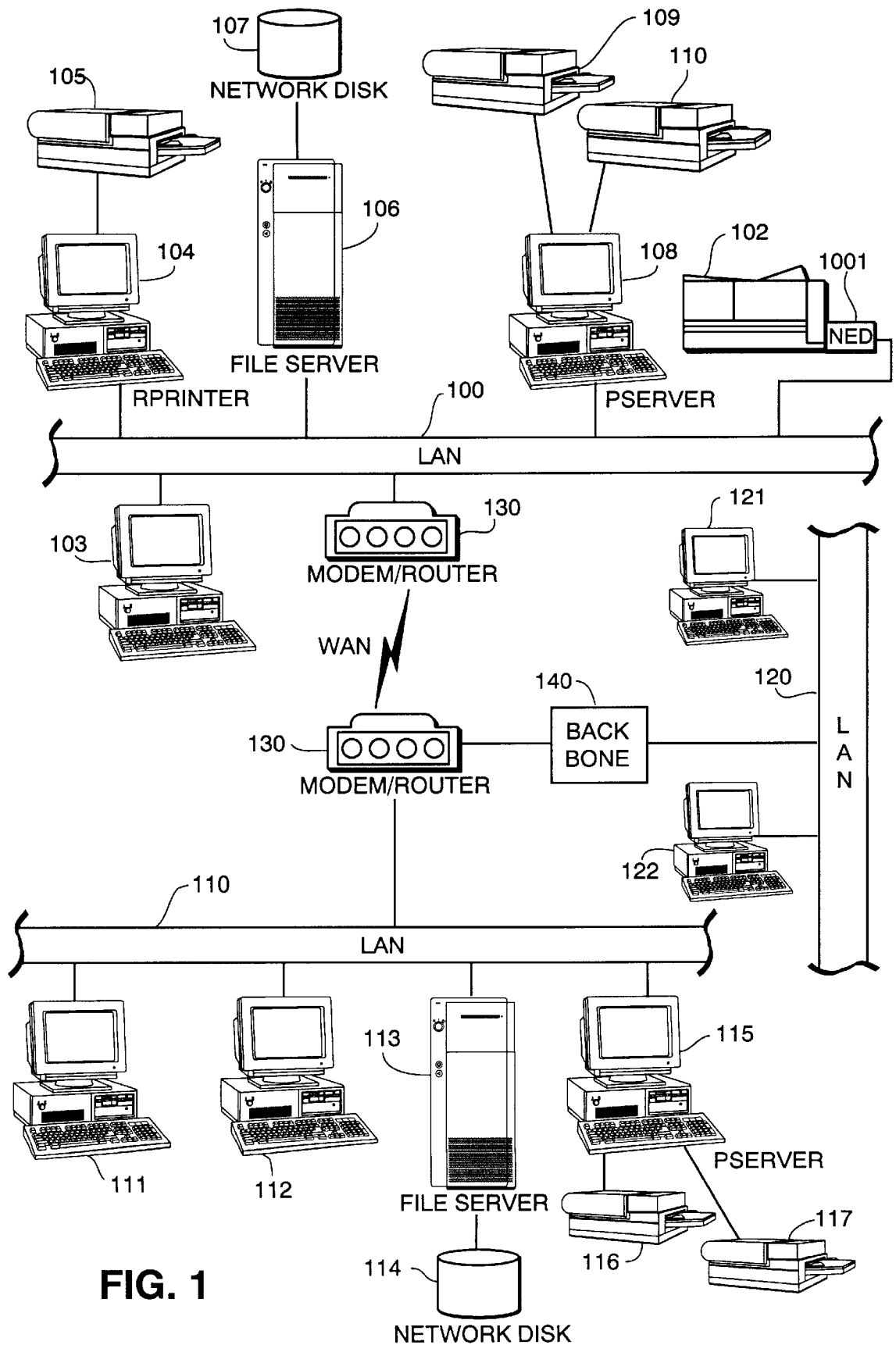
FIG. 1 is a diagram of a local area network and wide area network to which a network device is coupled.

FIG. 1 is a diagram showing the present invention incorporated into NED 1001 coupled on one side via a peripheral interface to printer 102. On the other side, NED 1001 is coupled to local area network (LAN) 100 through a LAN interface, for example, an Ethernet interface 10Base-2 with a Coax connector or a 10Base-T with an RJ-45 connector.

Plural personal computers (PCs), such as PCs 103 and 104, are also connected to LAN 100, and, under control of the network operating system, these PCs are able to communicate with NED 1001. One of the PCs, such as PC 103, may be designated as a network administrator's workstation. A PC may have a printer connected to it, such as printer 105 connected to PC 104.

Also connected to LAN 100 is file server 106 which manages access to files stored on a large capacity (e.g., 10 gigabyte) network disk 107. A print server 108 provides print services to printers 109 and 110 connected to it, as well as to remote printers such as printer 105. Other unshown peripherals may also be connected to LAN 100.

In more detail, the network depicted in FIG. 1 may be a heterogeneous network, meaning that the network may utilize any network software such as Novell or UNIX or AppleTalk software in order to effect communication among various network members. The present embodiments will be described with respect to a LAN utilizing Novell NetWare® software, although any network software could be used. A detailed description of this software package may be found in "NetWare® User's Guide" and "NetWare® Supervisor's Guide", published by M&T Books, copyrighted 1990, incorporated herein by reference. See also the "NetWare® Print Server" by Novell, March 1991 edition, Novell Part No. 100-000892-001.

Briefly, file server 106 acts as a centralized file storage device for workstations connected to the network. PCs 103 and 104 can store data files on file server 106 as if its disk were directly connected to these PCs. Additionally, file server 106 provides shared printer services by receiving, storing, queuing and transmitting printer files to network printers. For example, print files created respectively at PCs 103 and 104 may be routed to file server 106, which will store the print files and then transfer the print files to printer 109 upon command from print server 108.

PCs 103 and 104 may each comprise a standard PC capable of generating data files, transmitting them onto LAN 100, receiving files from LAN 100, and displaying and/or processing such files. However, while personal computer equipment is illustrated in FIG. 1, other computer equipment may also be included, as appropriate to the network software being executed. For example, UNIX workstations may be included in the network when UNIX software is used, and those workstations may be used in conjunction with the illustrated PC's under appropriate circumstances. Likewise, Macintosh workstations can be included in the network when AppleTalk software (e.g., EtherTalk) is used.

Typically, a LAN, such as LAN 100, services a fairly localized group of users such as a group of users on one floor or contiguous floors in a building. As users become more remote from one another, for example, in different buildings or different states, a wide area network (WAN) may be created which is essentially a collection of several LANs all connected by high speed digital lines, such as high speed integrated services digital network (ISDN) telephone lines. Thus, as shown in FIG. 1, LANs 100, 110 and 120 are connected to form a WAN via modulator/demodulator (MODEM) /transponder 130 and backbone 140, which is simply an electrical connection between several buses. Each LAN includes its own PCs, and each ordinarily includes its own file server and print server, although this is not necessarily the case.

Thus, as shown in FIG. 1, LAN 110 includes PCs 111 and 112, file server 113, network disk 114, print server 115 and printers 116 and 117. LAN 120, on the other hand, includes only PCs 121 and 122. Via WAN connections, equipment in any of LANs 100, 110 and 120 can access the capabilities of equipment in any other of the LANs.

PC 104 may execute an RPRINTER software program. The RPRINTER program is an MS-DOS terminate-and-stay-resident ("TSR") program which allows users to share printer 105 connected to PC 104 while at the same time allowing PC 104 to execute other non-print applications. RPRINTER is a relatively unintelligent program that does not have the ability to search printer queues for work. RPRINTER gets its work from print server 108 running elsewhere in the network. Because it communicates with the attached printer over the printer's parallel port, PC 104 running RPRINTER is able to obtain limited status information from printer 105 and to return that status information to print server 108 over LAN 100. From a control standpoint, RPRINTER allows stopping of a print job when, for example, the printer is out of paper or off-line. Some printers include RPRINTER features by offering internal or external circuit boards that provide the same limited features of the RPRINTER TSR program running in a personal computer.

Print server 108 is capable of exercising more significant control over LAN peripherals but requires a dedicated PC which cannot be used for any other task. Print server 108, which may itself be a PC, has the ability to service multiple user-defined print queues, perform dynamic search queue modification, and provide defined notification procedures for exception (failure) conditions and status and control capabilities, and can control both local printers 109 and 110 (that is, printers physically connected to print server 108) and remote printers. Local printers 109 and 110 can be connected to either serial or parallel ports, and the remote printers, such as printer 105, are printers running elsewhere in the system which print server 108 services through RPRINTER software.

Print server 108 can control many local or remote printers and can request print information from many file server queues. However, there are several drawbacks to relying on print server 108 to control network printing services. A first drawback is that multiple printer streams must all be funnelled through a single network node. This can become a bottleneck. A second drawback is that for most efficient operation, the printers should be connected to the print server locally, like printers 109 and 110. This can be an inconvenience for users since it requires the printers to be clustered around print server 108 and also requires users to travel to those clustered printers. A third drawback is that if the controlled printers are remote, as in the case of printer 105 which is serviced by RPRINTER, then print data must make several trips, first from file server 106 to print server 108, and then from print server 108 to the printer running RPRINTER. This is inefficient.

THE NETWORK DEVICE

Installation of NED 1001 into printer 102 provides many advantages over the network peripheral control entities discussed above in that it allows printer 102 to become an intelligent, interactive network member.

Figure 2A:
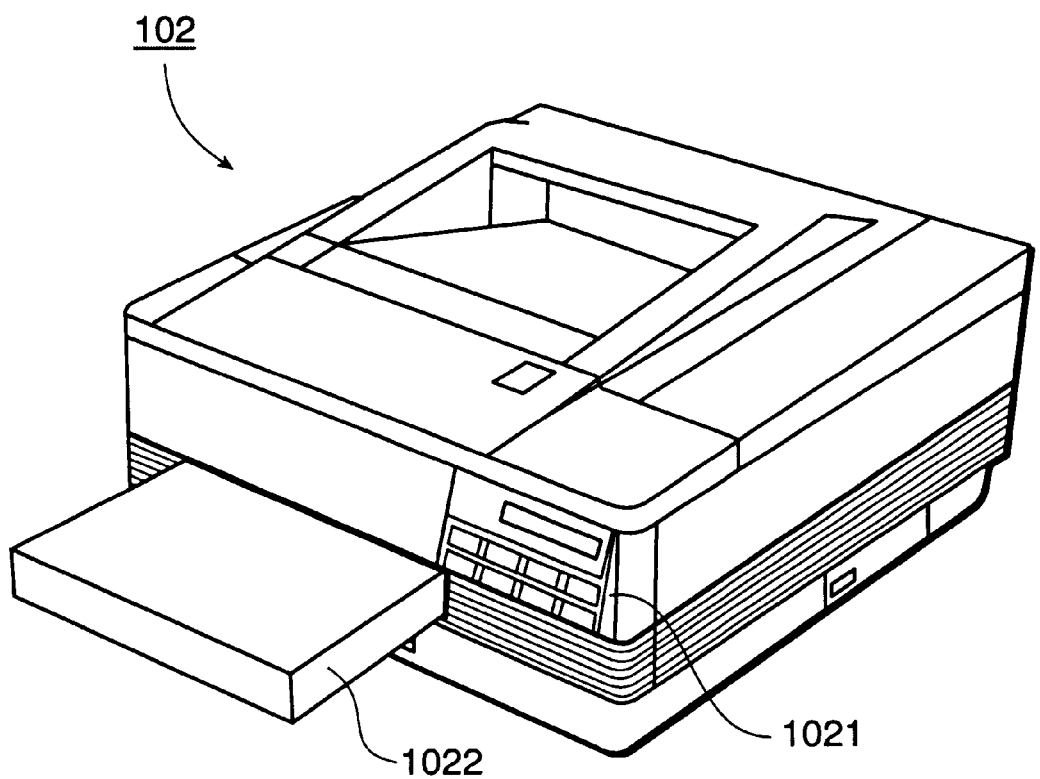
FIG. 2A is a front view of a laser printer, such as a Canon LBP 1260 laser printer.

FIG. 2A shows a front view of printer 102. Printer 102 includes paper tray 1022 and front panel 1021. As shown, front panel 1021 includes a plurality of function buttons, at least one of which is a conventional online/offline button or some other button which is capable of altering printer 102's status.

Figure 2B:
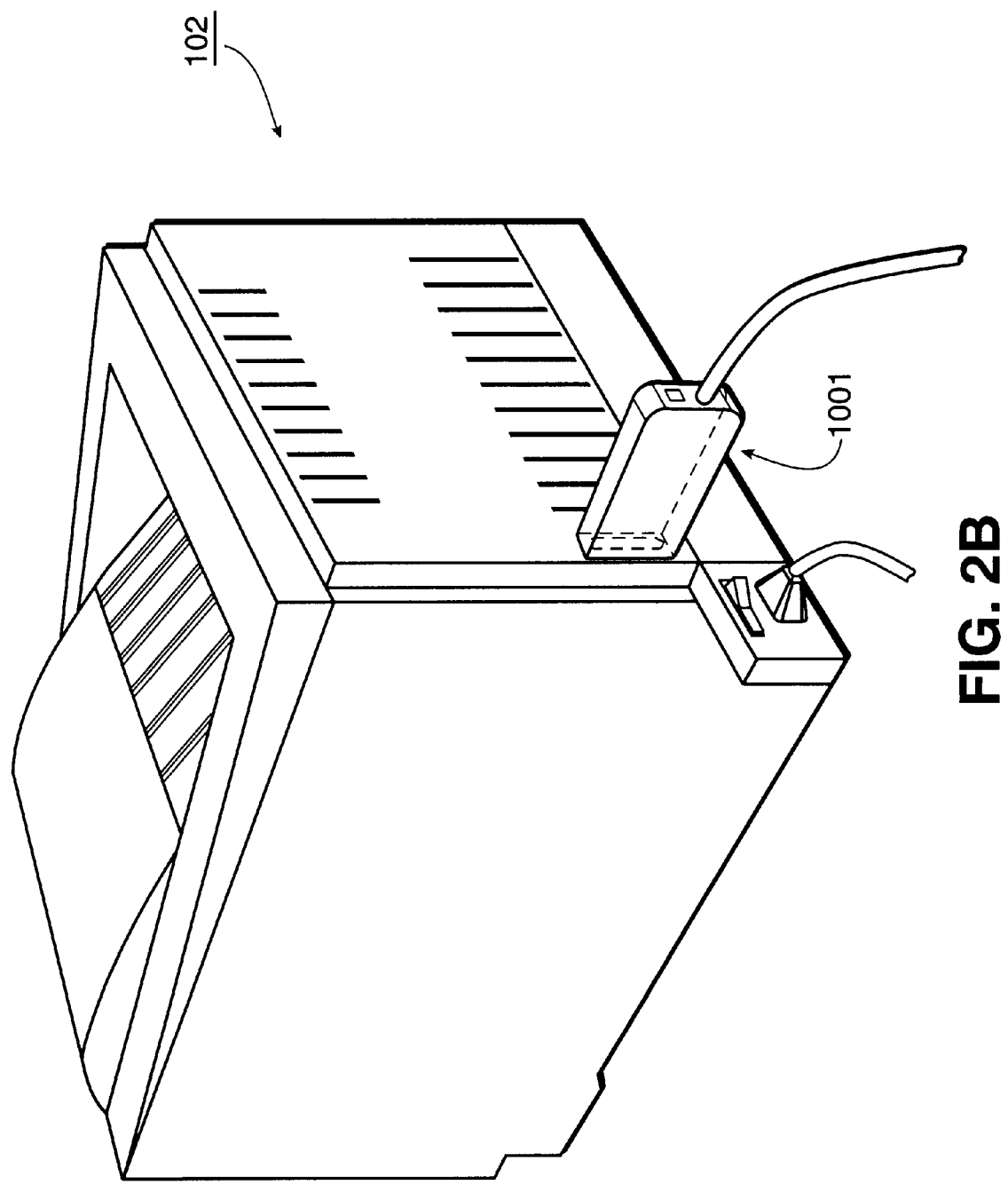
FIG. 2B is a back view of a printer having a network device installed in its parallel port.

As shown in FIG. 2B, NED 1001 is connected to printer 102 via a peripheral interface, here the parallel port of printer 102, which is a common feature on commercially available printers such as the Canon LBP 1260 laser printer. Parallel ports into which NED 1001 can be installed include, but are not limited to, a classic Centronics parallel port, as described in *Centronics Engineering Standard*, Number 9, Revision B, Genicom Corp., Apr. 9, 1980 (e.g., Amphenol 57-40360 or its equivalent at printer 102 and Amphenol 57-40360 or its equivalent at NED 1001), and an IBM PC parallel port, as described in *IBM Personal Computer Technical Reference Options and Adapters Manual*, Number 6322509, IBM Corp., April 1994. This makes NED 1001 a network node having the processing and data storage features described below.

The architecture of NED 1001 provides an advantage in that it has unique support features for administration and management of large, multi-area WAN networks. These support features could include, for example, printer control (such as from the network administrator's office), and printer logs or usage statistics generated by NED 1001 which are accessible across the network for characterizing printer workload and scheduling toner cartridge replacement. Additionally, NED 1001 can transfer back to the LAN limited amounts of printer status information. Specifically, "busy", "paper out", "I/O error" and "online/offline" signals can be transmitted from printer 102 to NED 1001 over dedicated status lines in the aforementioned Centronics interface. These can be stored by NED 1001 and transferred to LAN 100 upon request.

Figure 3:
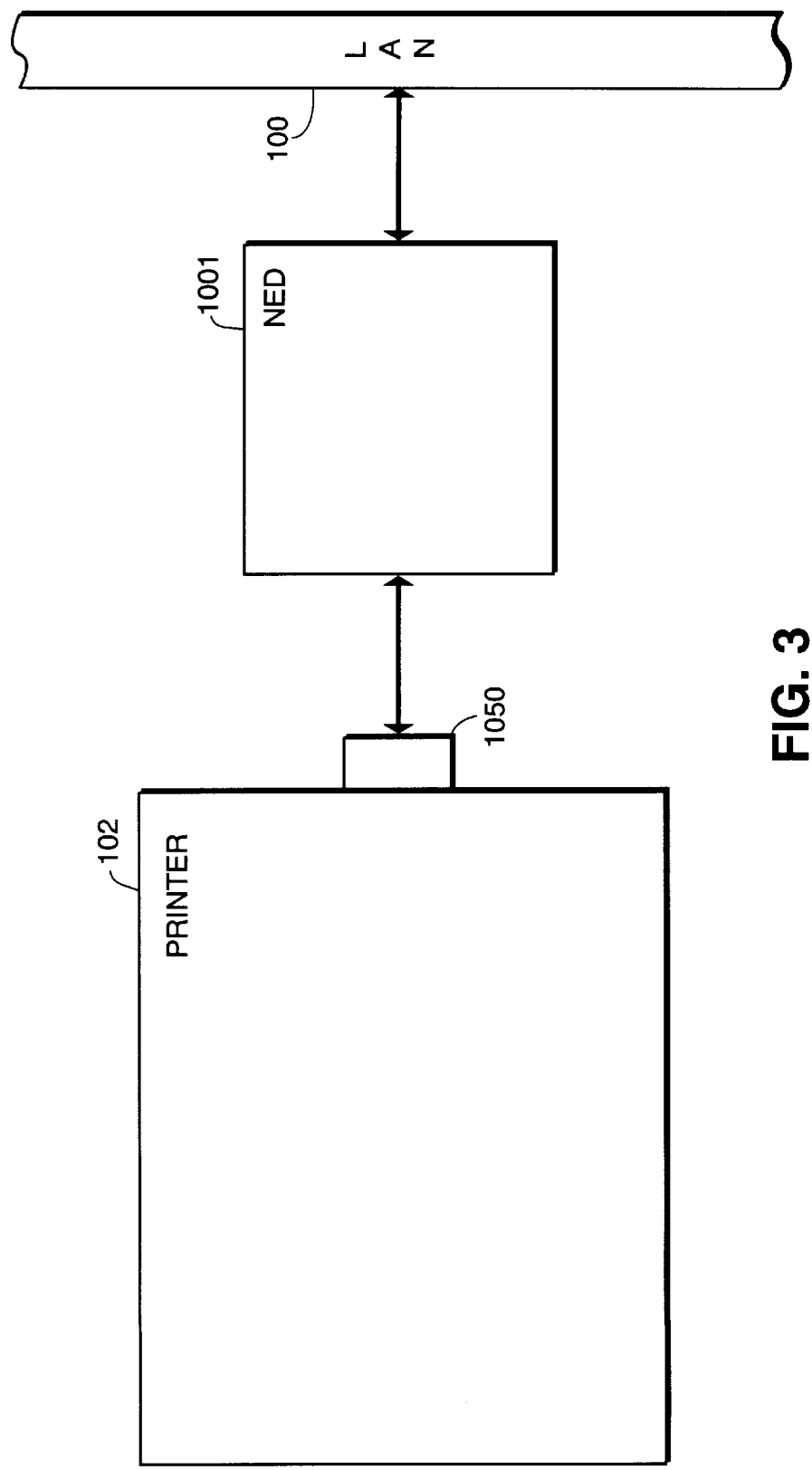
FIG. 3 is a block diagram showing the network device coupled between a printer and a local area network.

FIG. 3 is a block diagram depicting electrical connection of NED 1001 to printer 102. NED 1001 is directly connected to LAN 100 via a LAN interface, and to printer 102 via parallel interface 1050. In a preferred embodiment of the invention, parallel interface 1050 is a uni-directional 36-pin classic Centronics interface connector, although, as described above, other peripheral interfaces can be used.

NED PHYSICAL LAYOUT

Figure 4B:
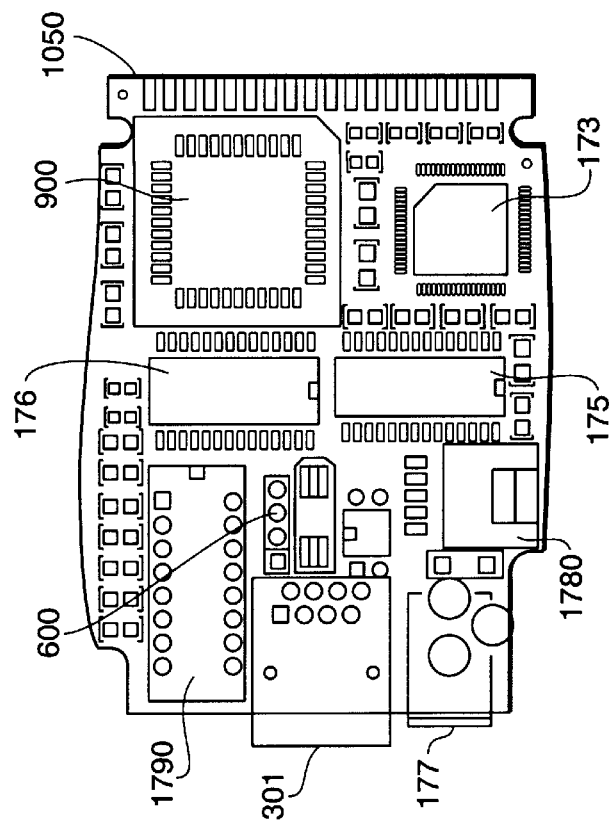
FIGS. 4A and 4B are circuit board diagrams showing the physical layout of components on a network device having an RJ-45 connector, from top and bottom perspectives.
Figure 4A:
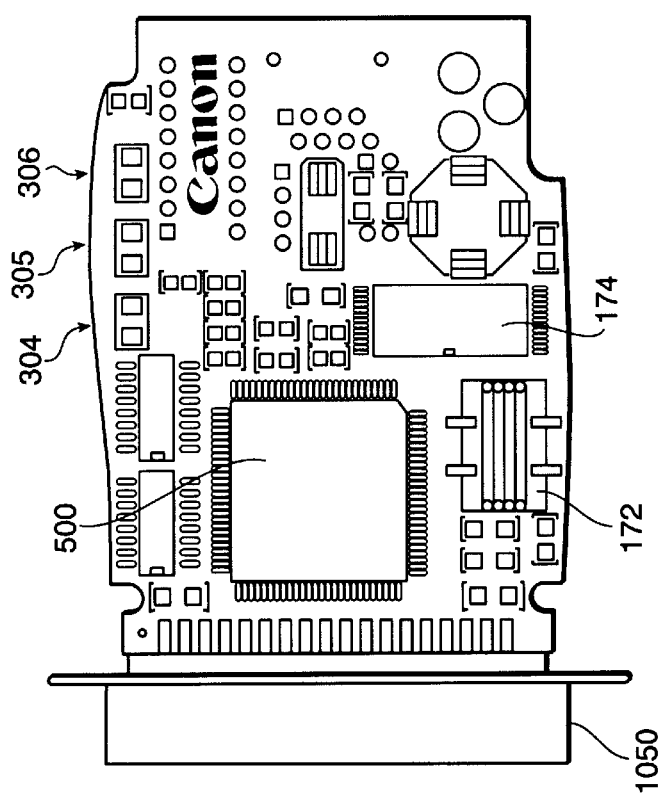

FIGS. 4A and 4B show top and bottom perspectives of a preferred embodiment of NED 1001 and the physical layout of the major components thereof. NED 1001 is 3.25 inches in length by 2.25 inches in width, is 1 inch in thickness, and weighs approximately 3 ounces. For parallel interface 1050, NED 1001 uses a 36-pin parallel port connector which fits into the parallel port of printer 102. Connector 301 connects LAN 100 to NED 1001 via isolation transformer 1790, and preferably is an RJ-45 connector capable of accepting a 10Base-T connection. Included in NED 1001 are three status light emitting diodes (LEDs) 304–306. Also arranged on NED 1001 are microprocessor 173, transceiver 171, oscillator 172, flash erasable programmable read only memory (EPROM) 174, interface conversion logic 900, dynamic random access memory (DRAM) 175, static random access memory (SRAM) 176, network and network interface control logic 500, and serial port connector 600. Each of these components will be discussed in greater detail below.

With respect to LEDs 304 to 306, in NED 1001, status LED 304 is lit when NED 1001 is receiving data from LAN 100, status LED 305 is lit when NED 1001 is connected to LAN 100, and status LED 306 is lit during self-test diagnostics of NED 1001.

Figures 5A, 5B:
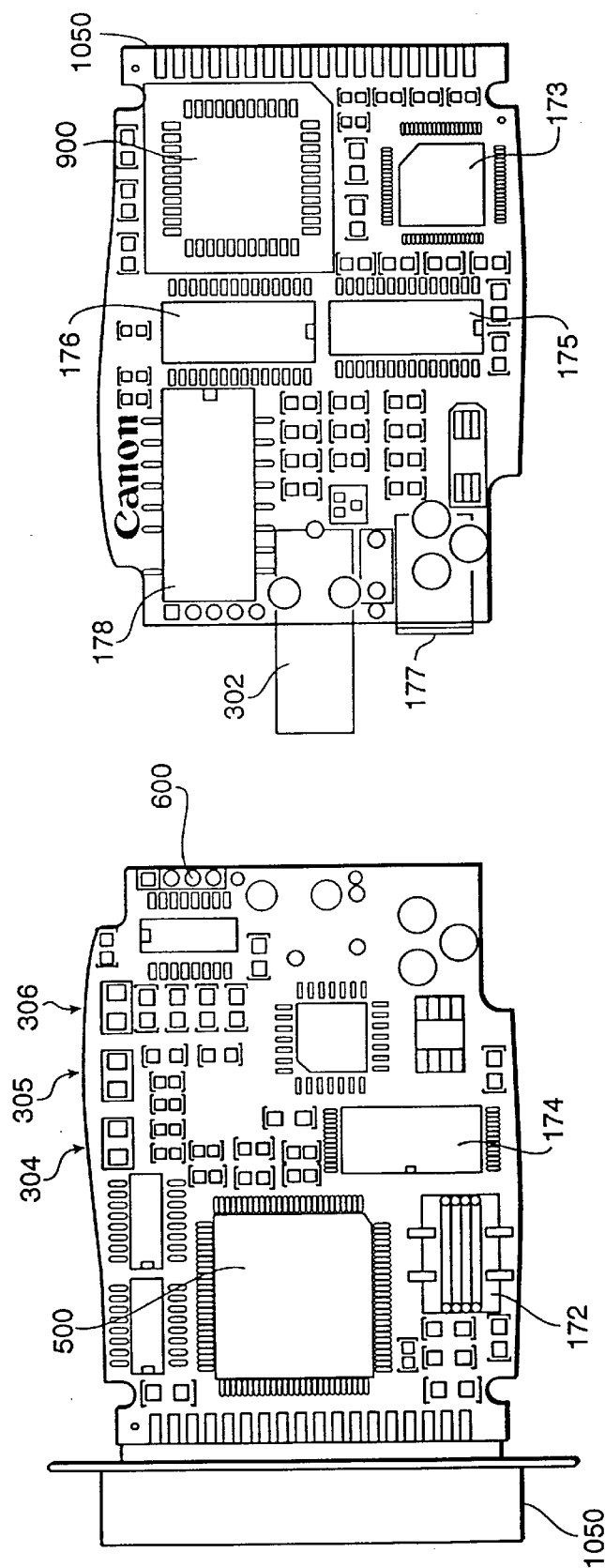
FIGS. 5A and 5B are circuit board diagrams showing the physical layout of components on a network device having a BNC connector, from top and bottom perspectives.

FIGS. 5A and 5B show top and bottom perspectives of another embodiment of NED 1001, which connects to LAN 100 via connector 302, and which does not include connector 301 and isolation transformer 1790. Connector 302 may be a simple coax connector capable of accepting a 10Base-2 connection. The remaining components in this embodiment are identical, both structurally and functionally, to those in the embodiment shown in FIGS. 4A and 4B. It should be pointed out that a further embodiment is possible in which both types of LAN connectors, i.e., both an RJ-45 and a BNC connector, are on a single NED.

NED ARCHITECTURE

Figure 6:
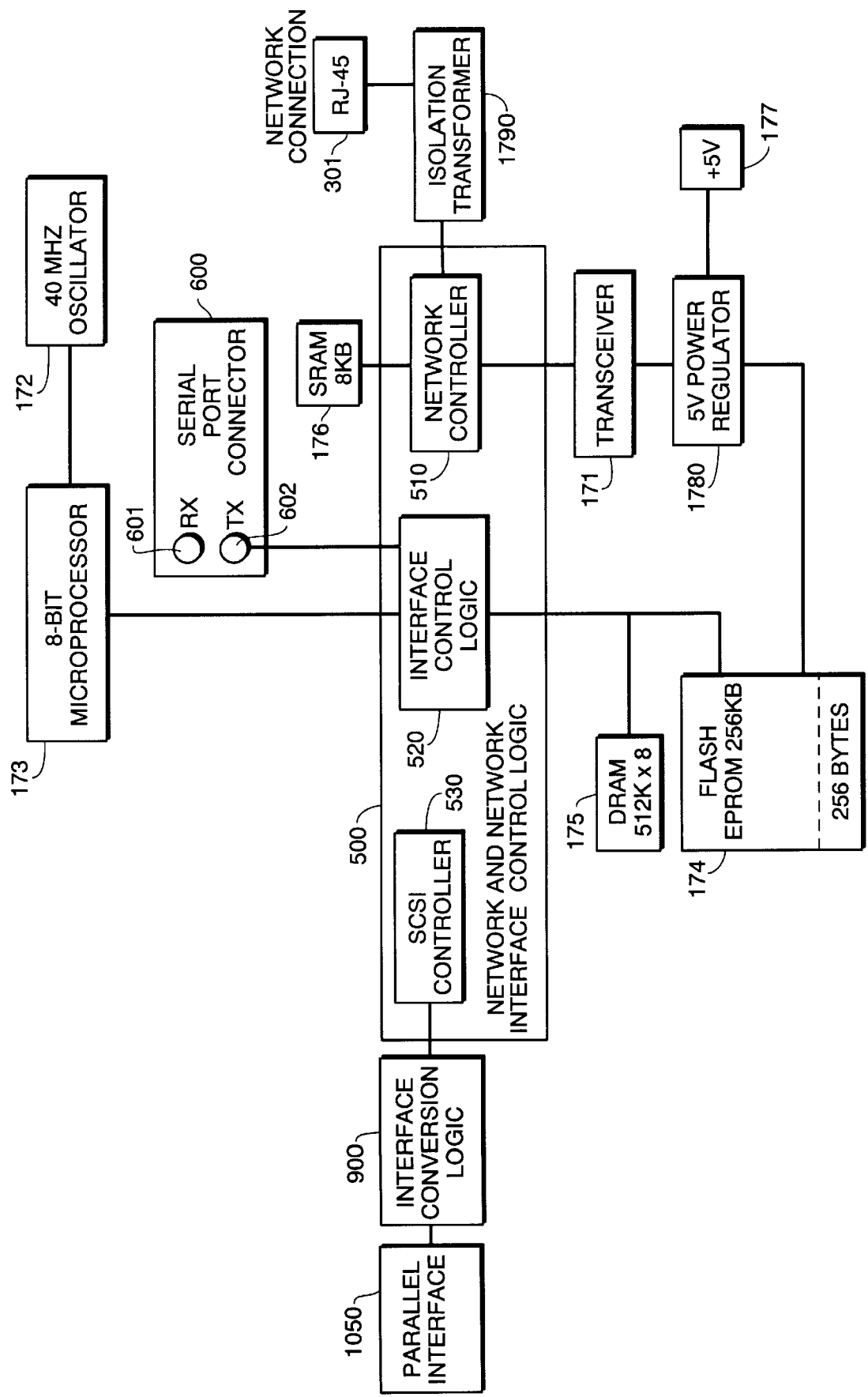
FIG. 6 is a functional block diagram of the network device having the RJ-45 connector.

The architecture of NED 1001 is shown in FIG. 6. Power for all circuits is supplied to NED 1001 from a +5 V power source 177, through 5 V power regulator 1780.

Network and network interface control logic 500 is preferably a single 144-pin application specific integrated circuit (ASIC) that includes network controller 510, interface control logic 520 and SCSI controller 530. Network controller 510 is an NCR macrocell compatible with National DP83902A "ST-NIC" Ethernet controller, the details of which can be found in National Semiconductor's *Local Area Networks Databook*, National Semiconductor p/n 400055, National Semiconductor, 1993. Network controller 510 is designed to interface with CSMA/CA-type (carrier sense multiple access with collision detection) local area networks. SCSI controller 530 is an NCR 53C80 SCSI controller chip macrocell, the details of which can be found in "NCR 5380 Family" SCSI chip reference manual, NCR Microelectronics.

In this embodiment, network controller 510 connects with RJ-45 connector 301 through isolation transformer 1790. Network controller 510 is also coupled to an 8 KB SRAM 176 that is used as an input/output packet buffer for Ethernet data. This memory should preferably have an access time of about 70 ns or less.

Figure 7:
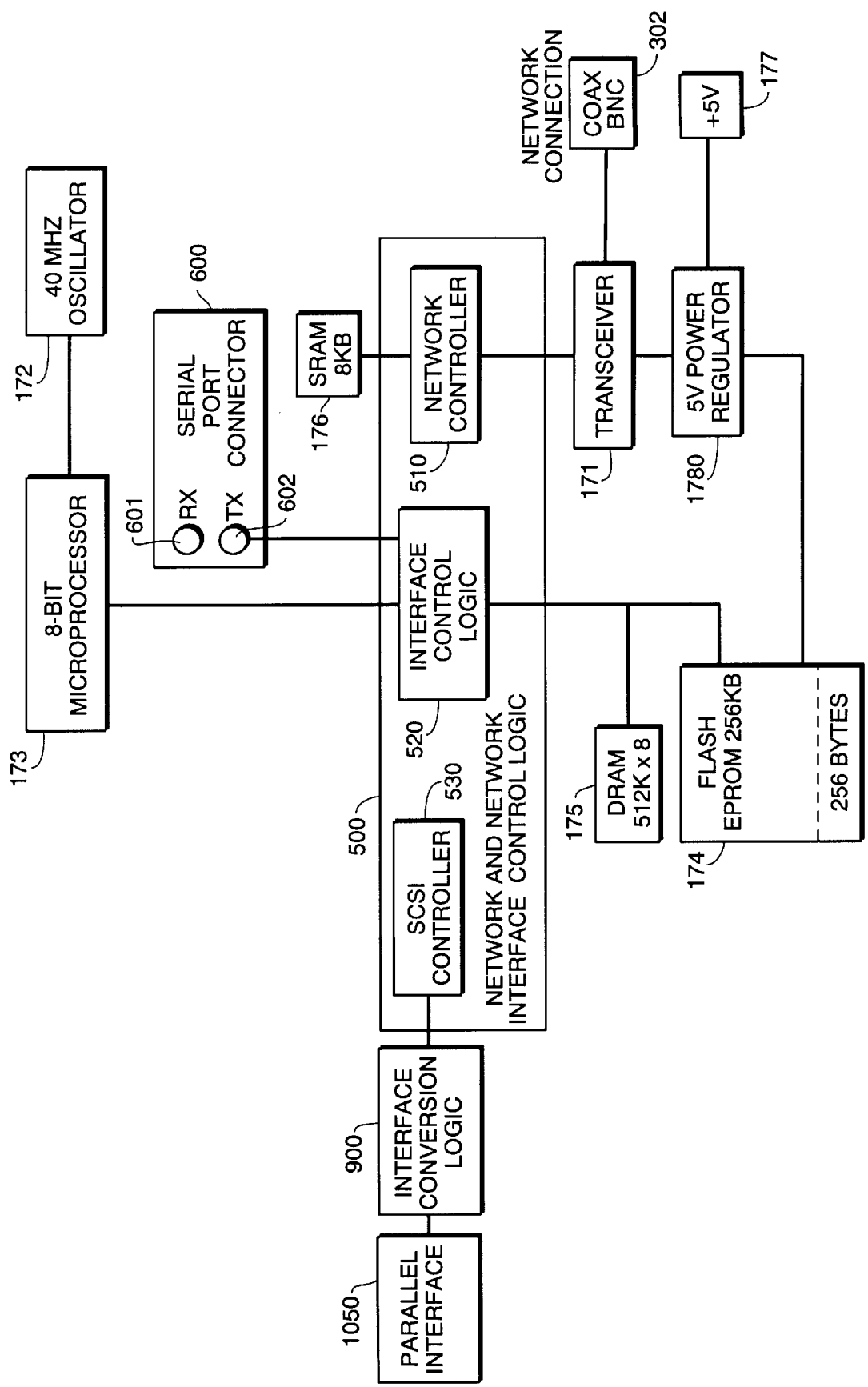
FIG. 7 is a functional block diagram of the network device having the BNC connector.

With respect to the embodiment mentioned above in connection with FIGS. 5A and 5B, which uses a coaxial network connection rather than the RJ-45 connection shown in FIGS. 4A and 4B, FIG. 7 shows network controller 510 which connects with coaxial connector 302 through transceiver 171, which is preferably a National Semiconductor DP8392 coaxial transceiver interface, the details of which can also be found in National's *Local Area Networks Databook*.

Interface control logic 520 provides an interface between network controller 510, microprocessor 173, and memory devices EPROM 174 and DRAM 175. EPROM 174 contains 256 bytes which are used as non-volatile storage for initialization data storage during power cycling of printer 102, on which NED 1001 is installed. No discrete NVRAM chip is needed in NED 1001 since NED 1001 can re-write individual locations of EPROM 174 thereby allowing storage in EPROM 174 of information which conventionally would be stored in an NVRAM. Network and printer configuration parameters are written into EPROM 174 when the printer is first installed onto the network to allow NED software to recover the installation parameters after printer power has been cycled off and on.

Interface control logic 520 also couples with serial port connector 600, which comprises a receive data pin 601 and a transmit data pin 602 that can respectively receive and transmit serial data streams for debugging purposes. Interface control logic 520 senses data present at the receive data line and samples the serial bits at regular intervals.

Interface control logic 520 further couples with SCSI controller 530, which controls the transfer of data from network and network interface control logic 500 to interface conversion logic 900. It should be noted that SCSI controller 530 and interface conversion logic 900 are not essential components in the operation of the present invention. Rather, Applicants have configured NED 1001 to include SCSI Controller 530 in an effort to re-use circuitry described in U.S. application Ser. No. 08/336,043, entitled "Smart Flash".

In this regard, interface conversion logic 900, which is preferably a MACH215 PAL, the details of which are described in Advanced Micro Devices Publication No. 16751, April 1994, is used to translate control signals received from SCSI controller 530 from SCSI protocol to control signals to drive a parallel interface, such as a Centronics interface. Thus, in a NED where a SCSI controller is not used to control parallel interface 1050, interface conversion logic 900 also will not be used.

The central controller of NED 1001 is microprocessor 173, preferably an Intel 80C188EA-20 8-bit processor, the details of which can be found in the 80C186EA/80188EA User's Manual, Intel p/n 270950-001, Intel Corp. Oscillator 172 provides a 40 MHz clocking signal to microprocessor 173. This processor is an 8-bit processor with direct memory access (DMA), interrupts, timers, and a DRAM refresh control. Other microprocessors, such as an AMD 80C188-20 8-bit microprocessor, might alternatively be used. 256 KB flash EPROM 174 and 512 KB DRAM 175 are coupled to microprocessor 173 via interface control logic 520.

Microprocessor 173 executes instructions in flash EPROM 174, which stores control firmware and printing application software. After power-on self-test (POST), code is selectively moved to the higher performance 512 KB DRAM 175, which should preferably have an access time of about 80 ns, for actual execution. Flash EPROM 174 can be reprogrammed, or "flashed", from LAN 100 as described in the aforementioned U.S. Ser. No. 08/336,043.

Figure 8:
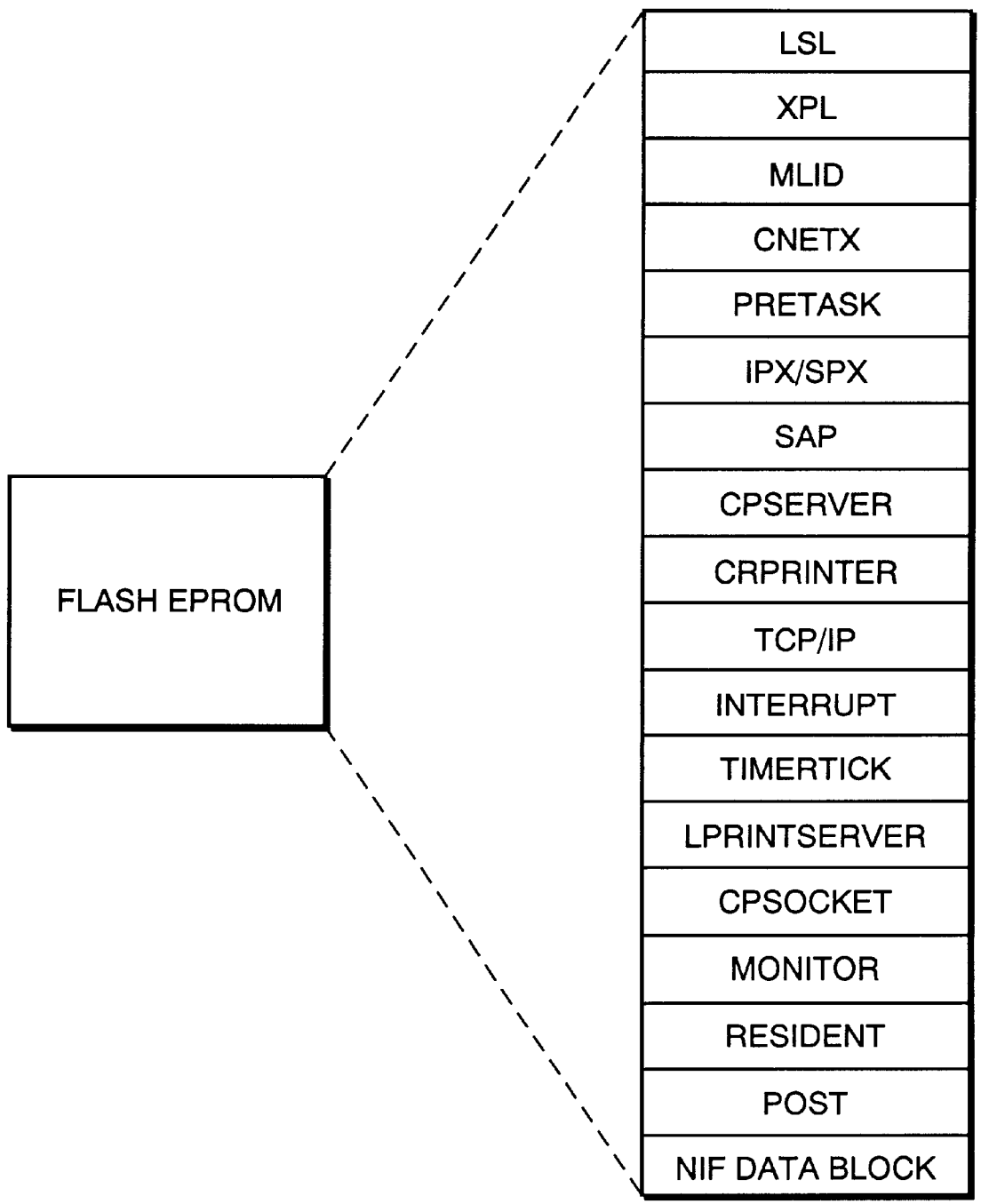
FIG. 8 is a diagram showing examples of several software modules that may be stored in the flash EPROM.

FIG. 8 illustrates several examples of blocks of code, or software modules, that are stored in flash EPROM 174. XPL module provides a standardized interface between printer 102 and NED 1001, and also is used to generate a testpage when NED 1001 detects a predetermined sequence of status changes in printer 102, as described in more detail below. MLID (Multi Link Interface Driver) is a piece of Novell code (Media Support Module, or MSM) linked together with a piece of customized code (Hardware Support Module, or HSM) that is the lowest level of network connection, while LSL (Link Support Layer) is a piece of Novell code that acts as a multiplexer between the low level MLID and the several protocol stacks above it. CNETX is customized code that turns local DOS-like function calls into network function calls, providing file functions like OPEN, READ, WRITE and CLOSE.

The PRETASK module is responsible for identifying what frame types are associated with the various possible protocol stacks, as described below. Because NED 1001 supports multiple protocol stacks, this module resides on NED 1001 as long as NED 1001 is running.

Novell's IPX/SPX protocol stack is contained in flash EPROM 174, and is supported by SAP, or Service Advertising Protocol. SAP is a Novell concept that allows devices to register themselves into the file server's bindery, which lists active and inactive network entities. Because Canon® devices can be a special kind of bindery item, SAP registers NED 1001 via CPSOCKET, and if NED 1001 is configured as a print server, i.e., as a standard bindery item, SAP also registers the print server with the NetWare bindery.

CPSERVER is a custom implementation of a Novell print server application. This module provides self-generated print banners, user notification of completion and exception status, and transmission of print data and status commands to the printer. This differs from the Novell print server in that CPSERVER is dedicated to driving the local printer (i.e., printer 102 in which NED 1001 is installed) and cannot drive any remote RPRINTERs. This program owns the print data channel for the duration of a print job. CRPRINTER is a custom implementation of a Novell RPRINTER print application. This module is an application that is sent data by a Novell print server application, i.e., PSERVER, elsewhere on LAN 100.

The TCP/IP protocol stack has User Datagram Protocol (UDP), Reverse Address Resolution Protocol (RARP) and BootP support within. INTERRUPT is the interrupt handler for the TCP/IP task, while TIMERTICK is the timer tick for UNIX TCP/IP network tasks. LPRINTSERVER is the TCP/IP print server application, and also owns the print data channel for the duration of a print job.

The CPSOCKET program runs for all protocol stacks. The program responds to requests for connection, requests for data download, or requests for services from remote utilities, and provides status and control to other tasks via interprocess communication. Because CPSOCKET typically owns the status and control channel between NED 1001 and printer 102, it is the only task that has the ability to obtain printer status via the status lines. CPSOCKET is responsible for the network connection and packet contents between the Novell-oriented status and control utility (CPNET), or between the UNIX-oriented status and control utility (cputil).

MONITOR is a customized multi-tasking monitor which performs task creation, task destruction and microprocessor dispatch. MONITOR also has memory management submodules MEMGET and MEMFREE. RESIDENT is a block of routines that provides generic services such as read and write to the 256 bytes of flash EPROM 174 which are used as non-volatile storage for initialization data storage during power cycling of printer 102, FLASH code, ROM based debugger, hardware timer tick and other basic features. POST is a power-on self-test module that checks the integrity of NED hardware and software at power-up.

Flash EPROM 174 also stores a Network Identification File ("NIF") data block which stores board-invariant information, which is unique for every network board, hardware configuration, board revision number and the like, as well as changeable information such as software version number. The information in the NIF data block is used to ensure that flash EPROM 174 is not reprogrammed with an incompatible image.

Specifically flash EPROM 174 stores "board" information such as model number, firmware level, and board revision number, as well as "network" information such as Media Access Control ("MAC") address, which is unique for every network board, board name, network frame type, primary file server identification, queues serviced, network protocol, sampling frequency, PSERVER name, zone-name, and the like.

NED FUNCTIONALITY

Broadly speaking, NED 1001 is an interactive network device which couples printer 102 to LAN 100, making printer 102 a responsive and interactive network member. NED 1001 receives print data and status requests from LAN 100 and transmits the print data to printer 102 for execution. In the case where the NED 1001/printer 102 interface is a uni-directional parallel interface such as a classic Centronics interface, limited amounts of status information can be received by NED 1001 from printer 102. Specifically, such an interface only includes four dedicated printer status lines, a "busy" status line, a "paper out" status line, an "I/O error" status line and an "online/offline" status line, from which microprocessor 173 can receive status information from printer 102 and transmit that status information to LAN 100.

Thus, NED 1001 can not only perform RPRINTER remote printer services and PSERVER print server functionalities, but can also offer to network members whatever status and control features are available from the peripheral interface. Through NED 1001, network members can access status information generated by and stored in NED 1001, such as number of print jobs and time per job, as well as limited printer status information, such as online/offline time and number of paper errors.

All network traffic enters and leaves NED 1001 through RJ-45 connector 301, which interfaces with network controller 510 through isolation transformer 1790 (or BNC connector 302, which interfaces with network controller 510 through transceiver 171). Network communications are transferred between connector 301 and the rest of the device, with network controller 510 along with interface control logic 520 controlling the flow of data between the network traffic on connector 301 and microprocessor's 173 data bus.

All software modules executed by microprocessor 173 are stored in flash EPROM 174. Some low-level modules which are always needed, such as timer tick, could be executed directly out of EPROM 174. For the most part, however, microprocessor 173 does not execute software modules directly from flash EPROM 174, but rather selectively loads those modules that are needed into DRAM 175 for execution from DRAM 175. By virtue of this arrangement, it is possible to select the specific modules that are retrieved from flash EPROM 174 for execution out of DRAM 175 so as to permit flexible configuration of NED 1001.

For example, because many communication protocol types may be broadcast on LAN 100, NED 1001 includes, in flash EPROM 174, software modules for supporting multiple protocols. NED 1001 monitors all network traffic on the heterogeneous network to determine the protocol type or types in use, and loads the protocol stack or stacks which correspond to the protocols it detects into DRAM 175.

Reprogramming flash EPROM 174 with a new image, which may include a new protocol stack, is also performed via DRAM 175. When a new image and a command to reprogram is received, such as a command received over the network or serial port connector 600, the software reprogramming module is loaded from EPROM 174 to DRAM 175. Microprocessor 173, executing this module from DRAM 175, confirms that the new firmware image is compatible with the configuration of NED 1001, and reprograms EPROM 174 if compatibility is confirmed, as described in U.S. application Ser. No. 08/336,043, entitled "Smart Flash".

Microprocessor 173, executing a loaded protocol stack out of DRAM 175, can send and receive network communications to and from other LAN members using that protocol. Print job data is received by network controller 510 and routed to microprocessor 173 through interface control logic 520. Microprocessor 173 formats the print job data and transmits the print job data to printer 102 over parallel interface 1050.

Serial port connector 600 is provided to allow NED 1001 to be debugged from an external computer. Serial port connector 600 is coupled to interface control logic 520, which accepts serial data from receive data pin 601 of serial port connector 600 and communicates the serial data bit-by-bit to microprocessor 173. Microprocessor 173 configures interface control logic 520 so that a start bit in the serial data activates the non-maskable interrupt of the microprocessor. Microprocessor 173 then assembles the data bits of the serial data into 8-bit words. In addition, interface control logic 520 monitors the data bus of microprocessor 173, and passes a serial stream of the data presented thereon to transmit data pin 602 of serial port connector 600.

NED ACCESS AND CONFIGURATION

To access the information available in NED 1001, a program called CPNET is resident on the network (in a Unix environment, cputil takes the place of CPNET), usually in a public directory, which can be accessed by the network administrator and which allows the network administrator to view the information contained in NED 1001. The CPNET program is capable of interfacing with NED 1001 (and other network members) and of performing such functions as displaying current information for a selected network device (interface information, control information, configuration information and statistics). CPNET may also activate or deactivate applications of NED 1001. Furthermore, CPNET enables PC 103 to display a log file, clear the log file, or write the log file to memory such as a local or a file system disk. CPNET can also display such printer-related statistical information on PC 103 as number of jobs, time per job, number of total jobs per day, and number of days since a last statistics reset. The CPNET program is also capable of displaying on PC 103 such network-related information as media related and non-media related information, and of clearing such network statistics.

CPNET enables access to additional control and monitoring features of printer 102. These features will enhance print service management across LAN 100 by allowing the network administrator's PC 103 to control and maintain printer 102 from a remote location. In summary, CPNET is the utility that exports printer control features to the network administrator, and allows the network administrator to view network and printer status, job statistics, and a log of the previously-processed jobs and error conditions. CPNET gathers the requested information by communicating with the NED-embedded software program module CPSOCKET.

The CPNET program also functions to configure, reconfigure, and initialize printer 102 attached to NED 1001. Specifically, the CPNET program can set up application information print services such as CPSERVER and CRPRINTER (which are generally similar to the PSERVER and RPRINTER software packages discussed above) and configure those applications. CPNET is also capable of setting and/or displaying device information such as time/date/time zone, buffer size, disk size, logging flag and log limit. CPNET can also restore default service settings, reset NED 1001, reboot NED 1001, display a NED power-on-self-test ("POST") error, display NED 1001's firmware level, display the current log file size, etc.

The CPNET program will configure NED 1001 to act as a print server with one attached printer and specifies its primary file server by which NED 1001 will determine which queues to service. CPNET is the program that supervises all like-customized devices on LAN 100 (e.g., other NEDs installed in other printers). CPNET accomplishes this task by communicating over LAN 100 with other network devices. CPNET is used to configure NED 1001 with the appropriate basic configuration information such as configuring NED 1001 as CPSERVER or CRPRINTER. CPNET also displays status information about NED 1001 (such as the firmware level loaded in NED 1001) and reports latent POST errors.

The CPNET program will scan over the network to see which other customized devices are available on LAN 100. The NEDs attached to such other customized devices SAP with their identification numbers, their device types, and their configuration states. CPNET will then construct a list of these NEDs and devices that will be presented to the network administrator to allow their configuration or reconfiguration.

NED 1001's firmware is configured initially, and can be reconfigured subsequently, by running CPNET on a network administrator's PC, such as PC 103. However, even in an unconfigured state, NED 1001 itself will always activate those software modules needed to perform basic communication with LAN 100. Using CPNET, the network administrator can determine, remotely, the current configuration of NED 1001, or he/she can change the configuration as desired. Since the configuration information is stored in EPROM 174 in NED 1001, the configuration information is retained across power cycles.

Upon initialization, CPNET will scan the bindery on file server 106 looking for all network devices having the customized software of NED 1001. CPNET then establishes a special connection with CPSOCKET using a customized client socket. Multiple connections with CPSOCKET are supported. CPSOCKET provides client service transactions such as NED control, device information, basic configuration information, application information, statistics, and logging. For example, CPNET can request that an application be configured or request that an already-configured application be activated or deactivated. CPSOCKET will insure that the appropriate option (protocol stack) is available and configured for an application before allowing the application itself to be configured. Within NED 1001, the CPSOCKET operational module is always activated.

As indicated above, CPSOCKET is the customized NED-embedded software which permits peripheral status and control information to be communicated to LAN 100. CPSOCKET runs on NED 1001 and monitors LAN 100 for communications addressed to both NED 1001 and printer 102. Specifically, CPSOCKET communicates with CPNET when it is running. CPSOCKET will also be responsible for the configuration of NED 1001. Further, CPSOCKET will configure and activate applications on NED 1001 at the request of CPNET. CPSOCKET also insures that the correct protocol stacks are available for each configured application. CPSOCKET will handle the settings of NED 1001 and the printer variables at the request of CPNET. Finally, the download facility (e.g., a network administrator's PC) will contact CPSOCKET to carry out any firmware downloading, such as flashing EPROM 174, that is required.

AUTOLOGGING FUNCTION

As background, few LAN peripherals maintain their own statistics, but NED 1001 includes the capability of logging the current status and daily statistics of printer 102 at midnight of each day. This relieves the network administrator from having to remember to do this on a daily basis. The status and statistics data may be stored in NED DRAM 175, for example. The size and area of the stored log file may be selected by the network administrator depending upon the remaining memory capacity of each memory, and the statistics required by the logging level selected by the network administrator. If the log file is filled, new log data will merely wrap around in the area of the memory, thereby replacing old log data with new log data.

Figure 9:
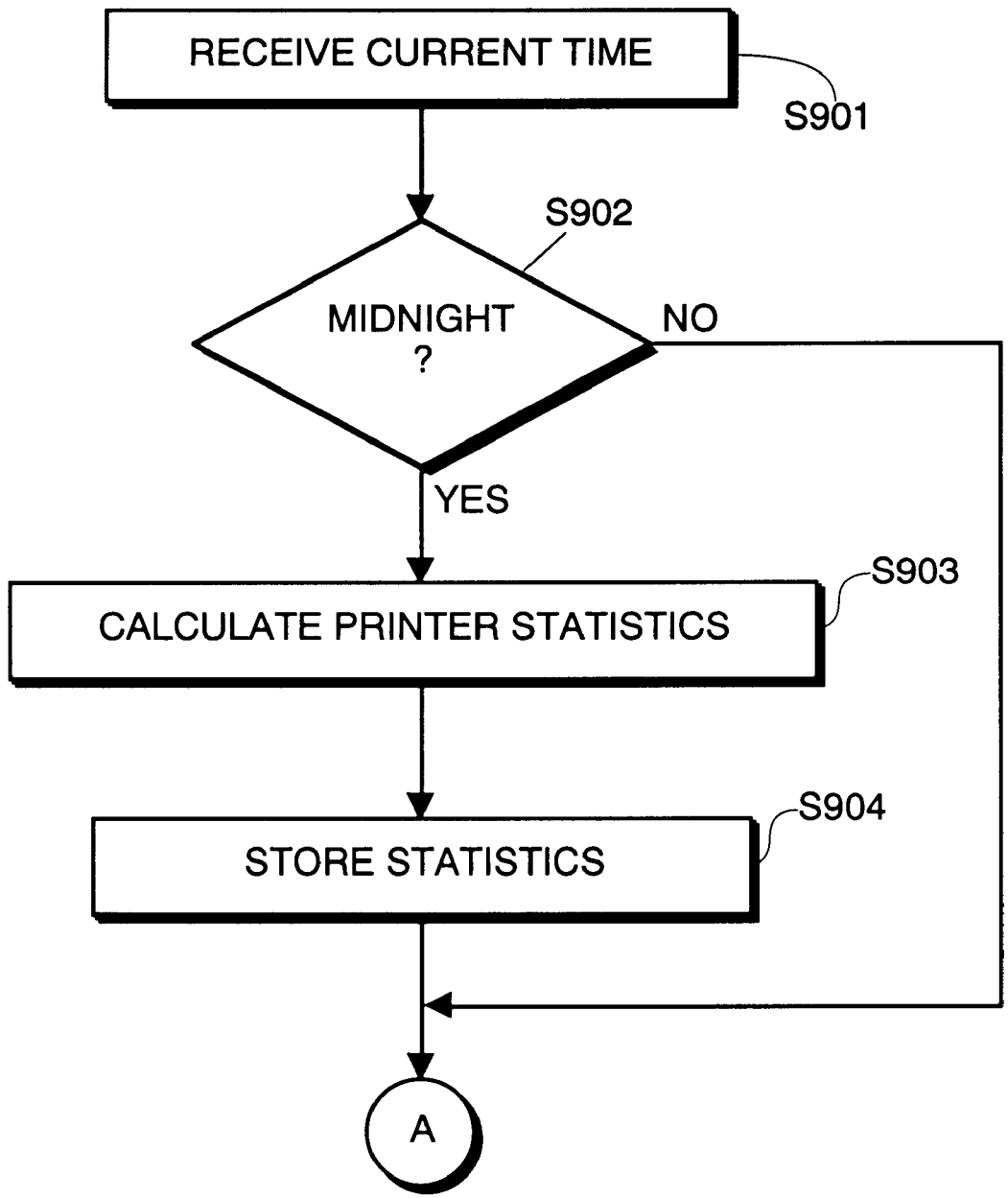
FIG. 9 is a flow diagram showing an autologging process performed in CPSOCKET.

FIG. 9 is a flow diagram generally showing a portion of the process performed in NED 1001 by CPSOCKET. At Step S901, NED 1001 receives the current time from LAN 100. For example, NED 1001 can query a nearby file server and request the time. After receiving the current time, the process proceeds to Step S902, where it is determined whether it is midnight, i.e., whether the returned time indicates a new date.

Steps S902 through S904 comprise a so-called "autologging" function which is carried out in order to automatically and systematically store status information regarding printer 102. In Step S902, if midnight has not been reached the procedure proceeds with other tasks. However, once midnight is reached, the process advances to S903, where microprocessor 173 calculates printer statistics such as jobs per day. NED 1001 keeps track of the number of jobs sent to printer 102 and the date. That information can be stored in the log file. In addition, NED 1001 can monitor the online status of printer 102, as well as I/O status, paper out status, and printer busy status. NED 1001 can use such information to calculate statistics such as number of jobs per day and number of minutes that printer 102 is offline. Further, if job headers for each job include data such as number of pages in a job, that information can also be logged. However, because the interface between NED 1001 and printer 102 is unidirectional, NED 1001 cannot log information such as the actual number of pages printed, the number of minutes of printing, or detailed status and error information for printer 102.

At Step S904, the printer statistics are transferred to memory. Alternatively, Steps S903 and S904 may be performed before Step S902, so that statistics are stored every minute.

Summarizing Steps S902 through S904, a method for logging system statistics of a printer connected via a unidirectional interface to NED 1001 for LAN communication includes counting on NED 1001 the number of jobs printed. NED 1001 then calculates daily statistics using the number of jobs and other status information. The daily statistics are then stored and may be accessed and remotely displayed using CPNET from a network administrator's PC, such as PC 103. As described above, an additional feature of the "autologging" function is that different levels of statistics may be logged. For example, at a basic level, statistics such as the number of jobs may be logged. At more advanced levels, both statistics and errors may be logged. These can include the number of jobs, failure conditions (although the failure conditions are limited to paper out and offline status), and job start and end times. The logging level is set by CPNET.

One option available to the network administrator when using CPNET is the option to select a display history information option, which allows the network administrator to display a set of job-related statistics that NED 1001 compiles. The displayed statistics include job averages, page averages, and performance data. In addition to statistics, NED 1001 can create a log entry for every print job. The network administrator can also select an option to initialize the statistics or write the log entry to a work station disk, or clear the log file, as configured by CPNET.

If the network administrator selects the display option, then CPNET directs a LAN request for the log file to a targeted NED via the LAN interface. At the targeted NED, CPSOCKET receives the request, retrieves the log file from wherever it is stored, and provides the log file to the network via a LAN interface for receipt by CPNET.

The log file includes values for the statistics which are divided into three categories: Daily, Cumulative, and Average. "Daily" shows the values for the current day. "Cumulative" shows the totals for all days since last reset, or since power-on for a printer without a disk drive. "Average" is the cumulative totals divided by the number of days since the last reset. For each of the three categories (unless CPNET has set the logging level to "NONE"), the NED maintains totals for the following values: days (number of days since a reset was issued or since power-on), print jobs processed, job information, error information, and offline time.

CPNET also retrieves the stored log file to the screen for viewing and printing. The log file is in reverse chronological order and includes the following record types. The precise content of the log file varies in accordance with the logging level set by CPNET, as summarized in Table 1. It is further noted that every item in the log file is stored with its date and time of entry.

TABLE 1

| Type | Data | Description |
|------|------|-------------|
| STD | <Days><Jobs><Offline> | daily statistics |
| STC | <Days><Jobs><Offline> | cumulative statistics |
| STA | <Days><Jobs><Offline> | average statistics |
| SOJ | <Application><User><Job><File server><Queue><Form> | start of job |
| INI | <NED Type><ROM/MAc Address><Printer Narne> | Initialization record |
| POW | <NED Type><ROM/MAC Address><Printer Narne> | power on record |
| RBT | <NED Type><ROM/MAC Address><Printer Narne> | reboot record |
| WAR | <Application><Warning> | warning |
| EOJ | <Application><User><Job><Disposition> | end of job |
| ERR | <Application><Error> | error |

As described above with respect to FIG. 9, Steps S902 through S904 comprise an automatic logging function in which peripheral statistics (e.g., number of pages printed per day) and error events are automatically logged (stored) for later retrieval; and wherein the logging level (statistical resolution) may be varied by the network administrator. In general, the network administrator may select a logging level, and then extract printer statistics and error events from the log file at any time. The network administrator's portion of such functions has been described above, and reference may be had to the discussion and tables set forth therein, especially Table 1, which indicates the content of the log file depending upon the logging level set by CPNET.

The network administrator may select four logging levels: NONE; AUTO; ERROR; and JOB. At the NONE level, no logging statistics are maintained (although they may still be calculated every minute and temporarily kept in NED DRAM 175). At the AUTO level, daily statistics are maintained for printer features such as printing days, jobs and offline time. The statistics are determined by NED 1001.

The ERROR logging level maintains the daily statistics discussed above, and also error conditions in printer 102 and also errors that occur in an application (i.e., CPSERVER). NED 1001 monitors printer 102 to detect printer error conditions such as "offline" or "out-of-paper". Application errors may include: fileserver down; primary fileserver unavailable; CPSERVER running elsewhere; print queue not found; etc.

The JOB logging level maintains the daily statistics and error conditions noted above and also maintains job start and job end information, which are determined by NED 1001. Of course, the number and types of logging levels, and the data retained in each logging level may be varied according to the particular peripheral and the particular LAN in which NED 1001 is installed.

Figure 10A:
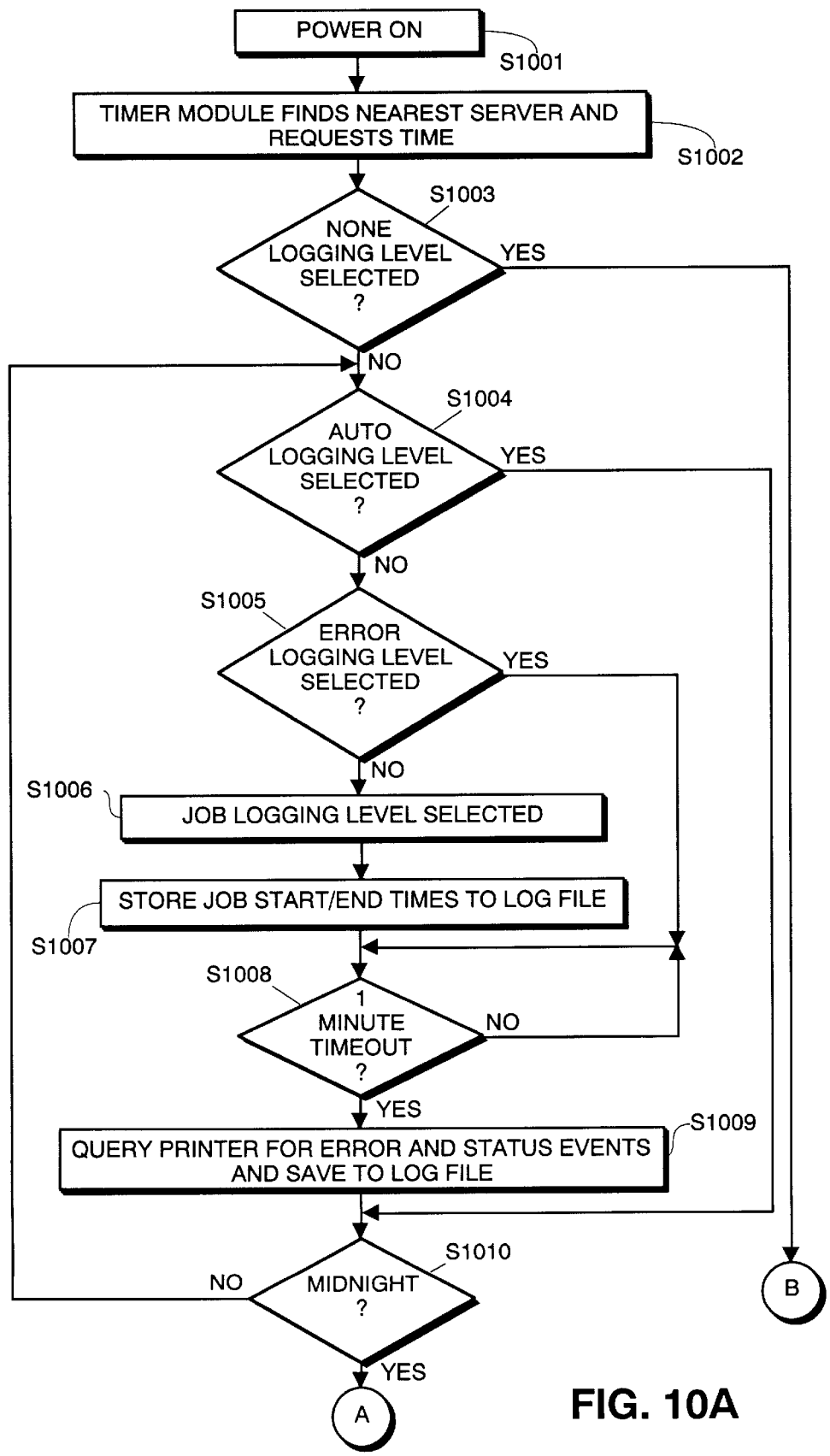
FIGS. 10A and 10B are flow diagrams showing autologging for different selectable levels of data.
Figure 10B:
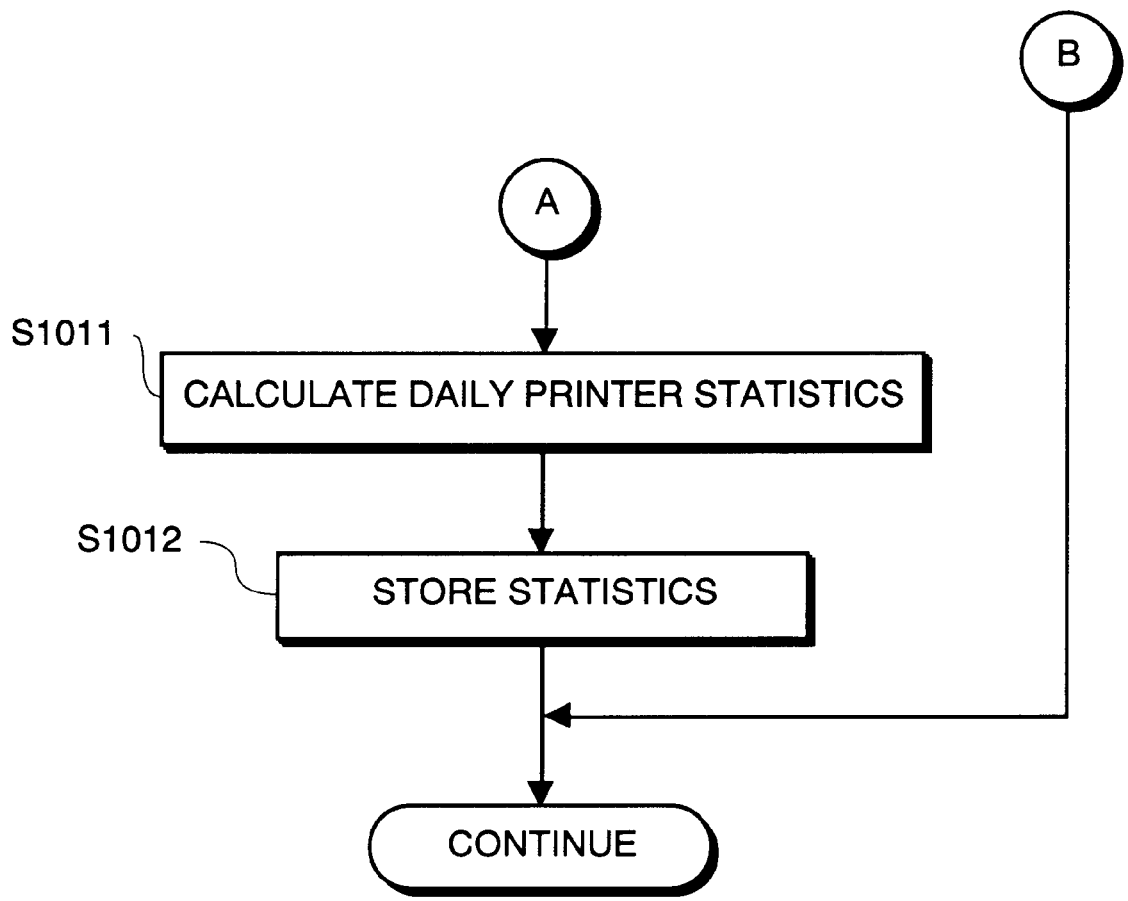

FIGS. 10A and 10B comprise a flowchart showing the overall operation of the automatic logging function within NED 1001. Reference may also be had to FIG. 9 and Table 1 noted above. At Step S1001, power is applied to NED 1001, and at Step S1002, a timer module finds the nearest server and requests the time. At Step S1003, it is determined whether the NONE logging level has been selected. If the NONE logging level has been selected, the process skips to the end of the flowchart where other processing not related to logging is continued.

If the NONE logging level has not been chosen in Step S1003, Step S1004 determines whether the AUTO logging level has been selected. If the AUTO logging level has been selected, the process proceeds to Step S1010, where midnight is awaited. However, if the AUTO logging level has not been selected, Step S1005 determines whether the ERROR logging level has been selected. Where the ERROR logging level has been selected, the process skips to Step S1008, where a one-minute timeout is awaited. However, if the ERROR logging level has not been selected, it is determined in Step S1006 that the JOB logging level has been selected. In this case, Step S1007 stores the job start and job end times to the log file. At Step S1008, the process waits for a one-minute period to expire, and then at Step S1009, it queries the printer for error conditions. In the context of a uni-directional interface, since no response could be received from an actual query, status lines, such as the online and paper out lines are merely checked. Thus, for either the ERROR or JOB level, the process checks the printer for the limited error events that can be detected and logs such error events in the log file as they occur.

Step S1010 waits for midnight to calculate and store the printer daily statistics. If midnight has not been reached in Step S1010, the procedure returns to Step S1004, where it is determined which logging level has been selected.

In Step S1011, the daily printer statistics are calculated. Thereafter, in Step S1012, the daily statistics and the error events are stored. Note here that the network administrator may select to store logging statistics and error events in any combination of memories, providing further flexibility to LAN 100.

The logging functions discussed above are quite significant in making the printer an interactive and responsive member of LAN 100.

OUTPUTTING LOG FILE

Figure 11:
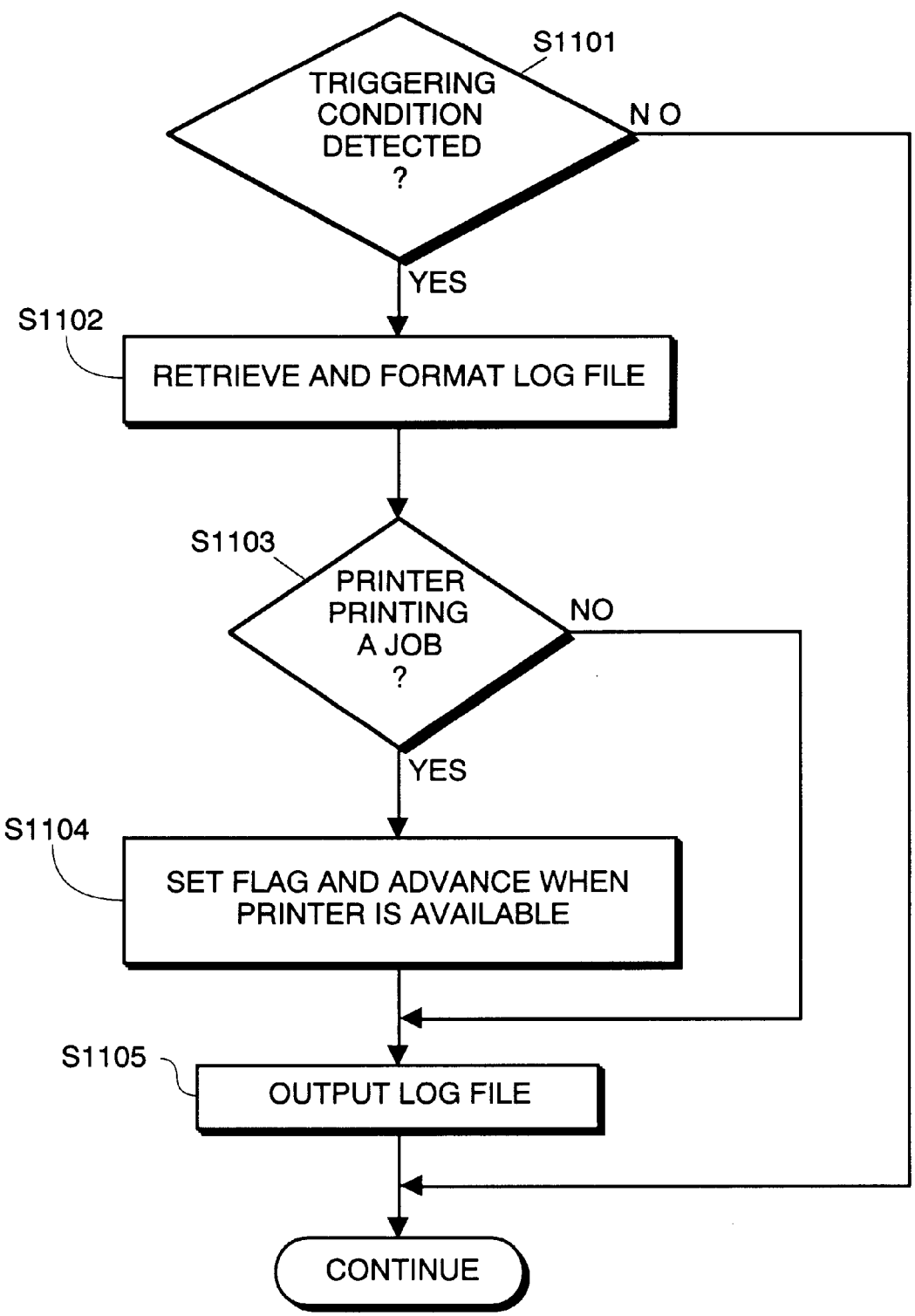
FIG. 11 is a flow diagram showing the process to output a log file.

FIG. 11 is a flow diagram showing a process for outputting from NED 1001 a log file generated by the autologging function. The log file will contain a varying amount of information concerning activity of NED 1001 and printer 102, depending on the logging level selected. As discussed above, the amount of logged information will also depend on the amount of information about printer 102 that is available to NED 1001.

The process steps of FIG. 11 illustrate a method for outputting a log file from a network device which interfaces between a local area network (LAN) and an image forming apparatus. A log file is maintained which logs at least one of image forming jobs received from the LAN and output to the image forming apparatus, device statistics and error information. In response to the detection of a triggering condition for initiating output of the log file, the log file is formatted into an image forming job, and the formatted log file is output to the image forming apparatus.

The process shown in FIG. 11 is implemented in XPL module running on NED 1001. In Step S1101, a determination is made whether a triggering condition is detected. Examples of conditions that may be used to trigger a print out of the log file are discussed below.

If the triggering condition is detected, the process advances to Step S1102. Otherwise, the process skips to the end and continues with other processing. In Step S1102, the log file is retrieved and formatted into an image forming job. This formatting preferably includes operations such as adding page headers, formatting the log file data to have an orderly arrangement on a printed page, and adding control characters, such as form feeds, to the data stream. The default mode is for the formatted log file data to be in ordinary ASCII character format, which will drive the majority of image forming apparatuses. If it is known that a particular image forming apparatus requires data in a different format, such as a PostScript format, NED 1001 can be configured to format the log file into the appropriate format. This configuration can be done, for example, using CPNET. Thereafter, the log file is sent to print.

If, however, an image forming job received from LAN 100 is being printed, the log file cannot be sent to printer 102 immediately because the data would become commingled with the active image forming job. Therefore, after formatting the log file the process advances to Step S1103, in which it is determined whether printer 102 is busy, e.g., if it is printing a print job. If printer 102 is not busy, the process advances to Step S1105 in which the log file is output to the image forming apparatus. On the other hand, if it is determined in Step S1103 that printer 102 is busy, the process advances to Step S1104.

In Step S1104, the process sets a flag in memory to indicate that a log file is waiting to be printed, and the process advances to Step S1105 when printer 102 becomes available. In this way, the log file takes the next place in line to use printer 102. Alternatively, the log file can be treated as a separate print application, with a round-robin approach being used to provide each print application an opportunity to send an image forming job. When the next opportunity for the log file to send a job occurs, the flag indicates that the log file is waiting to be printed and the log file is output.

In Step S1105, the log file is output by opening the print channel, i.e., taking control of the print channel, and sending blocks of the log file image forming job to printer 102. After outputting the log file, other processing continues.

By the process described above, an image forming job for the log file is generated at NED 1001, so that the log file can be printed, as desired, simply by causing a triggering event to occur. This function can be selected for any NED that is connected to a device capable of forming an image, e.g., a printer, a copier, or a facsimile device.

The log file outputting function is made flexible by permitting a variety of conditions to be selected as the triggering condition for initiating output. The selected triggering condition can be configured by using CPNET and stored in NED 1001. One such triggering condition is a remote command from the network administrator's PC. This command could be issued by selecting a menu option on CPNET. For example, a user who desires a copy of the log file for NED 1001 connected to printer 102, but who does not have access to NED 1001 via a PC, can telephone the network administrator and ask that the command for printing the log file be issued for the user's printer 102. The log file then prints out at the user's location in response to the command and is immediately available to the user.

Another triggering condition that can be selected is a time condition, i.e., the log file will be output by NED 1001 at a predetermined time. The predetermined time can be set using CPNET when the time triggering condition is selected. This triggering condition is especially useful with the "AUTO" level of logging data. The log file can be automatically updated at midnight, and a time triggering condition can be set to output the log file at fifteen minutes past midnight, for example.

Yet another triggering condition that can be selected is a log memory full condition. Since the log file is typically stored in an area of memory, such as a section of DRAM 175, there is a finite amount of space available for logging. The logging file will begin to wrap when the memory space allocated by the network administrator for the log file is full, and previously logged data will be overwritten. By triggering output of the log file when a full memory area is detected, a hard copy record of the log file is made before any data is overwritten and lost.

Still another triggering condition that can be selected is detection or recognition of an exception condition relating to the connection of the network board to the LAN. For example, an exception condition may be detected when connection with a file server is lost or when a cable to the network device is disconnected. If the LAN connection is lost, a remote PC cannot be used to access the log file. Therefore, it is desirable to output the log file to the attached peripheral when an exception condition is detected.

Still another triggering condition is recognition of an output command indicated by a predetermined pattern of status changes of printer 102. For example, three transitions from offline to online status within four seconds can be recognized as a triggering condition. If this type of triggering condition is also used for generating a testpage or for outputting formatted debug data, both of which are discussed below, accommodations must be made to distinguish the sequences for outputting a log file from the sequences for outputting a testpage and for outputting formatted debug data. For example, three online status changes can mean output of a log file is desired, four online status changes can mean output of formatted debug data is desired and five online status changes can mean output of a testpage is desired.

Figure 12:
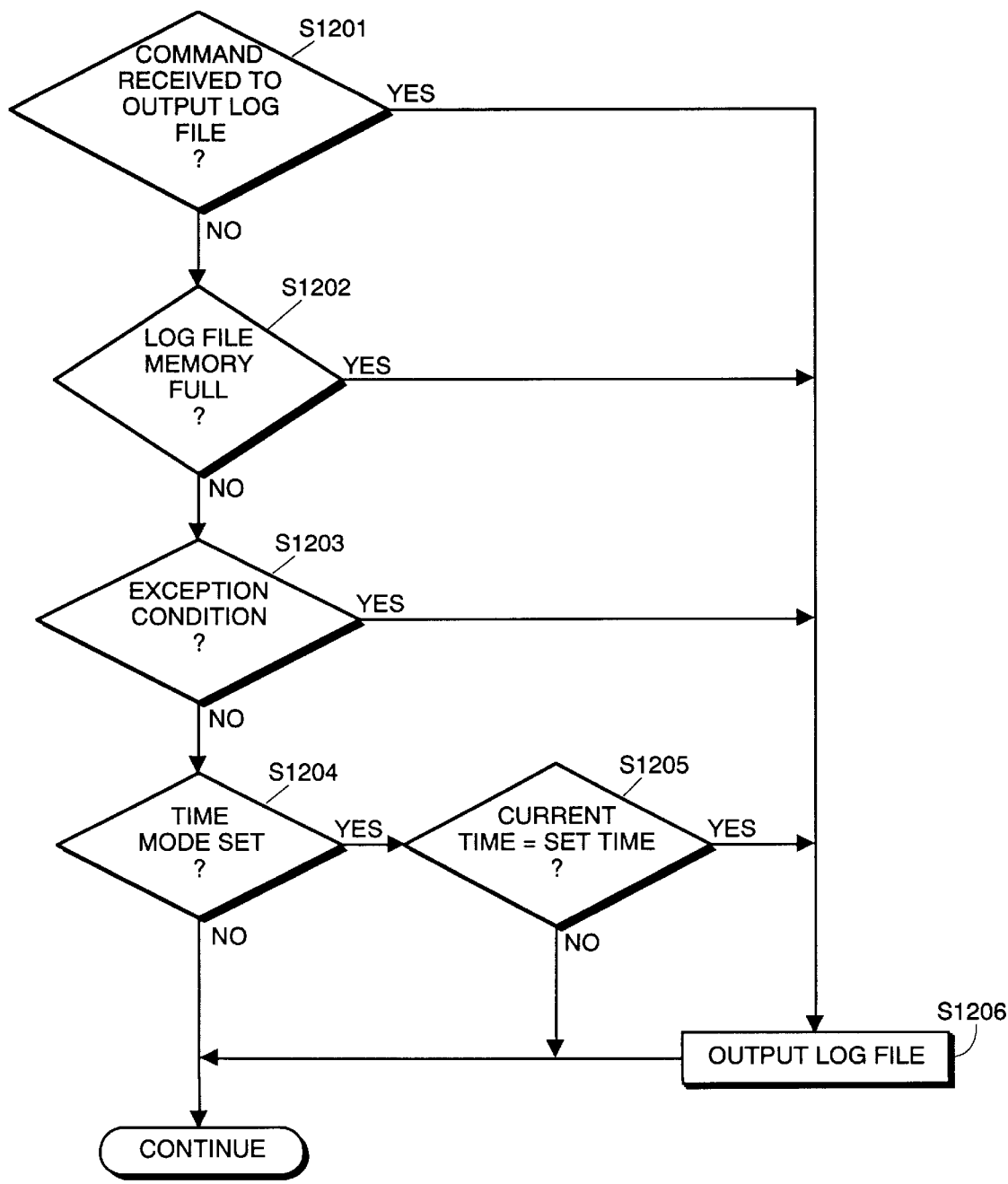
FIG. 12 is a flow diagram showing the detection of a triggering condition in response to various conditions.

Since NED 1001 and the CPSOCKET program monitor signals received via LAN 100, the current time, the memory status, and the occurrence of exception conditions, this information can be used in combination with configuration data regarding a triggering condition to initiate output of the log file. FIG. 12 shows a flow diagram for processing the different triggering conditions. In Step S1201, a determination is made whether a command to output the log file has been received. If so, the process advances to Step S1206. If no command has been received, the process advances to Step S1202, in which it is determined whether the log file memory area is full. If the memory area is full, the process advances to Step S1206. If the memory area is not full, the process advances to Step S1203.

In Step S1203, a determination is made whether an exception condition has been detected. If so, then the process advances to Step S1206. Otherwise, the process advances to Step S1204, in which a check is made to determine whether the time condition mode is set. If that mode is set, the process advances to Step S1205. If the time condition mode is not set, the process ends and CPSOCKET continues with other processing.

In Step S1205, the current time is compared to the time set for outputting the log file in the time condition mode. If the two times are equal, the process advances to Step S1206. Otherwise, the process ends and CPSOCKET continues with other processing. In Step S1206, the log file output routine is performed, i.e., Steps S1102 through S1105 of FIG. 11 are performed, and then CPSOCKET continues with other processing.

According to the process shown in FIG. 12, the log file will be output whenever a command is received to output the log file, whenever the log file memory area is full, and whenever an exception condition is detected. On the other hand, the log file will be output at a specified time only when the time condition mode has been set, for example by using CPNET. However, the process can be readily modified to allow the command, full memory, and exception condition triggering conditions to be disabled. A step similar to Step S1204 can be inserted after each of Steps S1201, S1202, and S1203 to determine if the time mode is set before outputting the log file in response to any of those triggering conditions.

Moreover, it is not necessary to process each of the triggering conditions sequentially. Rather, once any of the foregoing triggering conditions is detected, it is an appropriate point to insert Step S1201 and, if appropriate, branch to a routine to output the log file. Such a routine is shown in Steps S1102 through S1105. Additionally, the autologging function described above obtains the time to determine whether it is midnight, i.e., time to log statistics. This is an appropriate point to insert Steps S1204 and S1205 and, if appropriate, branch to the routine to output the log file.

Accordingly, there is a great deal of flexibility in setting and processing the triggering conditions for causing the network board to generate and output an image forming job for the log file.

FIG. 13 is an example of a sheet of paper 13100 having a printout of data that may be stored in a log file in NED 1001 when the AUTO level of logging is set and output to printer 102. A header 13010 identifies that the printout is for a log file and identifies the name of printer 102. Column 13001 indicates a date and Column 13002 indicates a time. Column 13003 indicates a record type, which corresponds to the record types indicated in Table 1. Columns 13004 through 13006 respectively indicate a number of days, a number of jobs, and a number of minutes printer 102 was offline.

The records are in reverse chronological order. Accordingly, the last record in the file is the first record that was generated, which is a Power On record 13007 (type POW; see Table 1). The data in the POW record is as follows:

E=Ethernet 1.39=Firmware Version

00680B=last digits of MAC (Media Access Control) Address

CMQA_LAB-A=Printer Name

As indicated above, the log file content will depend on the level of logging selected. Moreover, different formatting and/or labels may be used as desired.

GENERATING A TESTPAGE

Figure 14:
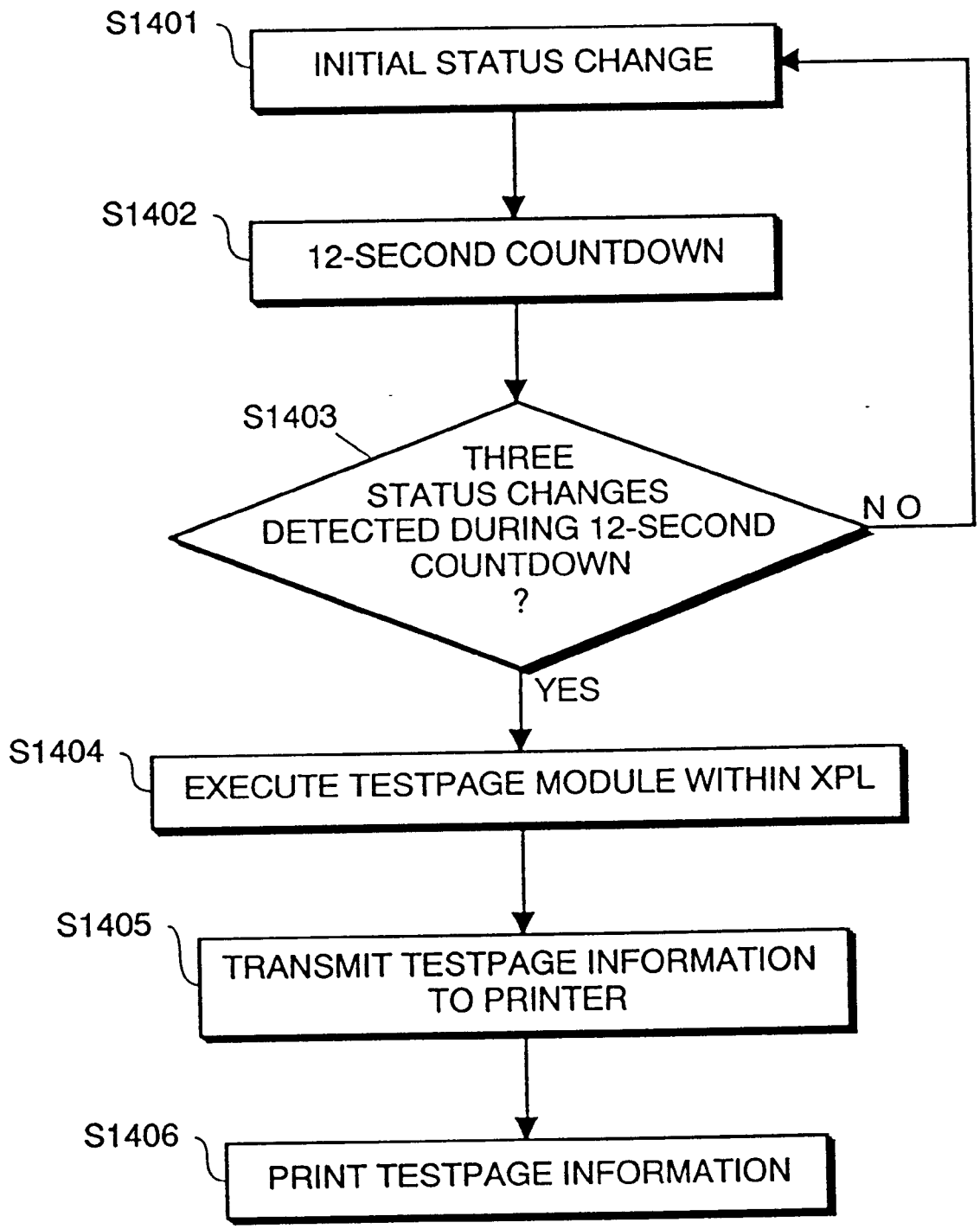
FIG. 14 is a flow diagram showing a process by which a testpage is generated and outputted.

FIG. 14 is a flow diagram which illustrates how NED 1001 can be triggered into generating and outputting testpage information based on status changes in printer 102 in which NED 1001 is installed, particularly based on status changes effected through front panel 1021. The testpage information includes at least one of board information and network information and is generated by manipulating a front panel of the peripheral to change a status of the peripheral. In the process, NED 1001 is coupled to a LAN by a LAN interface and coupled to the peripheral by a peripheral interface. The process includes monitoring the LAN interface for network information and manipulating the front panel of the peripheral a predetermined number of times over a predetermined period of time so as to generate a predetermined sequence of status changes in the peripheral. Also included in the process is a step of communicating the predetermined sequence of status changes to the network device over the peripheral interface. In response to the predetermined sequence of status changes, the network device generates testpage information which includes at least one of the board information and the network information. The testpage information is communicated to the peripheral over the peripheral interface and is output on the peripheral.

More specifically, beginning at Step S1401, microprocessor 173 monitors parallel interface 1050 for status changes in printer 102. As indicated above, in this case, parallel interface 1050 is a uni-directional parallel interface, such as a classic Centronics interface, which transmits only "busy", "paper out", "I/O error" and "online/offline" signals from printer 102 to NED 1001. These status changes are communicated to NED 1001 via dedicated status lines. In Step S1401, one or all of these status lines is monitored by microprocessor 173 in order to detect an initial status change in printer 102.

An initial status change will be detected, for example, in the case where printer 102 is initially online, in which case the "online/offline" status line is high, and then is set offline, in which case the status line goes low. In a similar manner, an initial status change can be detected in the "I/O error" line. For example, a status change will be detected in the case where a paper error occurs, such as removal of paper tray 1022 shown in FIG. 2A. In this case, microprocessor 173 detects that the "I/O error" line goes from high to low.

Microprocessor 173 may be set to interpret, as an initial status change, only a status change in the "online/offline" status line, a status change in the "I/O error" line, or a status change in either of the other two status lines.

In a preferred embodiment of the present invention, the initial status change is caused by manipulation of front panel 1021 shown in FIG. 2A. Specifically, a user can cause an initial status change in printer 102 by hitting the "online/offline" function button on front panel 1021. In this case, the initial status change would be transmitted to NED 1001 over the "online/offline" status line of parallel interface 1050. However, as indicated above, the initial status change could also be initiated by, for example, removal of paper tray 1022 from printer 102.

Once microprocessor 173 detects an initial status change in printer 102, microprocessor 173 begins a countdown, as shown in Step S1402. If, before that countdown ends, microprocessor 173 detects a predetermined number of status changes in printer 102, microprocessor 173 interprets the predetermined number of status changes as a request to generate and to output testpage information.

In a preferred embodiment of the present invention, the predetermined number of status changes is set to three and the countdown time is set to twelve seconds. It is believed that these settings are sufficiently unique to prevent testpage information from being printed out inadvertently, without making the process difficult to operate. However, these settings can be set as desired in the embedded firmware.

Additionally, as was the case above with respect to the initial status change, the predetermined number of status changes can be input via the "online/offline" function button on front panel 1021 or by causing a paper error, such as removal of paper tray 1022.

If, as shown in FIG. 14, Step S1403, the predetermined number of status changes(sometimes referred to as "transitions") are not detected by microprocessor 173 before the countdown ends, no testpage information will be generated or output. Instead, the process proceeds to Step S1401, whereafter any status change is interpreted as an initial status change, which restarts the countdown.

If, however, the predetermined number of status changes occurs within the predetermined period of time, microprocessor 173 interprets this as a request to generate and to output testpage information. Therefore, the process proceeds to Step S1404.

In a preferred embodiment of the present invention, a testpage module which is a subtask of XPL software module stored in flash EPROM 174 is used to generate the testpage information.

Thus, in Step S1404, upon determining that a predetermined sequence of status changes (i.e, the predetermined number of status changes within the predetermined time) has occurred in printer 102, microprocessor 173 executes the testpage module within XPL module to generate the testpage information.

Figure 15:
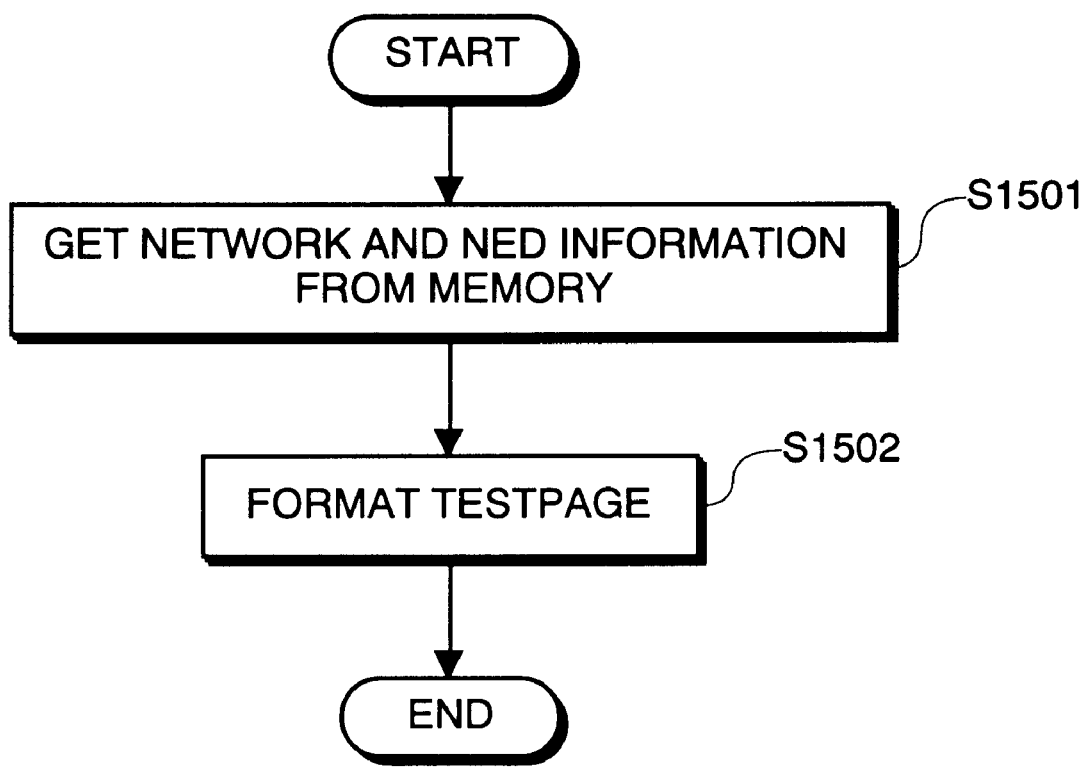
FIG. 15 is a flow diagram showing operation of a testpage module within XPL module.

FIG. 15 is a flow diagram showing how the testpage module within XPL module generates the testpage information. More specifically, in Step S1501, the testpage module reads data for a testpage out of EPROM 174. Information for the testpage can include "board" information such as model number, firmware level, and board revision number, as well as "network" information such as MAC address, board name, network frame type, primary file server identification, queues serviced, network protocol, sampling frequency, PSERVER name, zone-name, and the like, all of which, as indicated above, is stored in EPROM 174. Likewise, the network information can include "no network connection". This information is obtained by microprocessor 173 which monitors the LAN interface to determine whether NED 1001 is connected to a network. Microprocessor 173 can also obtain updated network information by monitoring the network interface. Exactly which of the foregoing information is used to generate a testpage is set in the testpage module within the XPL module, and can be reset as desired.

Figure 16:
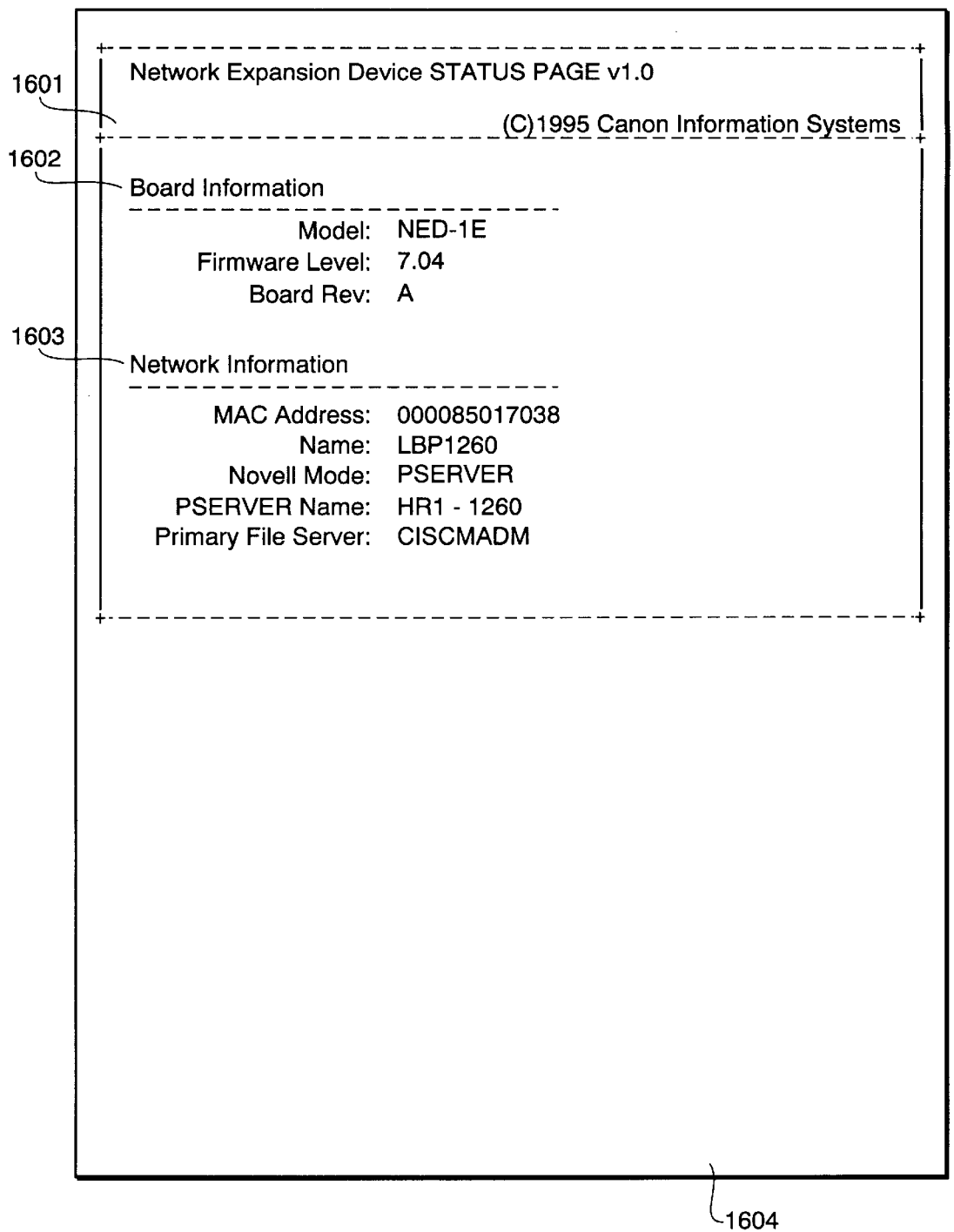
FIG. 16 shows an example of a testpage.

In Step S1502, the testpage module formats the testpage information read out in Step S1501. In a preferred embodiment of the present invention, the testpage information is formatted as shown in FIG. 16. FIG. 16 depicts a testpage generated by NED 1001 and printed out on a sheet 1604 by, e.g., a Canon LBP 1260 laser printer. As shown in FIG. 16, the testpage includes header 1601 for identifying the testpage, board information 1602, and network information 1603. The format shown in FIG. 16 can be set as desired in the testpage module within XPL module. Furthermore, as indicated above, information in addition to that shown in FIG. 16 can be included on the testpage, such as "no network connection", etc.

After the testpage information has been generated, the process returns to FIG. 14, where in Step S1405, the testpage information is transmitted over parallel interface 1050 to printer 102. In Step S1406, printer 102 prints out the testpage information received from NED 1001 as a testpage, an example of which, as indicated above, is shown in FIG. 16.

Alternatively, although not shown in the figures, the testpage information could be output to LAN 100. In this case, the testpage information could be stored in file server 106 so that other PCs on the network could access the testpage information relating to printer 102.

OUTPUTTING FORMATTED DEBUG DATA

Figure 17:
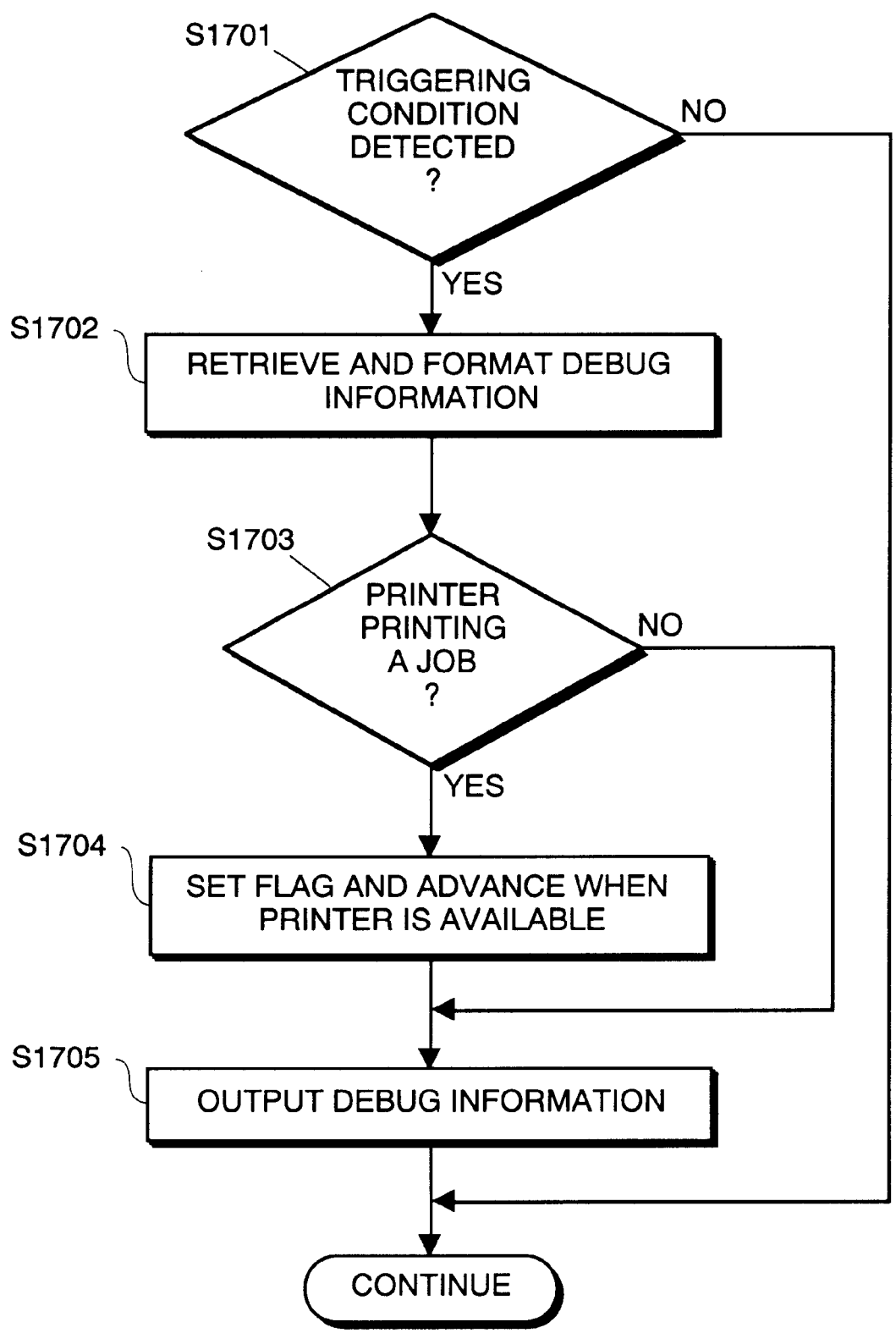
FIG. 17 is a flow diagram showing the process for outputting debug information.

FIG. 17 is a flow diagram illustrating a process for outputting formatted debug information from NED 1001. This debug information is useful in determining the source of a problem when an image forming device is not working properly. In particular, the debug information can help determine whether a problem exists in the configuration or operation of the network board or in the image forming device. Generally speaking, in the preferred embodiment the debug information is a dump of the memory contents of NED 1001. The debug information that is output includes, for example, the contents of EPROM 174, relating to the network board configuration, and the contents of DRAM 175, relating to the operation of the network board in receiving image forming jobs from the LAN and outputting image forming jobs to the attached image forming device. This information may also include network statistics such as the number of collisions and the number of packets sent and received.

The process steps of FIG. 17 illustrate a method for outputting formatted debug information from a network device which interfaces between a local area network (LAN) and an image forming apparatus, such as printer 102. Debug information is stored in the network device relating to the operation of the network device when receiving image forming jobs from the LAN and when outputting the image forming jobs to the image forming apparatus. In response to the detection of a triggering condition for initiating the output of the debug information, the debug information is formatted into an image forming job, and the formatted debug information is output to the image forming apparatus.

The process of FIG. 17 is implemented in a section or subtask of the CPSOCKET program running on NED 1001. In Step S1701, a determination is made whether a triggering condition is detected. Examples of conditions that may be used to trigger a print out of the debug information are discussed below.

If the triggering condition is detected, the process advances to Step S1702. Otherwise, the process skips to the end and continues with other processing. In Step S1702, the debug information is retrieved and formatted into an image forming job. This formatting preferably includes operations such as adding page headers, adding data to indicate the memory addresses from which the debug information was retrieved, formatting the debug information to have a particular arrangement on a printed page, and adding control characters, such as form feeds, to the data stream.

In the preferred embodiment, the debug information, which is received from LAN 100 in binary format, is also converted from binary format into hexadecimal ASCII characters. This type of formatting provides a way to examine the actual content of memory without allowing the stored data to control or affect the operation of the image forming apparatus. For example, a stored byte may correspond to a printer control character. If sent directly to the printer, the byte would cause a printer control operation, e.g., a form feed operation. Therefore, a byte such as $0C_H$ is converted into data corresponding to the hexadecimal ASCII characters "0" and "C", which are 33 and 43, respectively. In this way, the data is printed out as ASCII characters without affecting the control of the printer, and the actual hexadecimal format content of the memory can be viewed.

After the debug information is formatted, it is ready to be printed. However, if an image forming job received from LAN 100 is being printed, the debug information cannot be sent to printer 102 immediately because the data would become commingled with the active image forming job. Therefore, after formatting the debug information the process advances to Step S1703, in which it is determined whether printer 102 is busy (e.g., printer 102 is printing a print job). If printer 102 is not busy, the process advances to Step S1705, in which the debug information is output to the image forming apparatus. On the other hand, if it is determined in Step S1703 that printer 102 is busy, the process advances to Step S1704.

In Step S1704, the process sets a flag in memory to indicate that the debug process is waiting to print debug information, and the process advances to Step S1705 when the print channel in printer 102 becomes available. In this way, the debug information takes the next place in line to use printer 102.

In Step S1705, the debug information is output by opening the print channel, i.e., taking control of the print channel, and sending blocks of the debug information image forming job to printer 102. After outputting the debug information, processing continues.

By the process described above, an image forming job for the debug information is generated at NED 1001, so that the debug information can be accessed through the device attached to NED 1001 without the need for a computer to access NED 1001. This function can be selected for any NED that is connected to a device capable of forming an image, e.g., a printer, a copier, or a facsimile device.

The debug information outputting function is made flexible by permitting a variety of conditions to be selected as the triggering condition for initiating output. The selected triggering condition can be set by using CPNET and can be stored in NED 1001. One such triggering condition is a remote command from the network administrator's PC. This command could be issued by selecting a menu option on CPNET. For example, a user who desires a copy of the debug information for NED 1001 connected to printer 102, but who does not have access to NED 1001 via a PC, can telephone the network administrator and ask that the command for printing the debug information be issued for the user's printer. The debug information then prints out at the user's location in response to the command and is immediately available to the user.

Another triggering condition that can be selected is detection of an exception condition relating to the connection of the network device to LAN 100. For example, an exception condition may be detected when connection with a file server is lost or when a cable to the network device is disconnected. If the LAN connection is lost, a remote PC cannot be used to access the debug information. That information might provide an indication of why the connection was lost. Therefore, it is desirable to output the debug information to the attached peripheral when an exception condition is detected.

Still another triggering condition is recognition of an output command indicated by a predetermined pattern of status changes of printer 102. For example, three transitions from offline to online status within four seconds can be recognized as a triggering condition. If this type of triggering condition is also used for outputting a log file or outputting a testpage, both of which were discussed above, accommodations must be made to distinguish the sequences for outputting debug information from the sequences for outputting a log file and for outputting a testpage. An example of such an accommodation is described above, and for the sake of brevity, will not be repeated here.

Figure 18:
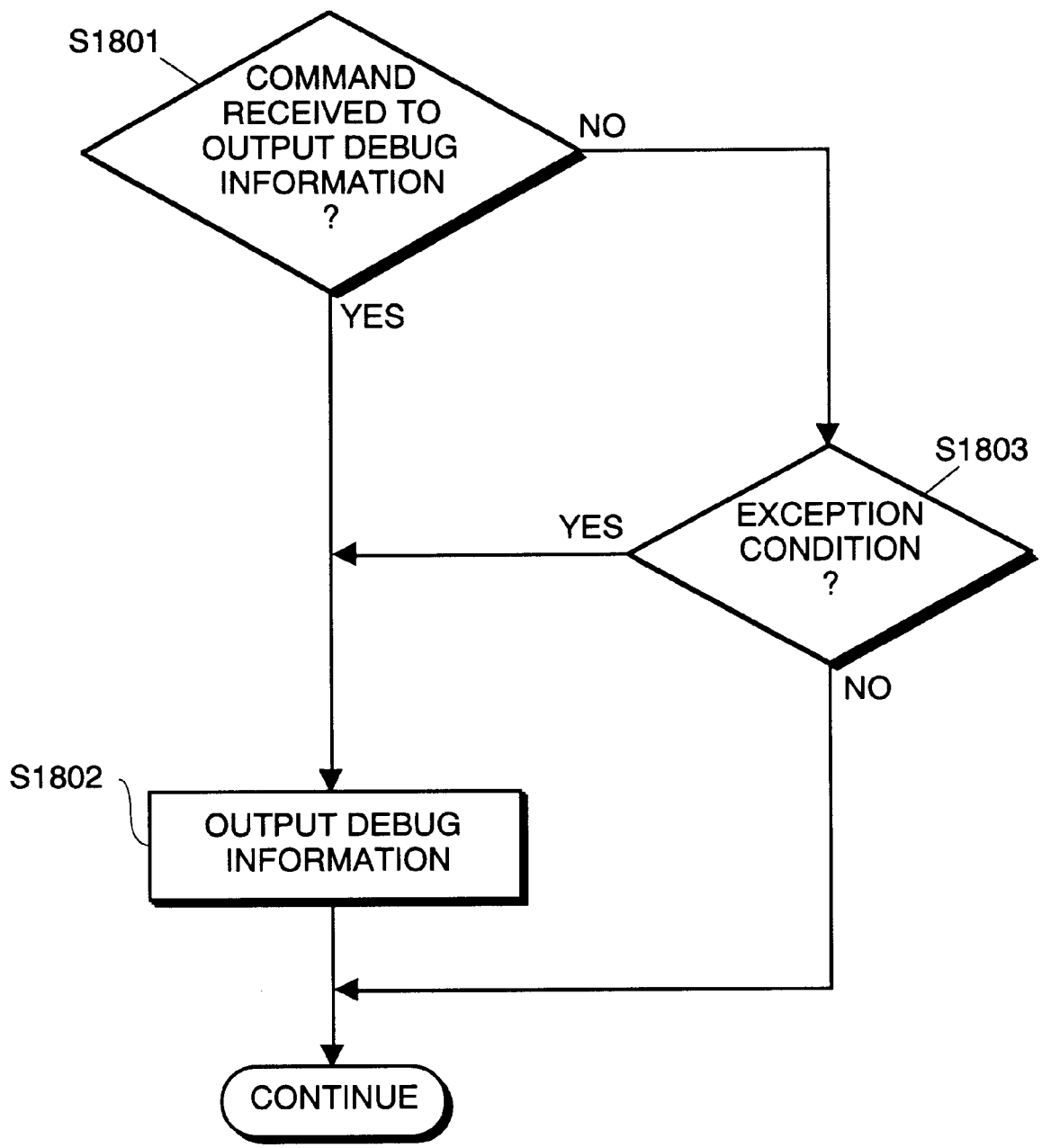
FIG. 18 is a flow diagram showing the process to detect a triggering condition for various possible conditions.

FIG. 18 shows a flow diagram for processing the different triggering conditions. In Step S1801, a determination is made whether a command to output the debug information has been received. If so, the process advances to Step S1802. If no command has been received, the process advances to Step S1803, in which it is determined whether an exception condition has been detected. If so, then the process advances to Step S1802. Otherwise, the process ends, and other processing continues. In Step S1802, the debug information output routine is performed, i.e., Steps S1702 through S1705 are performed, and then other processing continues.

According to the process shown in FIG. 18, the debug information will be output whenever a triggering condition is received to output the debug information or whenever an exception condition is detected. However, the process can be readily modified to allow the command and/or exception condition triggering conditions to be disabled. A step similar to Step S1204 can be inserted after each of Steps S1801 and S1803, to determine if the time mode is set before outputting the debug information in response to either of those triggering conditions.

Moreover, it is not necessary to process each of the triggering conditions sequentially. Instead, they may be processed at different points in the execution, and each may be independently triggered as shown in Steps S1702 through S1705 of FIG. 17. For example, one test can be made in CPSOCKET to determine if a command, such as a request to output debug information, has been received from a remote workstation. If this occurs, a flag is set. This flag is sensed at Step S1801 within the XPL execution. On the other hand, exception conditions such as a disconnect status can be monitored by another software module such as the MLID. Once again, a flag is set. This event is sensed at Step S1803 and, if appropriate, the debug information is also output.

Accordingly, there is a great deal of flexibility in setting and processing the triggering conditions for causing the NED to generate and output an image forming job for the debug information.

Figure 19:
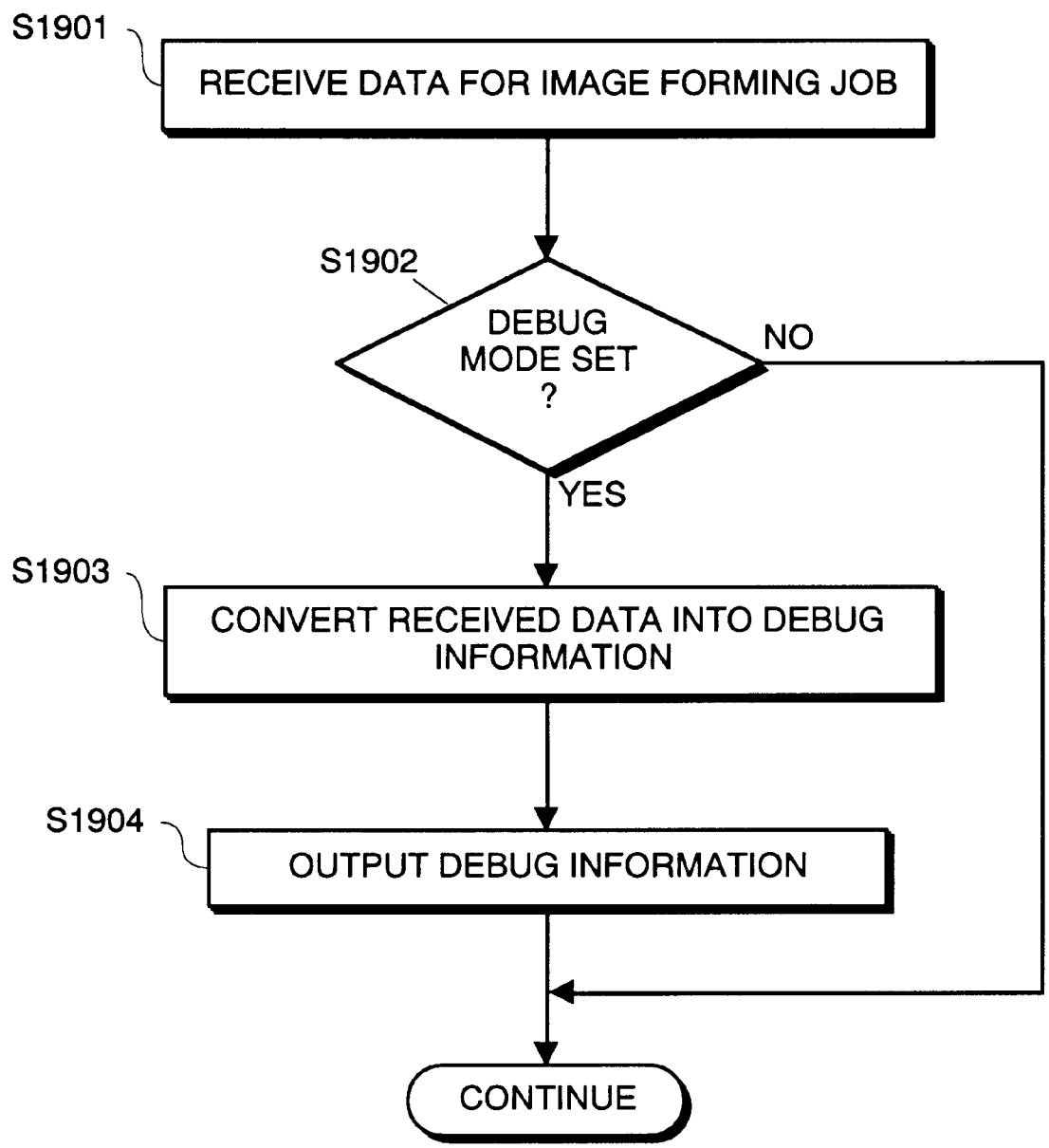
FIG. 19 is a flow diagram showing a process for outputting debug information for received image forming data.

FIG. 19 is a flow diagram showing a variation on the process described with respect to FIG. 17. In this variation, the source of debug information is data received from LAN 100 for an image forming job, instead of data stored in memory.

The process steps of FIG. 19 illustrate a method for reformatting debug information received from the LAN so that the reformatted debug information can be printed. According to the method shown in FIG. 19, debug information is received from the LAN as a binary code and is preceded by a command which sets a re-format mode for NED 1001. In the re-format mode, NED 1001 reformats the debug information by converting the binary code into equivalent hexadecimal ASCII characters. The reformatted debug information is then output for printing on printer 102.

In Step S1901, data is received from LAN 100. In Step S1902, a determination is made whether a debug mode, i.e., a data conversion mode, has been set. This mode can be set using CPNET. For example, CPNET can set configuration data in EPROM 174 to place NED 1001 in the data conversion debug mode for all subsequent jobs. Alternatively, NED 1001 could be configured to perform data conversion only for the first subsequent image forming job. If the data conversion mode is detected in Step S1902, the process advances to Step S1903. Otherwise, the process skips ahead to the end of the process and continues with other processing, such as outputting the unconverted data to the image forming apparatus.

In Step S1903, the data is converted from binary code to corresponding hexadecimal ASCII characters, as indicated above. The process then advances to Step S1904, and the hexadecimal ASCII characters constituting the debug information are output. In this manner, the actual data received by NED 1001 from LAN 100 is output, and a determination can be made of whether the correct data is being received and whether the printer is responding properly to the received data. Thus, formatting and outputting data received by NED 1001 provides debug information that can help diagnose problems just as formatting and outputting the data stored in NED 1001 can provide debug information.

Figure 20:
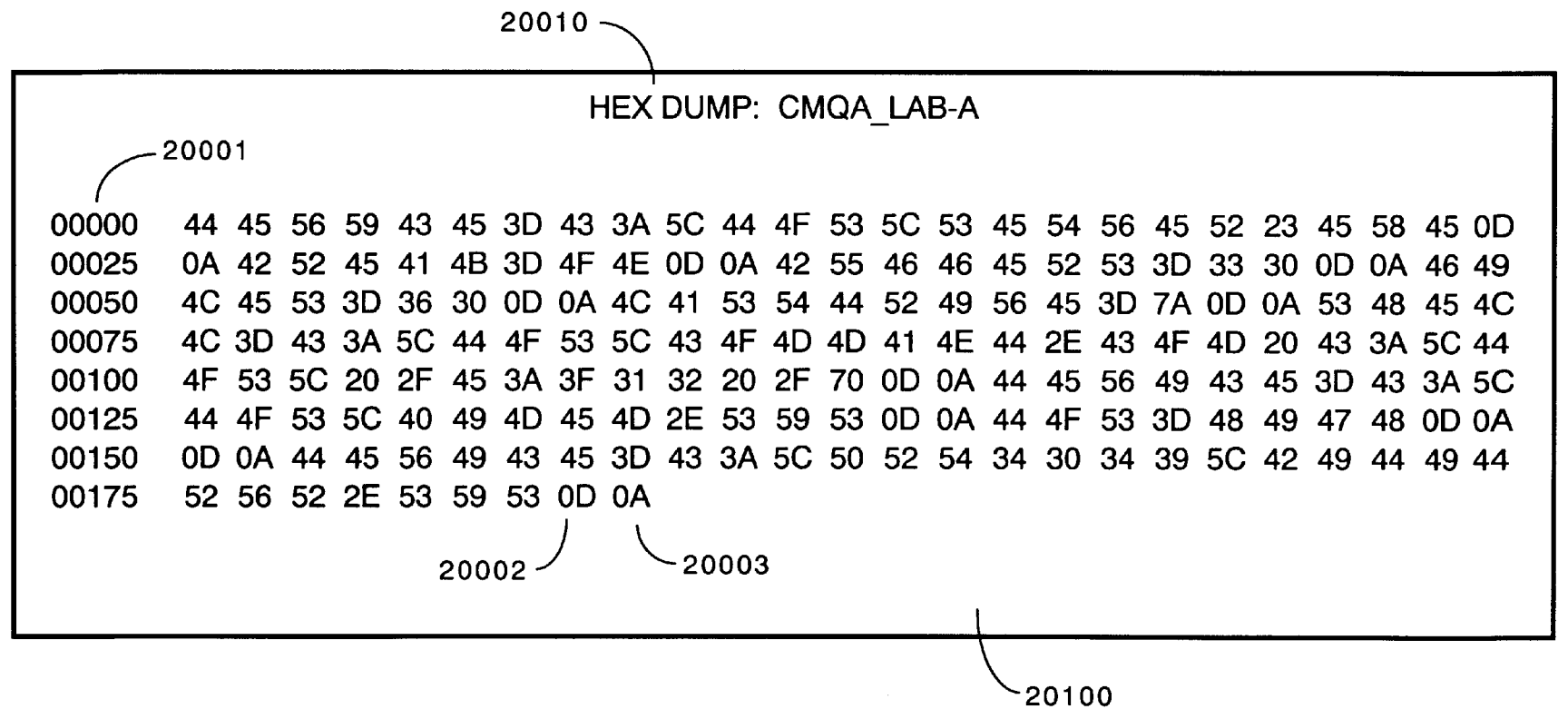

FIG. 20 shows an example of a sheet of paper 20100 on which is printed representative debug information from NED 1001. Header 20010 is a page header identifying the printout as a hex dump and identifying printer 102. Column 20001 indicates the memory offset address of the leftmost byte in each row. Reference numerals 20002 and 20003 indicate hexadecimal data $0D_H$ and $0A_H$, respectively, which correspond to a carriage return instruction and a line feed instruction. That data would not be printable if sent to printer 102, but instead would cause a carriage return and a line feed operation. However, since the binary data is converted to the hexadecimal ASCII characters "0" "D" and "0" "A" before being sent to printer 102, the stored hexadecimal values are displayed as 0D and 0A.

Other labels and arrangements of the debug information can be used if a different format is desired.

SECOND EMBODIMENT

According to the embodiment described above, the present invention maintains and outputs a log file having limited information regarding printer 102, because NED 1001 communicates with NED 1001 via a uni-directional interface. The information concerning printer 102 that is available for logging by the network device can be expanded by using a network device that communicates with printer 102 via a bi-directional peripheral interface. Examples of such network devices are described in U.S. Pat. No. 5,323,393, which describes a network device having a bi-directional SCSI interface and U.S. patent application Ser. No. 08/336,062, entitled "Network Protocol Sensor", which describes a network device having a bi-directional shared memory interface.

Additionally, for an externally mounted network device, such as a NED, a bi-directional parallel interface, such as an IEEE-1284 parallel interface, can also be used as the peripheral interface, in place of a classic Centronics interface. The IEEE-1284 interface is described in "Standard Signalling Method For Bi-Directional Parallel Peripheral Interface For Personal Computers", IEEE-1284/D2, September 1993. Likewise, an IrDA (Infrared Data Association) interface, such as that described "Infrared Data Association: Proposal For The Use Of ISO 8073 As An IrDA Transport Protocol", Hewlett Packard, Apr. 22, 1994, can be used as the peripheral interface.

A second embodiment is described below in the context of a network device having a bi-directional peripheral interface, there a shared memory interface with printer 102. In the following description, elements like those described above are referred to by like reference numerals.

THE NETWORK BOARD

In this embodiment, the present invention is embodied in a network board (or "NEB") which provides hardware, software and firmware solutions for making a network peripheral, such as a printer, an intelligent, interactive network member, capable not only of receiving and processing data from the network, but also of transmitting to the network significant amounts of data about the peripheral such as detailed status information, operational parameters and the like. It is also possible to use the invention in other network peripherals such as facsimile, copier, image processing and other such network peripherals, particularly image processing peripherals. Integration of such hardware, software and firmware with the peripheral eliminates the need to dedicate a personal computer to act as a peripheral server.

Figure 21:
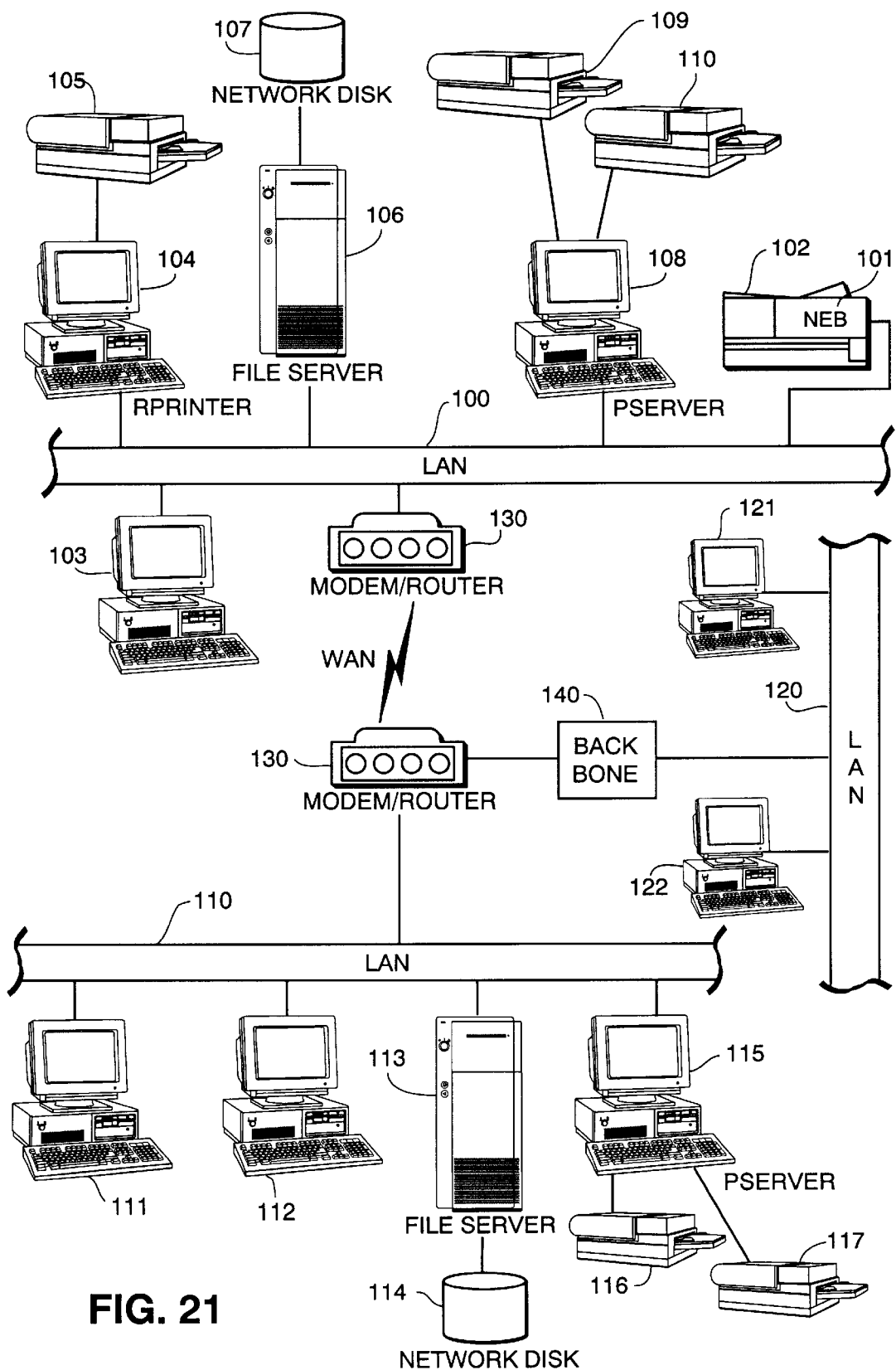
FIG. 21 is a diagram of a local area network and wide area network to which a network board is coupled.

FIG. 21 is a diagram showing the present invention incorporated into a NEtwork Board (NEB) 101, which is coupled to a printer 102 in lieu of NED 1001 shown in FIG. 1. The remaining elements shown in FIG. 21 are identical in both structure and function to those shown in FIG. 1. Accordingly, a description thereof will not be repeated here.

Figure 22:
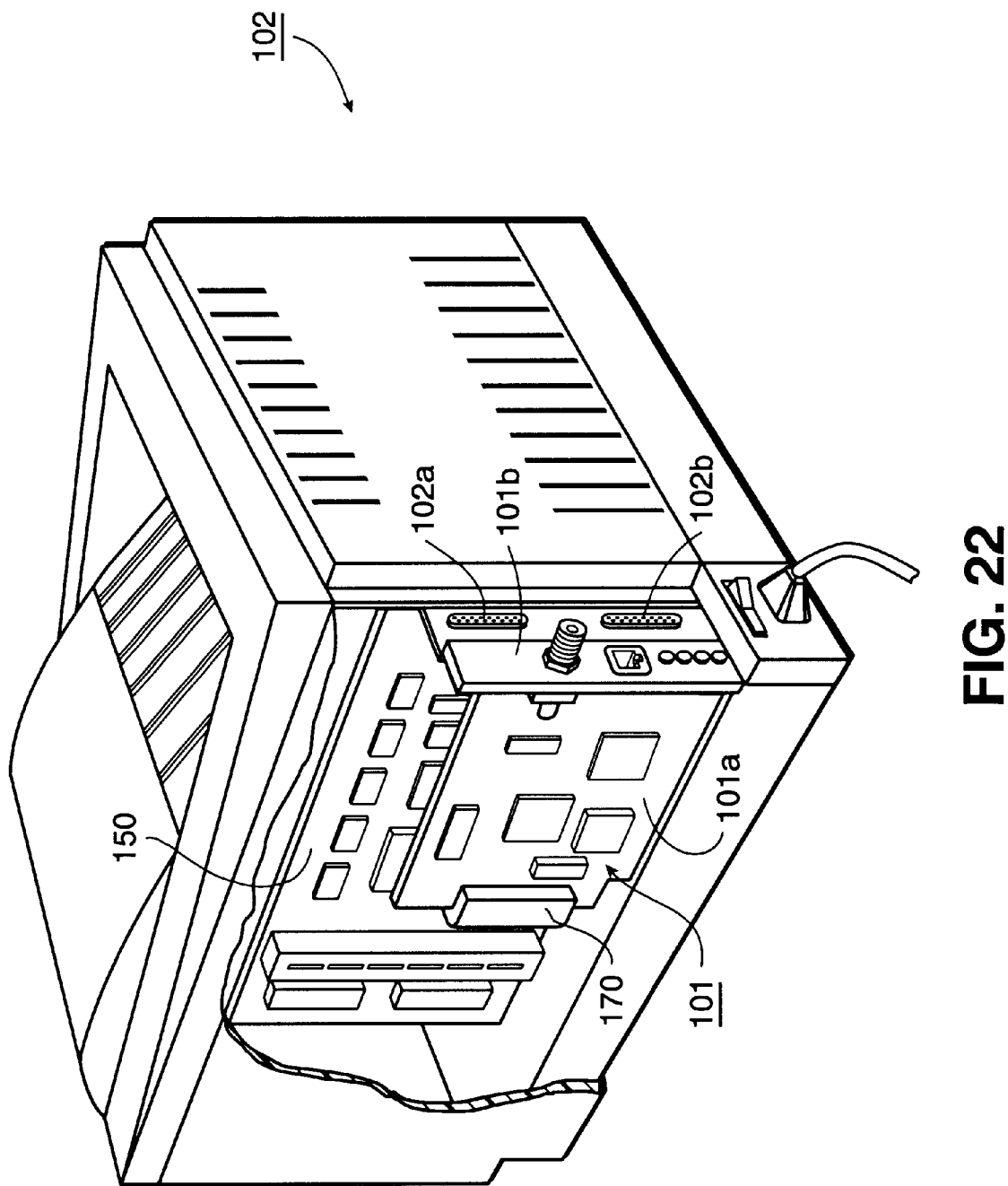
FIG. 22 is a cut away perspective view of the network board fitted into a Canon LBP 1260 laser printer.

FIG. 22 is a cut-away perspective view showing installation of NEB 101 into printer 102. As shown in FIG. 22, NEB 101 is preferably housed in an internal expansion I/O slot of printer 102, which in a preferred embodiment of the present invention is a Canon LBP 1260 laser printer. This makes NEB 101 an embedded network node having the processing and data storage features described below.

The architecture of NEB 101 provides an advantage in that it has unique support features for administration and management of large, multi-area WAN networks. These support features could include, for example, printer control and status monitoring from a remote location on the network (such as from the network administrator's office), and printer logs or usage statistics accessible across the network for characterizing printer workload and scheduling toner cartridge replacement.

An important feature of NEB 101's design is its ability to receive printer information from printer 102 through a bi-directional interface, here a shared memory. Although a shared memory interface is used, other bi-directional interfaces such as a SCSI interface (e.g., as described in U.S. Pat. No. 5,323,393) may also be used to interface NEB 101 to printer 102.

As indicated above, a bi-directional parallel interface, such as the IEEE-1284, or an IrDA interface could be incorporated into a NED, in which case the NED's functionality would be identical to that of NEB 101, particularly with respect to data transfers from printer 102.

The bi-directional interfaces described above allow extensive printer status and control information to be exported to NEB 101 and thence to an external network node so as to allow programming of many useful support functions. For example, in the case of NEB 101, blocks of print image data and control information are assembled by a microprocessor on NEB 101, are written into the shared memory, and are then read by printer 102. Likewise, printer status information is transferred from printer 102 to the shared memory, from where it is read by the NEB microprocessor.

Printer status information which could be transmitted from printer 102 to NEB 101 includes: transient state; online, printing; offline, not printing; engine test detected; maintenance program running; in sleep mode; paper out; printer open; paper jam; no EP cartridge; toner low; U-L feed; load paper; feed paper; CaPSL operator call; upper feeder reject; middle feeder reject; lower feeder reject; set upper; set middle; paper drain; tray full; page full; 22 LINE ERROR; 40 LINE ERROR; download memory full; working memory full; deadlock memory full; job reject; print check; font full; engine warming up; external operator call; front card removal; NVRAM full; hard disk full; memory full; low resolution, can't switch to low; hard disk crash; "please power off"; full paint reject; scale error; duplex reject; expansion I/O error; tray trouble; resident ROM: bad format; not supported option; no option font; unavoidable memory full; service call is active; starting state; going offline; going online; offline, not printing, in a menu; transient, menu finished, return to OFFLINE; panel reset requested; SWOFF detected (power down request); reboot system; panel form feed requested; panel form feed cancelled; external program test print; test print cancelled; maintenance program done; and the like.

As shown in FIG. 22, NEB 101, which is constructed from printed circuit board 101a on which is mounted face plate 101b which allows for network connections, is connected via connector 170 to printer interface card 150. As described below, printer interface card 150 directly controls the print engine in printer 102. Print data and printer status commands are fed to printer interface card 150 from NEB 101 via connector 170, and printer status information is obtained from card 150 also via connector 170. NEB 101 communicates this information onto LAN 100 via network connectors on face plate 101b. At the same time, printer 102 can also receive print data from conventional serial port 102a and parallel port 102b.

Figure 23:
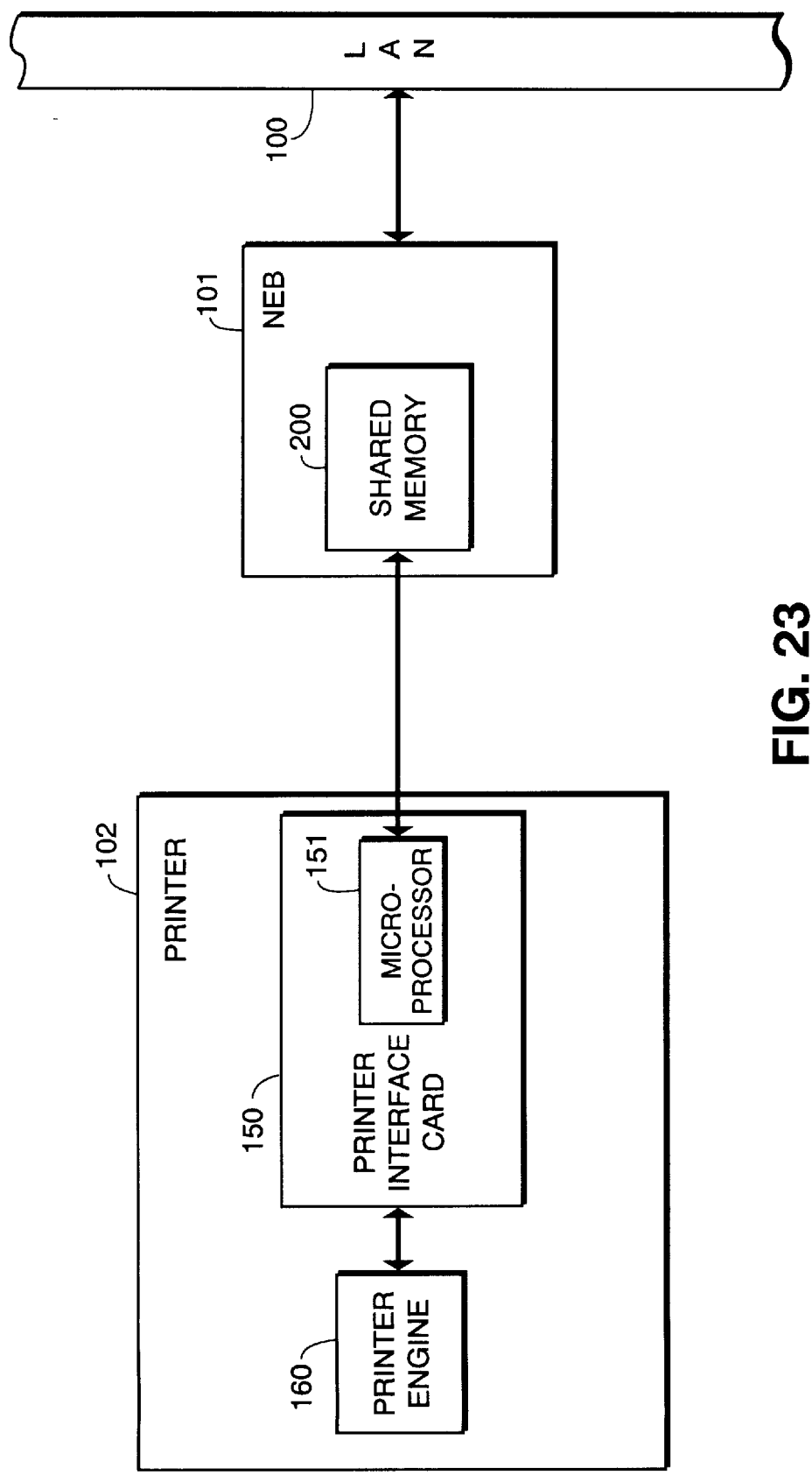
FIG. 23 is a block diagram showing the network board coupled between a printer and a local area network.

FIG. 23 is a block diagram depicting electrical connection of NEB 101 to printer 102. NEB 101 is directly connected to LAN 100 via a LAN interface, and to printer 102 via printer interface card 150. In a preferred embodiment of the invention, printer interface card 150 is a Peerless LBP-860/1260-External Standard I/O Board Interface, available from Peerless Systems Corp., the details of which can be found in the Peerless Standard I/O Interface Design Specification, revision 2.07a, Peerless Systems Corp., May 10, 1994. Printer interface card 150 includes an Intel 80960KB-20 microprocessor 151. Although it is a 32-bit machine, microprocessor 151 accesses data to and from NEB 101 in 2-byte-wide (16-bit) transfers via shared memory 200 arranged on NEB 101. Microprocessor 151 also communicates with print engine 160 which actually drives the printing mechanism.

NEB PHYSICAL LAYOUT

Figure 24:
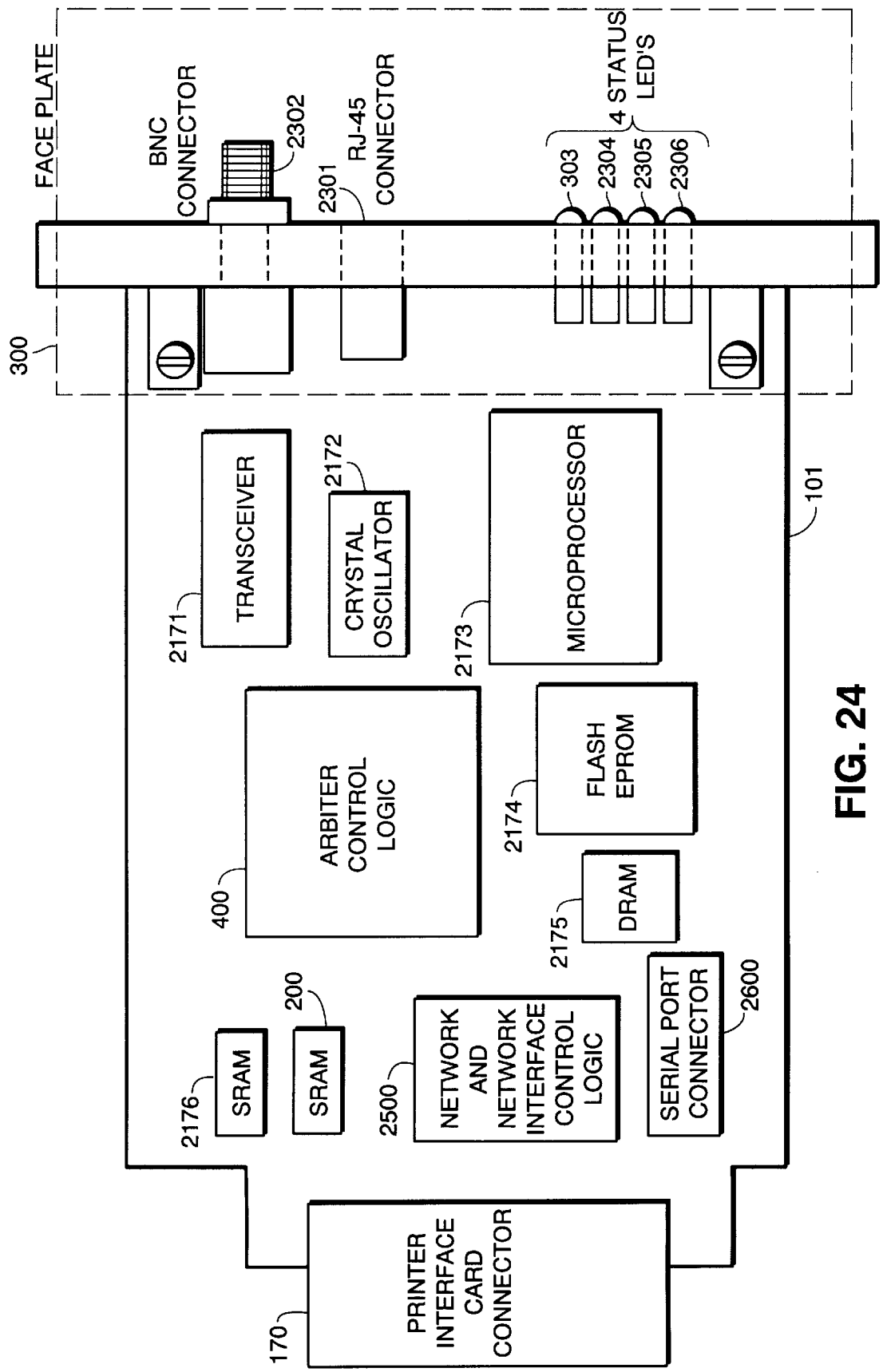
FIG. 24 is a diagram showing the physical layout of components on the network board.

FIG. 24 shows the dimensions of a preferred embodiment of NEB 101 and the physical layout of the major components thereof. The NEB card is 3.93 inches by 5.60 inches., NEB 101 includes a printer interface card connector 170 (which in the case of the Peerless printer interface card is an 80-pin connector) that couples to printer interface card 150 and face plate 300 having connectors 2301 and 2302 that allow connection to LAN 100. Face plate 300 also includes four status light emitting diodes (LEDs) 303 and 2304 to 2306. Arranged on the NEB card are transceiver 2171, crystal oscillator 2172, microprocessor 2173, arbiter control logic 400, flash erasable programmable read only memory (EPROM) 2174, dynamic random access memory (DRAM) 2175, first static random access memory (SRAM) 200, second SRAM 2176, network and network interface control logic 2500, and serial port connector 2600. Each of these components will be discussed in greater detail below.

Figure 25:
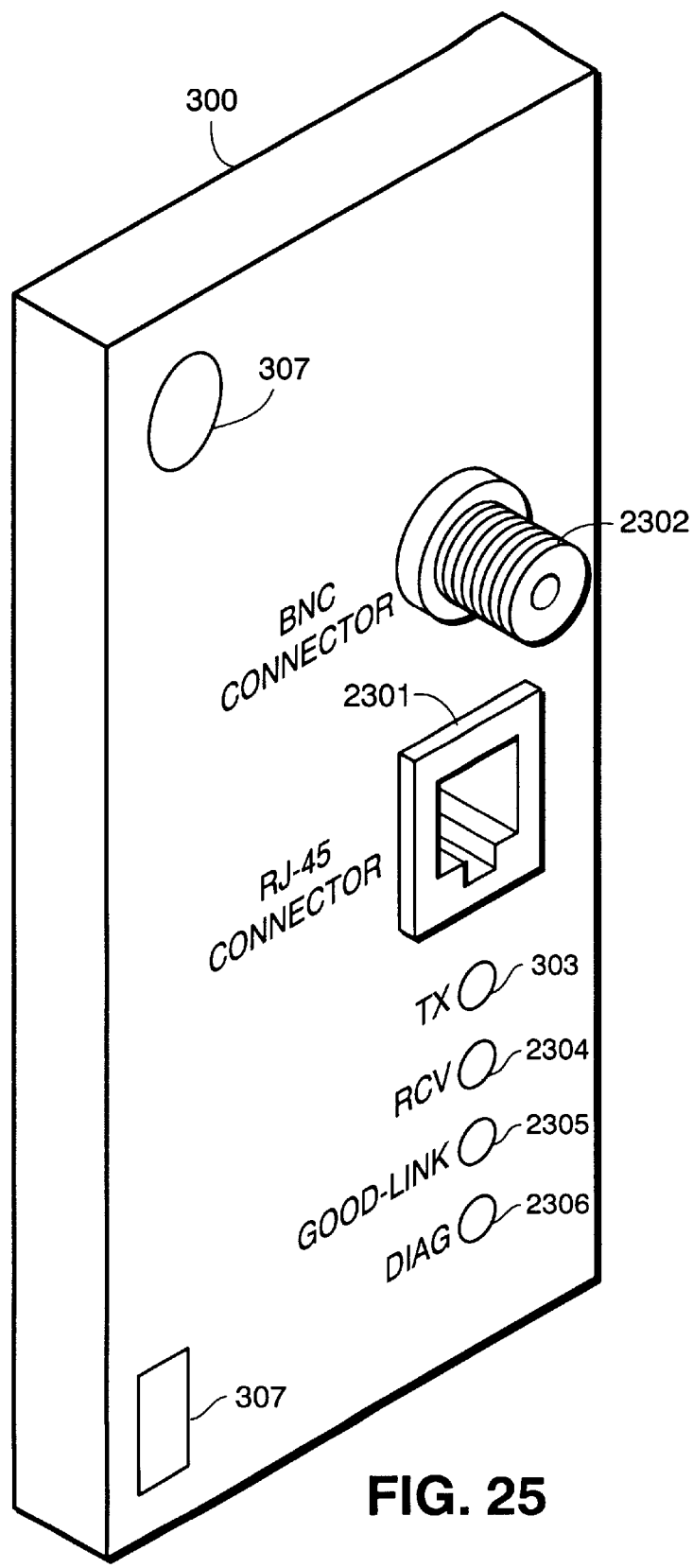
FIG. 25 is a drawing of a face plate for the network board.

FIG. 25 depicts a more detailed view of face plate 300, the dimensions of which are 4.56 inches by 1.28 inches. As stated above, NEB 101 couples to LAN 100 through connectors 2301 and 2302. Preferably, connector 2301 is an RJ-45 connector capable of accepting a 10Base-T connection, while connector 2302 may be a simple coax connector capable of accepting a 10Base-2 connection. Status LED 303 is lit when NEB 101 is transmitting data over LAN 100, and status LED 2304 is lit when NEB 101 is receiving data from LAN 100. Status LED 2305 is lit when RJ-45 connector 301 is connected to LAN 100, while status LED 2306 is lit during self-test diagnostics of NEB 101. Mounting holes 307 accept screws for fixing NEB 101 to printer 102.

NEB ARCHITECTURE

Figure 26:
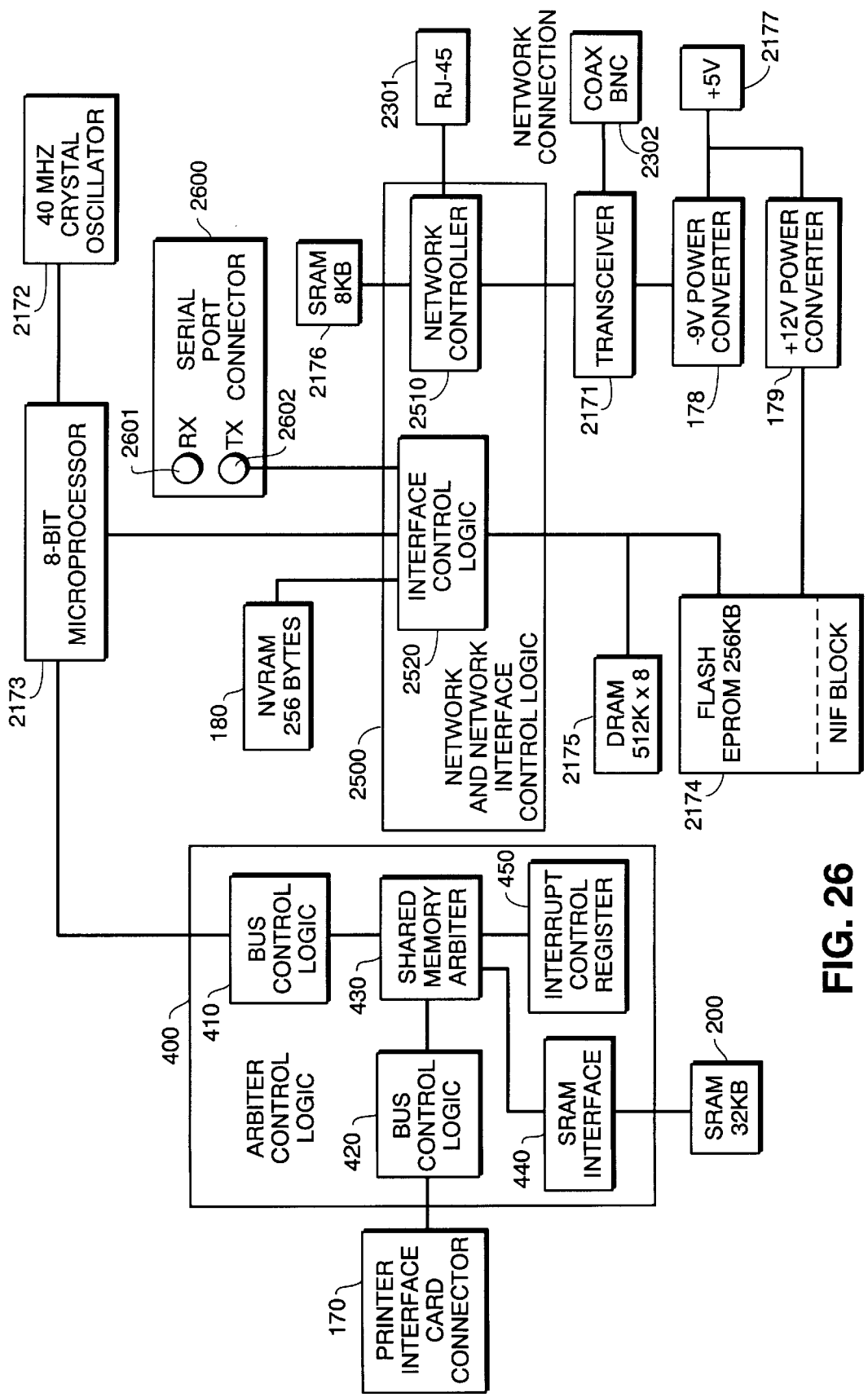
FIG. 26 is a functional block diagram of the network board.

The architecture of NEB 101 is shown in FIG. 26. Power for all circuits is supplied to NEB 101 from a +5 V power source 2177. +5 V power is also provided to power converters 178 and 179. Power converter 178 provides −9 V power to transceiver 2171, while power converter 179 provides +12 V power to flash EPROM 2174 for "flashing" (i.e., reprogramming of the EPROM).

Network and network interface control logic 2500 is preferably a single 144-pin application specific integrated circuit (ASIC) that includes a network controller 2510 and interface control logic 2520. Network controller 2510 is an NCR macro-cell compatible with National DP83902A "ST-NIC" Ethernet controller, the details of which can be found in National Semiconductor's *Local Area Networks Databook*, National Semiconductor p/n 400055, National Semiconductor, 1993. Network controller 2510 is designed to interface with CSMA/CA-type (carrier sense multiple access with collision detection) local area networks.

Network controller 2510 connects with RJ-45 connector 2301 directly and with coaxial connector 2302 through transceiver 2171, which is preferably a National Semiconductor DP8392 coaxial transceiver interface, the details of which can also be found in National's *Local Area Networks Databook*. Network controller 2510 is also coupled to an 8 KB SRAM 2176 that is used as an input/output packet buffer for Ethernet data. This memory should preferably have an access time of about 70 ns or less.

Interface control logic 2520 provides an interface between network controller 2510, microprocessor 2173, and memory devices EPROM 2174 and DRAM 2175. Interface control logic 520 also interfaces with non-volatile random access memory (NVRAM) 180, which is a 256 byte serial electrically erasable/programmable memory used for initialization data storage during power cycling of printer 102 which houses NEB 101. Network and printer configuration parameters are written into NVRAM 180 when printer 102 is first installed onto the network to allow NEB software to recover the installation parameters after printer power has been cycled off and on.

Interface control logic 2520 also couples with serial port connector 2600, which comprises a receive data pin 2601 and a transmit data pin 2602 that can respectively receive and transmit serial data streams for debugging purposes. Interface control logic 2520 senses data present at the receive data line and samples the serial bits at regular intervals, in a manner that will be discussed in greater detail below.

The central controller of NEB 101 is microprocessor 2173, preferably an Intel 80C188EA-20 8-bit processor, the details of which can be found in the 80C186EA/80188EA User's Manual, Intel p/n 270950-001, Intel Corp. This processor is an 8-bit processor with direct memory access (DMA), interrupts, timers, and a DRAM refresh control. Other microprocessors, such as an AMD 80C188-20 8-bit microprocessor, might alternatively be used. 256 KB flash EPROM 2174 and 512 KB DRAM 2175 are coupled to microprocessor 2173 via interface control logic 2520, while 32 KB SRAM 200 (which is shared with printer interface card 150) is coupled with microprocessor 2173 via arbiter control logic 400. A 40 MHz, 50 ppm crystal oscillator 2172 provides microprocessor 2173 with a clock signal that is wholly separate from and asynchronous with the clock signal provided to microprocessor 151 on printer interface card 150.

Microprocessor 2173 executes instructions in flash EPROM 2174, which stores control firmware and printing application software. After power-on self-test (POST), code is selectively moved to the higher performance 512 KB DRAM 2175, which should preferably have an access time of about 80 ns, for actual execution. Flash EPROM 2174 can be reprogrammed, or "flashed", from LAN 100, as described in U.S. patent application Ser. No. 08/336,043, entitled "Smart Flash".

Software modules for NEB 101, which are identical to those for NED 1001 described above, are stored in flash EPROM 2174. Also stored in flash EPROM 2174 is a NIF data block, which is identical to the NIF data block stored in EPROM 174 of NED 1001. Thus, FIG. 8, which shows the contents of EPROM 174 of NED 1001, accurately depicts the contents of EPROM 2174 in NEB 101. In this regard, since the software modules and NIF data block stored in NEB 101 and NED 1001 are the same, the general descriptions of the software modules and the NIF data block provided above will not be repeated here.

All communication between NEB 101 and printer interface card 150 is executed via 32 KB shared SRAM 200. Arbiter control logic 400, preferably a single 100-pin ASIC, arbitrates between the two byte wide memory accesses of printer interface microprocessor 151 and the single byte wide memory accesses of NEB microprocessor 2173, each of which is completely independent of the other.

Generally speaking, the 8-bit data bus of microprocessor 2173 on board NEB 101 communicates with bus control logic 410, while the 32-bit data bus of microprocessor 151 on board printer interface card 150 communicates with bus control logic 420. Memory accesses from each bus are routed to shared memory arbiter 430, which determines which bus has priority (in accordance with an arbitration technique discussed below) and permits the bus with priority to access SRAM 200 via SRAM interface 440. Interrupt control register 450 is also accessed through shared memory arbiter 430, to allow one microprocessor to interrupt the other.

NEB FUNCTIONALITY

Broadly speaking, NEB 101 is an interactive network circuit board which couples printer 102 to LAN 100, making printer 102 a responsive and interactive network member. NEB 101 receives print data, status requests and control commands from LAN 100, transmits print data, status requests and control commands to printer 102 for execution, receives status information from printer 102, and transmits status information back to LAN 100.

Thus, NEB 101 can not only perform RPRINTER remote printer services and PSERVER print server functionalities, but can also offer to network members whatever status and control features are available from the peripheral interface. Through NEB 101, network members can access verbose amounts of status information stored in the NEB, such as number of print jobs, number of pages per job, number of pages per minute, time per job, number of total pages per day, and number of jobs per day. In addition, a great deal of control information may be provided from the network to printer 102, such as, for example, exercising the printer's front panel functions from a network PC.

All network traffic enters and leaves NEB 101 through either BNC connector 2302, which interfaces with network controller 2510 through transceiver 2171, or RJ-45 connector 2301, which interfaces directly with network controller 2510. To eliminate the necessity for a user physically to position a switch, NEB 101 includes hardware and software which automatically detects which of the two connectors is coupled to the network. This hardware and software is described in U.S. patent application Ser. No. 08/336,062, entitled "Network Protocol Sensor". Network communications are transferred between the selected connector and the rest of the board, with network controller 2510 and interface control logic 2520 controlling the flow of data between the network traffic on the selected connector and microprocessor's 2173 data bus.

All software modules executed by microprocessor 2173 are stored in flash EPROM 2174. Some low-level modules which are always needed, such as timer tick and NVRAM read, could be executed directly out of EPROM 2174, but for the most part microprocessor 2173 does not execute software modules directly from flash EPROM 2174, but rather selectively loads those modules that are needed into DRAM 2175 for execution from DRAM. By virtue of this arrangement, it is possible to select the specific modules that are retrieved from flash EPROM 2174 for execution out of DRAM 2175 so as to permit flexible configuration of NEB 101.

For example, because many communication protocol types may be broadcast on LAN 100, NEB 101 includes, in flash EPROM 2174, software modules for supporting multiple protocols. NEB 101 monitors all network traffic on the heterogeneous network to determine the protocol type or types in use, and loads the protocol stack or stacks which correspond to the protocols it detects into DRAM 2175.

Reprogramming flash EPROM 2174 with a new image, which may include a new protocol stack, is also performed via DRAM 2175. When a new image and a command to reprogram is received, such as a command received over the network or serial port connector 2600, the software reprogramming module is loaded from EPROM 2174 to DRAM 2175. Microprocessor 2173, executing this module from DRAM 2175, confirms that the new firmware image is compatible with the configuration of NEB 101, and reprograms EPROM 2174 if compatibility is confirmed, as described in more detail in U.S. patent application Ser. No. 08/336,043, entitled "Smart Flash".

Microprocessor 2173, executing a loaded protocol stack out of DRAM 2175, can send and receive network communications to and from other LAN members using that protocol. Print job data is received by network controller 2510 and routed to microprocessor 2173 through interface control logic 2520. Microprocessor 2173 writes the print job data to shared memory SRAM 200, from which printer microprocessor 151 reads the data and operates print engine 160 in accordance therewith. In addition, each of microprocessors 2173 and 151 can write message data to the other microprocessor in another portion of the shared memory.

Access to shared SRAM 200, as discussed above, is arbited by arbiter control logic 400 according to an arbitration priority technique. Arbiter control logic 400 interleaves concurrent accesses of the two microprocessors with one another by allowing the microprocessors access to shared SRAM 200 on a first-come, first-served basis, and presenting a wait state to the lower priority processor while the higher priority processor takes its turn. In the case of an exact tie, microprocessor 2173 on NEB 101 is arbitrarily given priority.

A large portion of shared SRAM 200 is configured as a ring buffer, into which NEB microprocessor 2173 writes print data and out of which printer interface microprocessor 151 reads it. As each processor writes or reads blocks of data, it updates respectively a "put" pointer or a "get" pointer, stored elsewhere in SRAM 200, to indicate the next location that the processor should access.

By virtue of this arrangement, the writing processor can determine if there is available space in the memory in which it may write, and the reading processor can determine whether there is remaining data to be read, by comparing the put and get pointers with one another. To reduce the amount of contention for shared memory between the two processors, NEB microprocessor 2173 stops writing to memory (and accordingly stops reading and updating the pointers) at predetermined intervals, allowing printer interface microprocessor 151 sole access to the memory until it catches up, as described in more detail below.

Serial port connector 2600 is provided to allow NEB 101 to be debugged from an external computer. Serial port connector 2600 is coupled to interface control logic 2520, which accepts serial data from receive data pin 2601 of serial port connector 2600 and communicates the serial data bit-by-bit to microprocessor 2173. Microprocessor 2173 configures interface control logic 2520 so that a start bit in the serial data activates the non-maskable interrupt of the microprocessor. Microprocessor 2173 then assembles the data bits of the serial data into 8-bit words. In addition, interface control logic 2520 monitors the data bus of microprocessor 2173, and passes a serial stream of the data presented thereon to transmit data pin 2602 of serial port connector 2600.

NVRAM 180 and flash EPROM 2174 also store "board" information such as model number, firmware level, and board revision number, as well as "network" information such as Media Access Control ("MAC") address, which is unique for every network board, board name, network frame type, primary file server identification, queues serviced, network protocol, sampling frequency, PSERVER name, zone-name, and the like.

NEB ACCESS AND CONFIGURATION

Access and configuration information for NEB 101 is identical to that for NED 1001 save for the following. NEB 101, unlike NED 1001 includes a bi-directional peripheral interface. Therefore, NEB 101 will have the ability to offer a wide variety of status and control features to the network. More specifically, as indicated above, verbose amounts of status information may be provided from printer 102 to LAN 100, and a great deal of control information may be provided from LAN 100 to printer 102 (for example, obtaining printer-maintained page count or exercising printer front panel functions, such as online/offline, from PC 103).

Accordingly, CPNET will have access to, and can display, information from the printer, which, as indicated above, would not be available to NED 1001 because of the uni-directional nature of NED 1001's peripheral interface. Such information could include, for example, number of pages per print job.

As indicated above, the remainder of NEB 101's access and configuration information is identical to that for NED 1001. Accordingly, a description thereof will not be repeated here.

AUTOLOGGING FUNCTION

NEB 101 includes the capability of logging the current status and daily statistics of printer 102 at midnight of each day. This relieves the network administrator from having to remember to do this on a daily basis. The status and statistics data may be stored in NEB DRAM 2175, or in NEB NVRAM 180. The location and storage area for the stored log file may be selected by the network administrator depending upon the remaining memory capacity of each of those memories, and the statistics required by the logging level selected by the network administrator. For example, if a large amount of memory space is available, the network administrator may choose the fairly-detailed "JOB", logging level so that voluminous statistics may be retained. On the other hand, if the memory space is limited, the network administrator may choose the less-detailed "ERROR" log-ging level so that less storage space is required. If the log file is filled, new log data will merely wrap around in the storage area of the memory replacing old log data with new log data.

The logging function is similar to that carried out for NED 1001, as described above in the first embodiment. The principal difference results from the fact that NEB 101 has a bi-directional interface with the printer, while NED 1001 does not. Accordingly, NEB 101 can obtain more detailed information from the printer for logging than can NED 1001. For example, NEB 101 can obtain fairly detailed information from the printer regarding the status of the printer. NED 1001, on the other hand, can only obtain limited information regarding the printer status, such as the online status or an out of paper condition. Other than the different amount of information available in the log file, the operation of the logging functions and the output of the log file or the debug information is similar for NED 1001 and for NEB 101.

Figure 27:
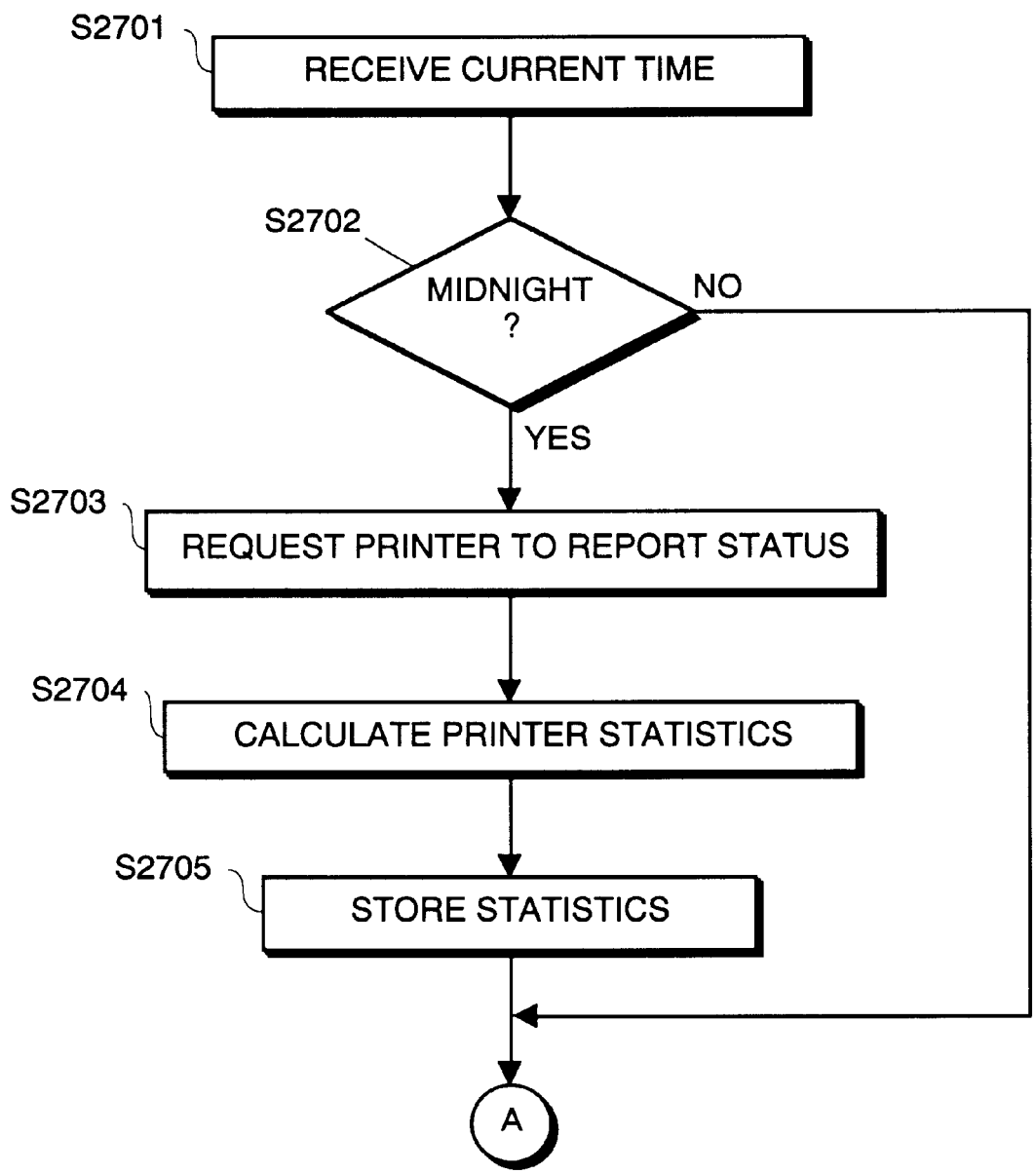
FIG. 27 is a flow diagram showing an autologging process performed in CPSOCKET.

FIG. 27 is a flow diagram showing a portion of the process performed in the NEB by the CPSOCKET program. At Step S2701, the current time is received from LAN 100. After receiving the current time, the process proceeds to Step S2702, where it is determined whether it is midnight, i.e., whether the returned time indicates a new date.

Steps S2702 through S2705 comprise a so-called "autologging" function which is carried out in order to automatically and systematically provide status information from printer 102 to LAN 100 (autologging will be discussed in greater detail below). In Step S2702, if midnight has not been reached, the process proceeds with other tasks. However, once midnight is reached, NEB microprocessor 2173 transmits a request to printer 102 in Step S2703 for printer 102 to return current status to NEB 101. For example, printer 102 may return the cumulative number of pages printed to NEB 101. In Step S2704, NEB microprocessor 2173 calculates printer statistics such as pages per job or pages per day, NEB 101 having kept track of the number of jobs sent to the printer and the date. At Step S2705, the printer statistics are transferred to a non-volatile memory such as NEB's NVRAM 180. Alternatively, Steps S2703, S2704, and S2705 may be performed before Step S2702, so that statistics are stored every minute.

Summarizing Steps S2702 through S2705, a method for logging system statistics of a printer connected via a bi-directional interface to an interactive network board for LAN communication includes the steps of counting in the printer the number of pages printed, and counting on the board the number of jobs printed. The printer is interrogated daily over the bi-directional interface for the number of pages printed, and the board then calculates daily statistics using the number of pages, the number of jobs, and other status information. The daily statistics are then stored and may be accessed and remotely displayed using CPNET from a network administrator's PC, such as PC 103. As described above, an additional feature of the "autologging" function is that different levels of statistics may be logged. For example, at a basic level, statistics such as the number of pages for each job may be logged. At more advanced levels, statistics plus errors may be logged. At such an advanced level, the number of pages per job plus a log of failure conditions may be logged; or the job start and end times may be logged in addition to the failure conditions and the number of pages per job. The logging level is set by CPNET.

One option available to the network administrator when using CPNET is the option to select a display history option, which allows the network administrator to display a set of job-related statistics that NEB 101 compiles. The displayed data include job averages, page averages, and performance data. In addition to statistics, NEB 101 can create a log for every print job, write the log to a work station disk, or clear the log file, as configured by CPNET. The network administrator can also select an option to initialize the statistics.

If the network administrator selects the display log file option, then CPNET directs a LAN request for the log file to the targeted NEB via the LAN interface. At NEB 101, CPSOCKET receives the request, retrieves the log file from wherever it is stored, and provides the file to the network via the LAN interface for receipt by CPNET.

The log file includes values for the statistics which are divided into three categories: Daily, Cumulative, and Average. Daily shows the values for the current day. Cumulative shows the totals for all days since last reset, or since power-on for a printer without a disk drive. Average is the cumulative totals divided by the number of days since the last reset. For each of the three categories (unless CPNET has set the logging level to "NONE"), NEB 101 maintains totals for the following values: days (number of days since a reset was issued or since power-on), pages printed, print jobs processed, offline time, job information, error information, and printing time.

CPNET also retrieves the stored log file to the screen for viewing and printing. The log file is in reverse chronological order and includes the following record types. The precise content of the log file varies in accordance with the logging level set by CPNET, as summarized in Table 2. It is further noted that every entry into a log file is stamped with its date and time of entry.

TABLE 2

| Type | Data | Description |
|---|---|---|
| STD | <Days><Pages><Jobs><Offline><Printing> | daily statistics |
| STC | <Days><Pages><Jobs><Offline><Printing> | cumulative statistics |
| STA | <Days><Pages><Jobs>><Offline><Printing> | average statistics |
| SOJ | <Application><User><Job><File server><Queue><Form> | start of job |
| INI | <NEB Type><ROM/MAC Address><Printer Name> | Initialization record |
| POW | <NEB Type><ROM/MAC Address><Printer Name> | power on record |
| RBT | <NEB Type><ROM/MAC Address><Printer Name> | reboot record |
| WAR | <Application><Warning> | warning |
| EOJ | <Application><User><Job><Disposition> | end of job |
| ERR | <Application><Error> | error |

As described above with respect to FIG. 27, Steps S2702 through S2705 comprise an automatic logging function in which peripheral statistics (e.g., number of pages printed per day) and error events are automatically logged (stored) for later retrieval; and wherein the logging level (statistical resolution) may be varied by the network administrator. In general, the network administrator may select a logging level, and then extract printer statistics and error events from the log file at any time. The network administrator's portion of such functions has been described above, and reference may be had to the discussion and tables set forth therein, especially Table 2, which indicates the content of the log file depending upon the logging level set by CPNET.

As described above, the network administrator may select four logging levels: NONE; AUTO; ERROR; and JOB. At the NONE level, no logging statistics are maintained (although they may still be calculated every minute and temporarily kept in NEB DRAM 2175). At the AUTO level, daily statistics are maintained for printer features such as printing days, pages, jobs, offline time, and print time. The number of cumulative pages printed is determined by the printer, but the other statistics are determined by the NEB.

The ERROR logging level maintains the daily statistics discussed above, and also error conditions in printer 102 and errors that occur in an application (i.e., CPSERVER). NEB 101 queries the printer for such error conditions and logs the error conditions as they occur. Such printer error conditions may include: offline; out-of-paper; printer-is-open; paper-jam; no-toner-cartridge; toner-is-low; printer feed and load errors; tray-is-full; line errors; print-job-rejected; font-is-full; service call; etc. Application errors may include: fileserver down; primary fileserver unavailable; CPSERVER running elsewhere; print queue not found; etc.

The JOB logging level maintains the daily statistics and error conditions noted above and also maintains job start and job end information, which are determined by NEB 101. Of course, the number and types of logging levels, and the data retained in each logging level, may be varied according to the particular peripheral and the particular LAN in which NEB 101 is installed.

Figure 28A:
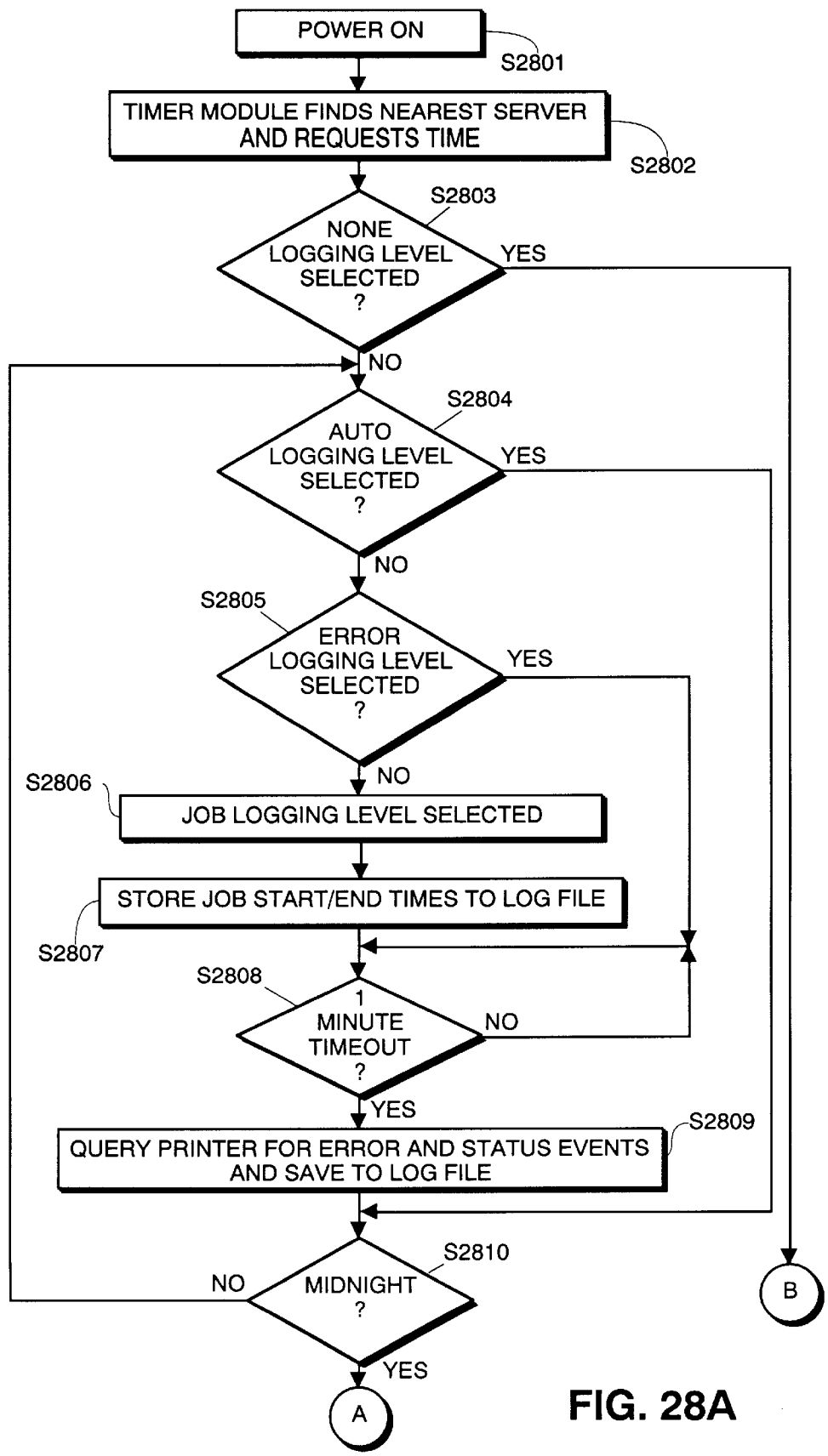
FIGS. 28A and 28B are flow diagrams showing autologging for different selectable levels of data.
Figure 28B:
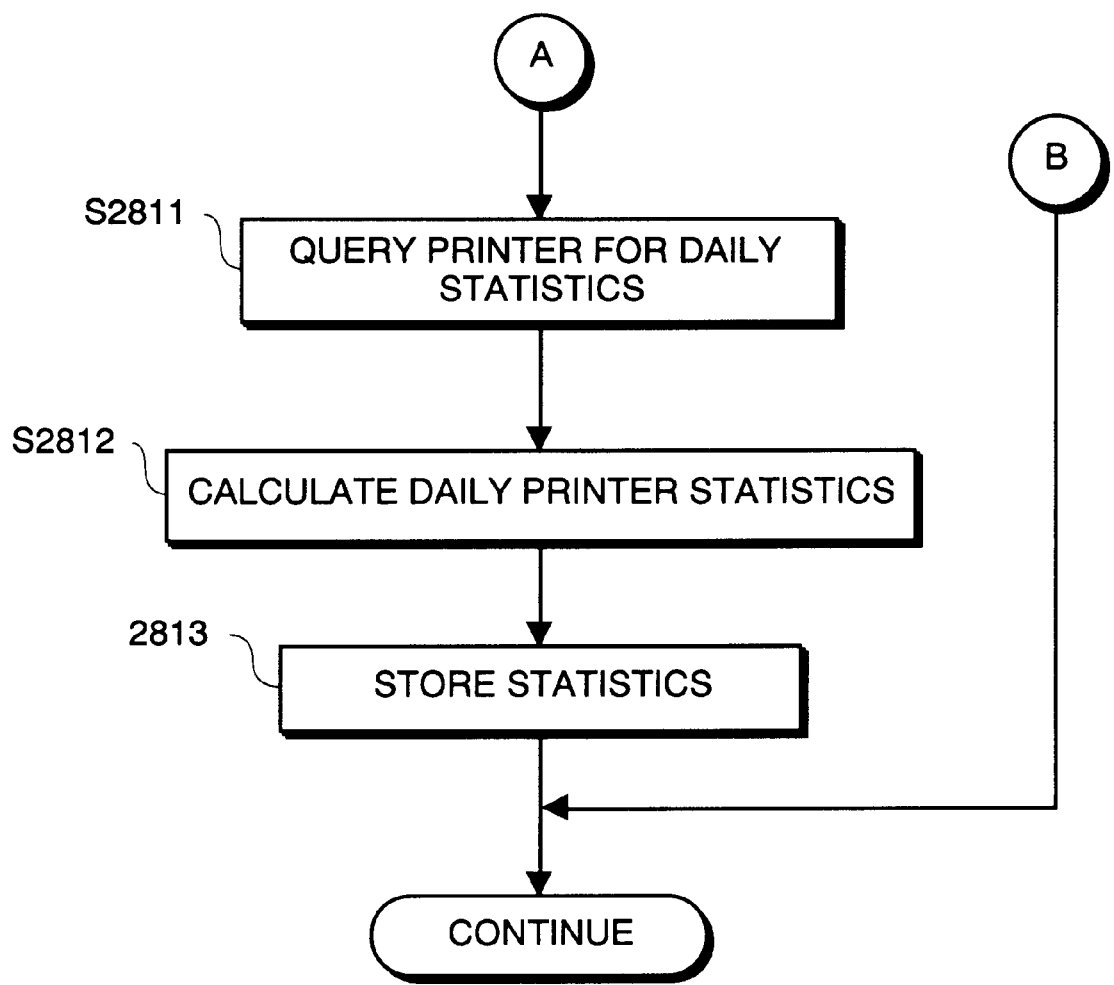

FIGS. 28A and 28B comprise a flowchart showing the overall operation of the automatic logging function within NEB 101. Reference may also be had to FIG. 27 and Table 2 noted above. At Step S2801, power is applied to NEB 101, and at Step S2802, the timer module finds the nearest server and requests the time. At Step S2803, it is determined whether the NONE logging level has been selected. If the NONE logging level has been selected, the process skips to the end of the flowchart where a return is made to the main process.

If the NONE logging level has not been chosen in Step S2803, Step S2804 determines whether the AUTO logging level has been selected. If the AUTO logging level has been selected, the process proceeds to Step S2810, where midnight is awaited. However, if the AUTO logging level has not been selected, Step S2805 determines whether the ERROR logging level has been selected. Where the ERROR logging level has been selected, the process skips to Step S2808, where a one-minute timeout is awaited. However, if the ERROR logging level has not been selected, it is determined in Step S2806 that the JOB logging level has been selected. In this case, Step S2807 stores the job start and job end times to the log file. At Step S2808, a one-minute timeout is awaited, whereafter Step S2809 queries the printer for error events and saves such events to the log file. Thus, when either the ERROR or JOB logging level has been selected, the board queries the printer for error conditions and logs the error conditions in the log file as they occur.

Step S2810 waits for midnight, whereupon NEB 101 queries printer 102 for its daily statistics at Step S2811 (FIG. 28B). If midnight has not been reached in Step S2810, the procedure returns to Step S2804, where it is determined which logging level has been selected.

In Step S2812, the daily printer statistics are calculated utilizing the printer statistics received in Step S2811. Thereafter, in Step S2813, the daily statistics and the error events are stored in NEB NVRAM 180. Note here that the network administrator may select to store logging statistics and error events in any combination of memories, providing further flexibility to LAN 100.

The logging functions discussed above are quite significant in making printer 102 an interactive and responsive member of LAN 100, since the shared memory connection between NEB 101 and printer 102 is capable of extracting volumes of specific data from printer 102.

As mentioned above, NEB 101 may use a different type of bi-directional interface with printer 102, such as a SCSI interface. A SCSI interface is used, for example, in the NEB described in above-mentioned U.S. Pat. No. 5,323,393, entitled "Method And Apparatus For Obtaining And For Controlling The Status Of A Networked Peripheral." The NEB described therein has even greater flexibility in communicating between the printer and the NEB. For example, a log file can be stored optionally in a hard disk of the printer, as well as in memory on the NEB. If the printer has a hard disk, the network administrator may choose the fairly-detailed "JOB", logging level so that voluminous statistics may be retained. On the other hand, if the printer has no hard disk, the network administrator may choose the less-detailed "ERROR" logging level so that less storage space is required.

OUTPUTTING LOG FILE

FIG. 11 shows a process for outputting from NEB 101 a log file generated by the autologging function. The log file will contain a varying amount of information concerning activity of NEB 101 and printer 102, depending on the logging level selected. As discussed above, the amount of logged information will also depend on the amount of information about printer 102 that is available to NEB 101.

The process steps of FIG. 11 illustrate a method for outputting a log file from a network device which interfaces between a local area network (LAN) and an image forming apparatus. A log file is maintained which logs image forming jobs received from the LAN and output to the image forming apparatus. In response to the detection of a triggering condition for initiating output of the log file, the log file is formatted into an image forming job, and the formatted log file is output to the image forming apparatus.

As indicated above, the process shown in FIG. 11 is implemented in a section or subtask of the CPSOCKET program running on microprocessor 2173. In Step S1101, a determination is made whether a triggering condition is detected. Examples of conditions that may be used to trigger output of the log file are described above for NED 1001. These triggering conditions also apply to NEB 101. Accordingly, a description thereof will not be repeated here.

If a triggering condition is detected, the process advances to Step S1102. Otherwise, the process skips to the end and other processing continues. In Step S1102, the log file is retrieved and formatted into an image forming job. This formatting preferably includes operations such as adding page headers, formatting the log file data to have an orderly arrangement on a printed page, and adding control characters, such as form feeds, to the data stream. The default mode is for the formatted log file data to be in ASCII character format, which will drive the majority of image forming apparatuses. If it is known that a particular image forming apparatus requires data in a different format, such as a PostScript format, NEB 101 can be configured to format the log file into the appropriate format. This configuration can be done, for example, using CPNET. Moreover, since NEB 101 has a bi-directional interface with the attached peripheral, it can query the peripheral to determine the data format needed by the peripheral.

The remaining process steps of FIG. 11, which are described above with respect to NED 1001, are identical for outputting a log file from NEB 101. Accordingly, a description thereof will not be repeated here.

Processing the different triggering conditions according to FIG. 12 is described above with respect to NED 1001. This processing is performed identically in NEB 101. Accordingly, a detailed description thereof will not be repeated here.

FIG. 29 is an example of a sheet of paper 29100 having a printout of data that may be stored in a log file in NEB 101 when the AUTO level of logging is set and output to printer 102. FIG. 29 differs from FIG. 13 (which shows an example of a sheet of paper having a printout of data that may be stored in NED 1001), in that FIG. 29 includes printer information which cannot be transmitted to NED 1001 via NED 1001's uni-directional peripheral interface.

In FIG. 29, header 2910 identifies that the printout is for a log file and identifies the name of printer 102. Column 2901 indicates a date and column 2902 indicates a time. Column 2903 indicates a record type, which corresponds to the record types indicated in Table 2. Columns 2904 through 2908 respectively indicate a number of days, a number of pages (received from printer 102), a number of jobs, and a number of minutes printer 102 was offline, and a number of minutes printer 102 was printing.

The records are in reverse chronological order. Accordingly, the last record in the file is the first record that was generated, which is a Power On record 2907 (type POW; see Table 2). The data in the POW record is as follows:

E=Ethernet
1.39=Firmware Version
00680B=last digits of MAC (Media Access Control) Address
CMQA_LAB-A=Printer Name As indicated above, the log file content will depend on the level of logging selected. Moreover, different formatting and/or labels may be used as desired.

GENERATING A TESTPAGE

FIG. 14 illustrates a process by which NEB 101 can be triggered into generating and outputting testpage information based on status changes in printer 102 in which NEB 101 is installed, particularly based on status changes effected through front panel 1021. The testpage information includes at least one of board information and network information and is generated by manipulating a front panel of the peripheral to change a status of the peripheral. NEB 101 is coupled to a LAN by a LAN interface and to the peripheral by a peripheral interface. The LAN interface is monitored for network information and the front panel of the peripheral is manipulated a predetermined number of times over a predetermined period of time so as to generate a predetermined sequence of status changes in the peripheral. The predetermined sequence of status changes is communicated to the network device over the peripheral interface and, in response to the predetermined sequence of status changes, the network device generates testpage information which includes at least one of the board information and the network information. The testpage information is communicated to the peripheral over the peripheral interface and is output on the peripheral.

More specifically, beginning at Step S1401 microprocessor 2173 receives peripheral status data over a bi-directional peripheral interface, which can be a shared RAM as shown in FIG. 23, a SCSI interface or the like. In this case, the bi-directional peripheral interface is a shared RAM. Peripheral status data is received from printer interface card 150, which ordinarily updates the status data whenever card 150 detects a status change; alternatively, it is possible for NEB 101 to request transmission of status data from card 150. Based on the received peripheral status data, microprocessor 2173 determines whether a change in the peripheral's status has occurred.

Microprocessor 2173 may be set to interpret, as an initial status change, any status change which can be transmitted via shared RAM 200 (or any bi-directional interface). In a preferred embodiment of the present invention, however, the initial status change is caused by manipulation of front panel 1021, shown in FIG. 2B. Specifically, a user can cause an initial status change in printer 102 by hitting the "online/offline" button on printer 102's front panel. However, as indicated above, the initial status change can be initiated by any status change that can be transmitted across the bi-directional peripheral interface.

Once microprocessor 2173, in step S1401, detects an initial status change in printer 102, the process proceeds to step S1402 and then to Step S1403. The description of these two steps is identical to the description of these two steps for NED 1001. Accordingly, a description thereof will be omitted here.

In step S1404, microprocessor 2173 executes a testpage module within XPL module. FIG. 15 is a flow diagram showing the process whereby the testpage module within XPL module is configured to generate a testpage containing only "network" information and "board" information. In Step S1501, the testpage module reads information for a testpage out of memory. In the case of NEB 101, unlike NED 1001, information is read from EPROM 2174 and from NVRAM 180. Information for the testpage can include "board" information such as model number, firmware level, and board revision number, as well as "network" information such as MAC address, board name, network frame type, primary file server identification, queues serviced, network protocol, sampling frequency, PSERVER name, zone-name, and the like, all of which, as indicated above is stored in EPROM 2174 and NVRAM 180. Likewise, the testpage module can include under the category of "network information", "no network connection" information. As indicated above, microprocessor 2173 monitors the LAN interface to get this information. Exactly which of the foregoing information is used to generate a testpage is set in the testpage module within XPL module.

As described above, in Step S1502, the testpage module formats the testpage information read out in Step S1501. In a preferred embodiment of the present invention, the testpage information is formatted as shown in FIG. 16, a detailed description of which is provided above with respect to NED 1001.

Likewise, as indicated above with respect to NED 1001, the testpage format can be set in the testpage module within XPL module, and additional information can be included within the testpage.

After the testpage information has been generated, the process returns to FIG. 14, where in Step S1405, the testpage information is transmitted via shared RAM 200 to printer 102. In Step S1406, printer 102 prints out the testpage information received from NEB 101 as a testpage.

As was the case above, although not shown in the figures, the testpage information could be output to LAN 100. In this case, the testpage information could be stored in file server 106 so that other PCs on the network could access the testpage information on PC 102.

As indicated above, the foregoing description applies to an embodiment of NEB 101 in which the testpage information includes only "board" information and "network" information. However, since shared RAM 200 (or a SCSI interface) is a bi-directional interface, printer information can also be included in the testpage information generated and output by NEB 101.

Figure 30:
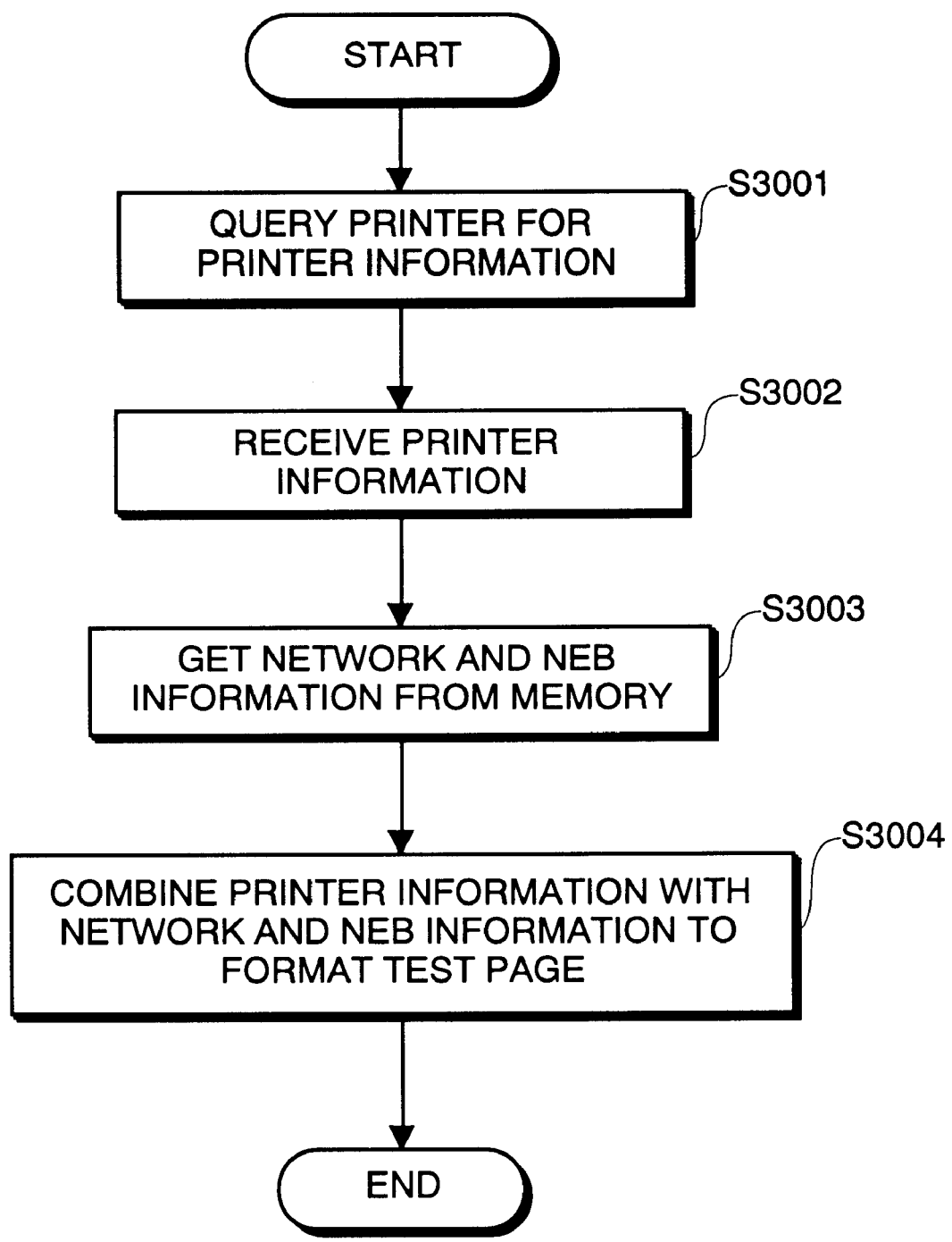
FIG. 30 is a flow diagram showing an operation of a testpage module within XPL module which queries the printer for printer information and which includes the printer information in the testpage.

In order to include printer information in the testpage information, the testpage module within XPL module in NEB 101 is operated to query and to receive needed printer information from printer 102. FIG. 30 shows a flow diagram of operation of the testpage module in this case. It should be noted that, once printer information is obtained, FIG. 14 accurately describes the process by which testpage information (which includes printer information) is generated and output by NEB 101.

In Step S3001, the testpage module requests predetermined printer information from printer 102 via shared RAM 200 (or a SCSI interface). This predetermined printer information is information that is to be included within the testpage output. The testpage module can be set, as desired, to request any available printer information which can be transmitted via shared RAM 200 (or a SCSI interface), such as number of pages printed, font registration, etc.

A more complete list of potential printer status information which can be included in a testpage includes: transient state; online, printing; offline, not printing; engine test detected; maintenance program running; in sleep mode; paper out; printer open; paper jam; no EP cartridge; toner low; U-L feed; load paper; feed paper; CaPSL operator call; upper feeder reject; middle feeder reject; lower feeder reject; set upper; set middle; paper drain; tray full; page full; 22 LINE ERROR; 40 LINE ERROR; download memory full; working memory full; deadlock memory full; job reject; print check; font full; engine warming up; external operator call; front card removal NVRAM full; hard disk full; memory full; low resolution, can't switch to low; hard disk crash; "please power off"; full paint reject; scale error; duplex reject; expansion I/O error; tray trouble; resident ROM: bad format; not supported option; no option font; unavoidable memory full; service call is active; starting state; going offline; going online; offline, not printing, in a menu; transient, menu finished, return to OFFLINE; panel reset requested; SWOFF detected (power down request); reboot system; panel form feed requested; panel form feed cancelled; external program test print; test print cancelled; maintenance program running; and maintenance program done.

The testpage module receives the requested printer status information from printer 102 in Step S3002, and reads "board" and "network" information out of EPROM 2174 and NVRAM 180, in Step S3003. In Step S3004, the testpage module combines the printer information, the "board" information and the "network" information into testpage information and formats the testpage information as described above. Once the testpage information has been formatted, the process proceeds as shown in FIG. 14.

OUTPUTTING FORMATTED DEBUG DATA

FIG. 17 is a flow diagram illustrating a process for outputting formatted debug information from NEB 101. This debug information is useful in determining the source of a problem when an image forming device is not working properly. In particular, the debug information can help determine whether the problem exists in the configuration or operation of the network board or in the image forming device. Generally speaking, the debug information is a dump of the memory contents of NEB 101. The debug information that is output includes, for example, the contents of NVRAM 180, and EPROM 2174, relating to the network board configuration, and the contents of DRAM 2175, relating to the operation of the network board in receiving image forming jobs from LAN 100 and outputting image forming jobs to the attached image forming device. This information may also include network statistics such as the number of collisions and the number of packets sent and received.

The process steps in FIG. 17 illustrate a method for outputting formatted debug information from a network device which interfaces between a local area network (LAN) and an image forming apparatus, such as printer 102. Debug information is stored in the network device relating to the operation of the network device when receiving image forming jobs from the LAN and when outputting the image forming jobs to the image forming apparatus. In response to the detection of a triggering condition for initiating the output of the debug information, the debug information is formatted into an image forming job, and the formatted debug information is output to the image forming apparatus.

As described above, the process shown in FIG. 17 is carried out by a section or subtask of the CPSOCKET program running on microprocessor 173. Processing according to FIG. 17, which is described above with respect to NED 1001 is identical to that for NEB 101. Accordingly, a detailed description thereof will not be provided here.

By the process described above in FIG. 17, an image forming job for the debug information is generated at NEB 101, so that the debug information can be accessed through the device attached to NEB 101 without the need for a computer to access NEB 101. This function can be selected for any NEB that is connected to a device capable of forming an image, e.g., a printer, a copier, or a facsimile device.

The debug information outputting function is made flexible by permitting a variety of conditions to be selected as the triggering condition for initiating output. The selected triggering condition can be configured by using CPNET and stored in NEB 101. Possible triggering conditions which can be used with NEB 101 are identical to those described above with respect to NED 1001. Accordingly, a detailed description thereof will not be repeated here.

FIG. 18, described above with respect to NED 1001, shows a flow diagram for processing the different triggering conditions, also described above. Since the description of FIG. 18 for NED 1001 applies equally to NEB 101, a detailed description thereof will not be repeated here.

FIG. 19 is a flow diagram showing a variation on the process described with respect to FIG. 17. In this variation, the source of debug information is data received from LAN 100 for an image forming job, instead of data stored in memory on NEB 101.

The process steps of FIG. 19 illustrate a method for reformatting debug information received from the LAN so that the reformatted debug information can be printed. According to the method shown in FIG. 19, debug information is received from the LAN and is preceded by a command which sets a re-format mode for NEB 101. In the re-format mode, NEB 101 reformats the debug information by converting binary codes into equivalent hexadecimal ASCII characters. The reformatted debug information is then output for printing on printer 102.

In Step S1901, data is received from LAN 100. In Step S1902, a determination is made whether a debug mode, i.e., a data conversion mode, has been set. This mode can be set using CPNET. For example, CPNET can set configuration data in NVRAM 180 to place NEB 101 in the data conversion mode for all subsequent jobs. This is different from NED 1001, in which CPNET sets configuration data in flash EPROM 2174. Alternatively, NEB 101 can be configured to perform data conversion only for the first subsequent image forming job. If the data conversion debug mode is detected in Step S1902, the process advances to Step S1903. Otherwise, the process skips ahead to the end and the print application continues with other processing.

From Step S1903, processing is identical to that described above with respect to NED 1001. Accordingly, a detailed description thereof will not be repeated here.

FIG. 20, which was described above with respect to NED 1001, shows an example of what a printout of debug information from NEB 101 might look like. This is identical to that for NED 1001. Since FIG. 20 is described above, a detailed description thereof will not be repeated here.

Other labels and arrangements of the debug information can be used if a different format is desired.

While preferred embodiments of the invention have been described, it is to be understood that the invention is not limited to the above described embodiments and that various changes and modifications may be made by those of ordinary skill in the art without departing from the spirit and scope of the invention.

What is claimed is:

1. A method of outputting a log file from a network device having a connector electrically connectable to a corresponding connector of an image forming apparatus which outputs visible images, the network device for interfacing between a local area network (LAN) and the image forming apparatus, comprising the steps of:

maintaining a log file in the network device which logs information relating to the image forming apparatus interfaced to the network device, the information including at least information on image forming jobs which have been received from the LAN and which have been output in a job format through the connector to the image forming apparatus;

setting at least one triggering condition for initiating output of the log file;

detecting the at least one triggering condition in order to initiate output of the log file;

formatting the log file into an image forming job in the job format in response to the triggering condition detected in the detecting step; and outputting the image forming job from the network device through the connector directly to the image forming apparatus, whereby the image forming job is output by the image forming apparatus as a visible image.

2. A method according to claim 1, wherein the network device includes a storage device and the log file is maintained in the storage device in an allocated area, and wherein the at least one triggering condition for outputting the log file is that the allocated area of the storage device is full.

3. A method according to claim 1, wherein the network device communicates with a computer via the LAN, and wherein the at least one triggering condition for outputting the log file is a command signal from the computer received by the network device.

4. A method according to claim 1, wherein the log file periodically logs statistical information regarding operation of the image forming apparatus, and wherein the at least one triggering condition for outputting the log file is detection of a predetermined time occurring after the logging of the statistical information.

5. A method according to claim 1, further comprising the stop of recognizing an exception condition regarding the connection between the network device and the LAN, wherein the at least one triggering condition is recognition of an exception condition.

6. A method according to claim 1, wherein the log file is maintained without data identifying the content of the log file, and wherein said formatting step includes adding data to the log file to label the content of the log file.

7. A method according to claim 1, wherein said outputting step comprises determining whether a previous image forming job received from the LAN is being output to the image forming apparatus and, if so, outputting the image forming job to the image forming apparatus after a previous image forming job has been output.

8. A method according to claim 1, wherein the setting step sets plural triggering conditions for initiating output of the log file, the detecting step detects at least one of the plural triggering conditions in order to initiate output of the log file, and the formatting step formats the log file into an image forming job in response to the at least one of the plural triggering conditions detected in the detecting step.

9. A method according to claim 1, wherein the log information also includes statistics and/or error information.

10. A method according to claim 1, wherein the triggering condition for outputting the log file comprises recognition of an output command through the connector from the image forming apparatus.

11. A method according to claim 10, wherein the output command is indicated by a predetermined pattern of status changes of the image forming apparatus.

12. A network device which interfaces between a local area network (LAN) and an image forming apparatus which outputs a visible image of a log file, said network device comprising:

a LAN interface for receiving image forming jobs and command signals from the LAN;

a peripheral interface including a connector electrically connectable to a corresponding connector of the image forming apparatus for outputting image forming jobs to the image forming apparatus;

a storage device having an allocated area for storing a log file of information relating to the image forming apparatus, the information including at least information on image forming jobs which have been received from the LAN and which have been output in a job format through the connector to the image forming apparatus; and a processor that (i) updates the log file in the storage device based on at least the information on image forming jobs which have been received from the LAN and which have been output to the image forming apparatus, (ii) sets at least one triggering condition for initiating output of the log file, (iii) detects the at least one triggering condition in order to initiate output of the log file, (iv) formats the log file into an image forming job in the job format in response to the detected triggering condition, and (v) outputs the image forming job from the storage device through the connector directly to the image forming apparatus, whereby the image forming job is output by the image forming apparatus as a visible image.

13. A network device according to claim 12, wherein said processor detects when the allocated area of said storage device is full, and wherein the at least one triggering condition is the detection that the allocated area of said storage device is full.

14. A network device according to claim 12, wherein said processor monitors signals received from the LAN via said LAN interface, and wherein the at least one triggering condition is a predetermined command signal received by said network device via said LAN interface.

15. A network device according to claim 12, wherein said processor periodically calculates and stores image forming apparatus statistical information, and wherein the at least one triggering condition is detection of a predetermined time occurring after the statistical information is stored.

16. A network device according to claim 12, wherein said processor recognizes an exception condition regarding the connection between said network device and the LAN, wherein the at least one triggering condition is recognition of an exception condition.

17. A network device according to claim 8, wherein said processor stores the log file without data identifying the content of the log file, and wherein the processor formats the log file by adding data to label the content of the log file.

18. A network device according to claim 12, wherein said processor determines whether any previous image forming job received from the LAN is being output to the image forming apparatus and, if so, outputs the image forming job to the image forming apparatus after the previous image forming job has been output .

19. An apparatus according to claim 8, wherein the processor sets plural triggering conditions for initiating output of the log file, detects at least one of the plural triggering conditions in order to initiate output of the log file, and formats the log file into an image forming job in response to the at least one of the plural triggering conditions detected by the processor.

20. A network device according to claim 12, wherein the log information also includes statistics and/or error information.

21. A network device according to claim 12, wherein the triggering condition for outputting the log file comprises recognition of an output command through the connector from the image forming apparatus.

22. A network device according to claim 21, wherein the output command is indicated by a predetermined pattern of status changes of the image forming apparatus.

23. A computer-readable memory medium for storing computer-executable process steps to output a log file from a network device having a connector electrically connectable to a corresponding connector of an image forming apparatus which outputs visible images, the network device for interfacing between a local area network (LAN) and the image forming apparatus, the computer-executable process steps comprising:

a maintaining step to maintain a log file in the network device which logs information relating to the image forming apparatus interfaced to the network device, the information including at least information on image forming jobs which have been received from the LAN and which have been output in a job format through the connector to the image forming apparatus;

a setting step to set at least one triggering condition for initiating output of the log file;

a detecting step to detect the at least one triggering condition in order to initiate output of the log file;

a formatting step to format the log file into an image forming job in the job format in response to the triggering condition detected in the detecting step; and an outputting step to output the image forming job from the network device through the connector directly to the image forming apparatus, whereby the image forming job is output by the image forming apparatus as a visible image.

24. A computer-readable memory medium according to claim 23, wherein the network device includes a storage device and the log file is maintained in the storage device in an allocated area, and wherein the at least one triggering condition for outputting the log file is that the allocated area of the storage device is full.

25. A computer-readable memory medium according to claim 23, wherein the network device communicates with a computer via the LAN, and wherein the at least one triggering condition for outputting the log file is a command signal from the computer received by the network device.

26. A computer-readable memory medium according to claim 23, wherein the log file periodically logs statistical information regarding operation of the image forming apparatus, and wherein the at least one triggering condition for outputting the log file is detection of a predetermined time occurring after the logging of the statistical information.

27. A computer-readable memory medium according to claim 23, further comprising the step of recognizing an exception condition regarding the connection between the network device and the LAN, wherein the at least one triggering condition is recognition of an exception condition.

28. A computer-readable memory medium according to claim 23, wherein the log file is maintained without data identifying the content of the log file, and wherein said formatting step includes adding data to the log file to label the content of the log file.

29. A computer-readable memory medium according to claim 23, wherein said outputting step comprises determining whether a previous image forming job received from the LAN is being output to the image forming apparatus and, if so, outputting the image forming job to the image forming apparatus after a previous image forming job has been output.

30. A computer-readable memory medium according to claim 23, wherein the setting step sets plural triggering conditions for initiating output of the log file, the detecting step detects at least one of the plural triggering conditions in order to initiate output of the log file, and the formatting step formats the log file into an image forming job in response two the at least one of the plural triggering conditions detected in the detecting step.

31. A computer-readable memory medium according to claim 23, wherein the log information also includes statistics and/or error information.

32. A computer-readable memory medium according to claim 23, wherein the triggering condition for outputting the log file comprises recognition of an output command through the connector from the image forming apparatus.

33. A computer-readable memory medium according to claim 32, wherein the output command is indicated by a predetermined pattern of status changes of the image forming apparatus.

34. Computer-executable process steps stored on a computer-readable medium, the process steps to output a log file from a network device having a connector electrically connectable to a corresponding connector of an image forming apparatus which outputs visible images, the network device for interfacing between a local area network (LAN) and the image forming apparatus, the process steps comprising:

code to maintain a log file in the network device which logs information relating to the image forming apparatus interfaced to the network device, the information including at least information on image forming jobs which have been received from the LAN and which have been output in a job format through the connector to the image forming apparatus;

code to set at least one triggering condition for initiating output of the log file;

code to detect the at least one triggering condition in order to initiate output of the log file;

code to format the log file into an image forming job in the job format in response to the triggering condition detected by the code to detect; and code to output the image forming job from the network device through the connector directly to the image forming apparatus, whereby the image forming job is output by the image forming apparatus as a visible image.

35. Computer-executable process steps according to claim 34, wherein the network device includes a storage device and the log file is maintained in the storage device in an allocated area, and wherein the at least one triggering condition for outputting the log file is that the allocated area of the storage device is full.

36. Computer-executable process steps according to claim 34, wherein the network device communicates with a computer via the LAN, and wherein the at least one triggering condition for outputting the log file is a command signal from the computer received by the network device.

37. Computer-executable process steps according to claim 34, wherein the log file periodically logs statistical information regarding operation of the image forming apparatus, and wherein the at least one triggering condition for outputting the log file is detection of a predetermined time occurring after the logging of the statistical information.

38. Computer-executable process steps according to claim 34, further comprising code to recognize an exception condition regarding the connection between the network device and the LAN, wherein the at least one triggering condition is recognition of an exception condition.

39. Computer-executable process steps according to claim 34, wherein the log file is maintained without data identifying the content of the log file, and wherein said code to format includes adding data to the log file to label the content of the log file.

40. Computer-executable process steps according to claim 34, wherein the code to output comprises code to determine whether a previous image forming job received from the LAN is being output to the image forming apparatus and, if so, to output the image forming job to the image forming apparatus after a previous image forming job has been output.

41. Computer-executable process steps according to claim 34, wherein the code to set sets plural triggering conditions for initiating output of the log file, the code to detect detects at least one of the plural triggering conditions in order to initiate output of the log file, and the code to format formats the log file into an image forming job in response to the at least one of the plural triggering conditions detected by the code to detect.

42. Computer-executable process steps according to claim 34, wherein the log information also includes statistics and/or error information.

43. Computer-executable process steps according to claim 34, wherein the triggering condition for outputting the log file comprises recognition of an output command through the connector from the image forming apparatus.

44. Computer-executable process steps according to claim 43, wherein the output command is indicated by a predetermined pattern of status changes of the image forming apparatus.

* * * * *

UNITED STATES PATENT AND TRADEMARK OFFICE
CERTIFICATE OF CORRECTION

PATENT NO. : 5,935,262

DATED : August 10, 1999

INVENTOR(S) : Lorraine F. Barrett, et al.

It is certified that error appears in the above-identified patent and that said Letters Patent is hereby corrected as shown below:

<u>On the Cover Page</u>

Under References Cited, U.S. Patent Documents, change "5,270,725" to --5,270,775--.

<u>Column 14</u>

Line 45, change "MAc" to --MAC--.

<u>Column 41</u>

Line 51, change "claim 8," to --claim 12,--; and
line 61, change "claim 8," to --claim 12,--.

<u>Column 43</u>

Line 14, change "two" to --to--.

Signed and Sealed this

Nineteenth Day of September, 2000

Attest:

Q. TODD DICKINSON

*Attesting Officer*   *Director of Patents and Trademarks*